US006856373B2

(12) United States Patent
Sekido et al.

(10) Patent No.: US 6,856,373 B2
(45) Date of Patent: Feb. 15, 2005

(54) LIQUID CRYSTAL DISPLAY APPARATUS AND REDUCTION OF ELECTROMAGNETIC INTERFERENCE

(75) Inventors: Satoshi Sekido, Kawasaki (JP); Takae Ito, Kawasaki (JP); Shinpei Nagatani, Kawasaki (JP); Hidefumi Yoshida, Kawasaki (JP); Takashi Sasabayashi, Kawasaki (JP); Koichi Katagawa, Kawasaki (JP); Katsuhiko Kishida, Kawasaki (JP); Mikio Oshiro, Kawasaki (JP); Katsunori Tanaka, Kawasaki (JP); Toshimitsu Minemura, Kawasaki (JP); Katsuyoshi Hiraki, Kawasaki (JP); Yuichi Inoue, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 220 days.

(21) Appl. No.: 09/939,845

(22) Filed: Aug. 27, 2001

(65) Prior Publication Data

US 2002/0044118 A1 Apr. 18, 2002

(30) Foreign Application Priority Data

Aug. 29, 2000 (JP) ....................................... 2000-259578
Jan. 30, 2001 (JP) ....................................... 2001-022479

(51) Int. Cl.[7] .................................................. G02F 1/13

(52) U.S. Cl. ....................................... 349/181; 349/179

(58) Field of Search ................................ 349/177, 179, 349/181, 187

(56) References Cited

U.S. PATENT DOCUMENTS 5,472,635 A * 12/1995 Iida et al. ................... 349/117
6,335,779 B1 * 1/2002 Morii et al. ................ 349/155

* cited by examiner

*Primary Examiner*—Toan Ton
(74) *Attorney, Agent, or Firm*—Greer, Burns & Crain, Ltd.

(57) ABSTRACT

A liquid crystal display apparatus includes a liquid crystal display unit, a plurality of data driving units which provide image data to said liquid crystal display unit, and a control unit which enables said plurality of data driving units to take in the image data simultaneously if the image data to be provided to said data driving units are identical.

4 Claims, 53 Drawing Sheets

(a)

(b)

| D4~D1 | C1 | C2 | C3 | ··· | Cn |
|---|---|---|---|---|---|
| 0001 | H | L | L | ··· | L |
| 0010 | L | H | L | ··· | L |
| 0011 | L | L | H | ··· | L |
| 1001 | H | H | L | ··· | L |
| 1010 | L | H | H | ··· | L |

LIQUID CRYSTAL DISPLAY APPARATUS AND REDUCTION OF ELECTROMAGNETIC INTERFERENCE

BACKGROUND OF THE INVENTION

1. Field of the Invention

The present invention generally relates to a liquid crystal display apparatus and a manufacturing method thereof.

2. Description of the Related Art

FIG. 1 is a block diagram showing the configuration of a data driving unit in a conventional liquid crystal display apparatus. As shown in FIG. 1, the data driving unit in the conventional liquid crystal display apparatus includes data drivers DV1 through DVn. Each of the data drivers DV1 through DVn takes in a data signal DATA according to a supplied display start signal, and supplies an activated display start signal EOUT to a data driver situated at the following stage. In this manner, the data signal DATA is taken in one after another by the data drivers DV1 through DVn that are provided in a parallel arrangement. In addition, as shown in FIG. 1, a clock signal CLK, a latch pulse LP, and a reference voltage Vref are supplied to each of the data drivers DV1 through DVn.

FIG. 2 is a block diagram showing a configuration of the data driver DV1 shown in FIG. 1. The data drivers DV2 through DVn shown in FIG. 1 have the same configuration as the data driver DV1.

As shown in FIG. 2, the data driver DV1 includes an output amplifier 1, a D/A converter 3, a latch circuit 5, a shift register 7, and a clock controller 9. Here, the source line SL is connected to the output amplifier 1, and the D/A converter 3 is connected to the output amplifier 1. Further, the latch circuit 5 is connected to the D/A converter 3, and the shift register 7 is connected to the latch circuit 5. Further, the clock controller 9 is connected to the shift register 7. In addition, the reference voltage Vref is supplied to the D/A converter 3, and the data signal DATA is supplied to the shift register 7. Furthermore, the clock controller 9 receives the display start signal EI, the clock signal CLK, and a latch pulse, and outputs the display start signal EOUT.

Therefore, in the conventional liquid crystal display apparatus which has the above configuration, since the clock signal CLK was supplied to each of the data drivers DV1 through DVn with no regard to the data signal DATA, there was a problem of the clock signal CLK causing aggravation of an EMI (electromagnetism interference noise) level and increase in power consumption.

In recent years, the technology of electric and electric devices has been rapidly advancing. However, overheating and fire hazards of electric apparatuses by harmonics in a low frequency domain and noise interference to TV sets and the like in a high frequency domain have been caused. Electromagnetic obstacles such as these pose a common problem of every country in the world. Therefore, at present, the necessity for a measure against the electromagnetic interference (EMI measures) is increasing.

On the other hand, recently, a TFT-liquid-crystal display apparatus has become larger with finer scales and higher contrast ratios, for use as a monitor of a personal computer or TV picture display. In such applications, it is required that the liquid crystal display apparatus is viewable from all directions.

Here, the MVA (Multi-domain Vertical Alignment) type liquid crystal display apparatus has been devised as technology of realizing a liquid crystal display apparatus with an extensive view angle. That is, in an MVA type liquid crystal display apparatus, as shown in FIG. 3, it is prepared so that transparent electrodes 11 to which bank-like dielectric structures 13 are formed will face each other, and a liquid crystal layer which includes liquid crystal molecules 15 is installed between the two transparent electrodes 11.

Further, as shown in FIG. 3-(*a*), when a voltage is not applied between the transparent electrodes 11 which face each other, the liquid crystal molecules 15 are oriented perpendicularly, and if a voltage is applied, as shown in FIG. 3-(*b*), they will incline in directions that are predetermined for every four domains. In this manner, view angle characteristics of the four domains are mixed, enabling to provide a large viewing angle.

Here, in the MVA type liquid crystal display apparatus, as shown in the contrast diagram of FIG. 4, a contrast (CR) value of 10 is realized at 80 degree angles both vertically and horizontally for monochrome viewing.

In addition, as structure of the MVA type liquid crystal display apparatus, a slit may be formed on the electrode instead of the dielectric structure, and a combination of a substrate with the slit and a substrate with the dielectric structure may be used as the structure. Further, a combination of a dielectric structure and a slit may be formed on one substrate.

However, when the display of a middle tone, for example, a female picture as shown in FIG. 5, is displayed, a problem arises that the whole picture will become white and the contrast is lost at a lower view angle as shown in FIG. 6.

SUMMARY OF THE INVENTION

It is a general object of the present invention to provide a liquid crystal display apparatus with a lowered EMI level and improved view angle properties, and a production method thereof, which substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by the liquid crystal display apparatus and the manufacturing method thereof pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a liquid crystal display apparatus includes a liquid crystal display unit, a plurality of data driving units which provide image data to said liquid crystal display unit, and a control unit which enables said plurality of data driving units to take in the image data simultaneously if the image data to be provided to said data driving units are identical.

According to the liquid crystal display apparatus, the clock signal for transmitting the image data can be stopped temporarily, or the frequency of the clock signal can be reduced.

DESCRIPTION OF THE PREFERRED EMBODIMENTS

Figure 1:
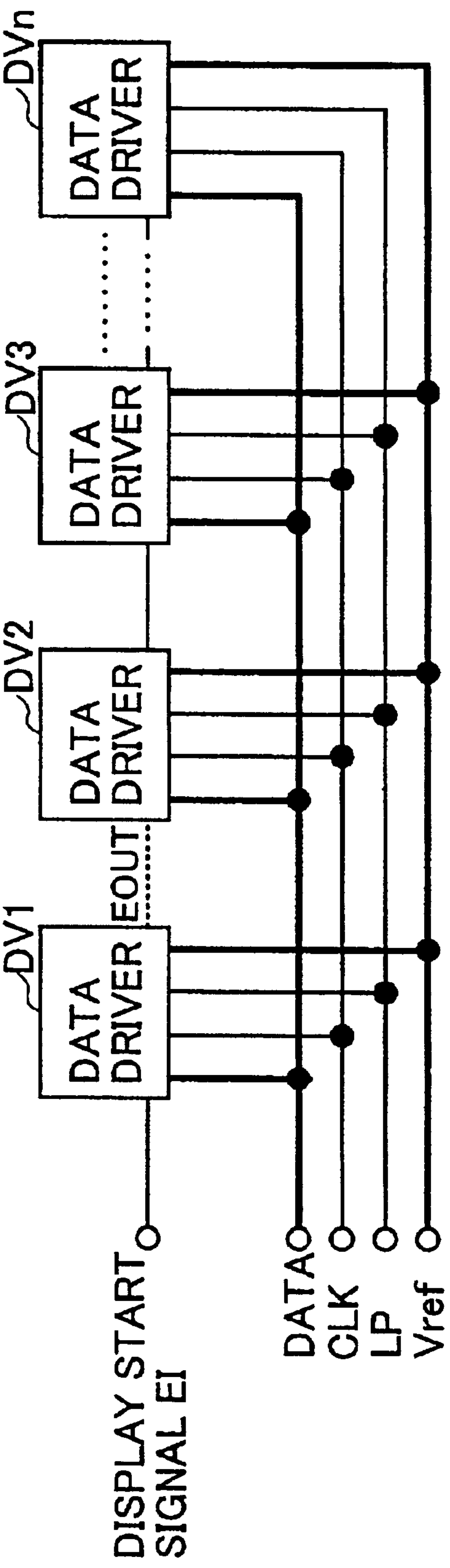
FIG. 1 is a block diagram showing the configuration of the data driving unit in conventional liquid crystal display apparatuses.
Figure 2:
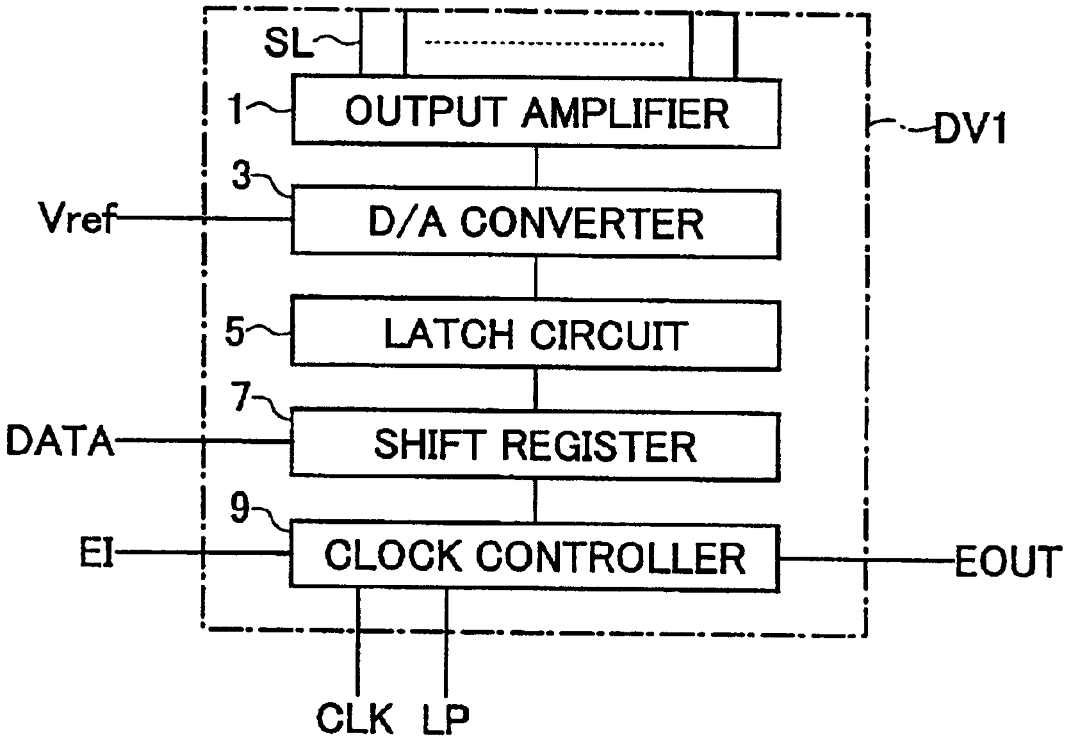
FIG. 2 is a block diagram showing the configuration of the data driver shown in FIG. 1.
Figure 3:
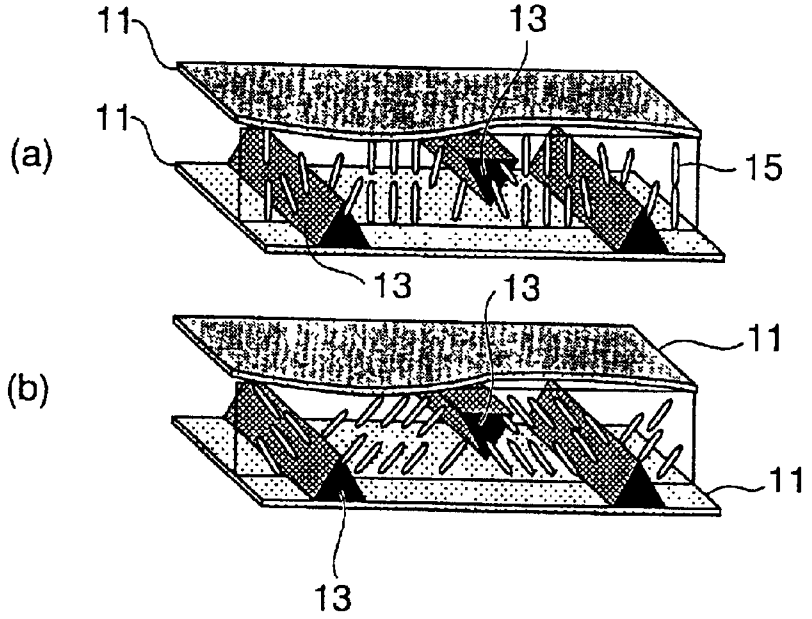
FIG. 3 is a perspective drawing showing the basic configuration of conventional MVA type liquid crystal display apparatuses.
Figure 4:
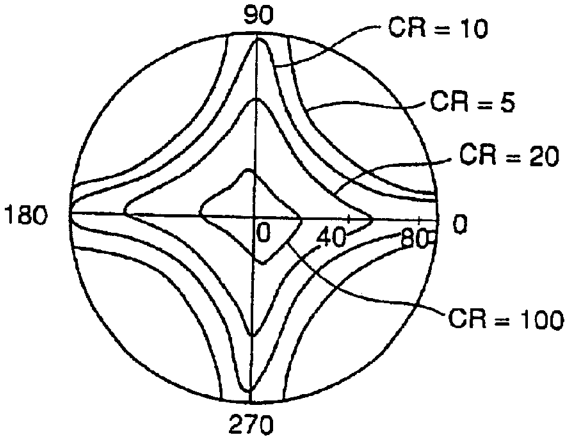
FIG. 4 is a graph showing the vision characteristics of monochrome contrast of the liquid crystal display apparatus shown in FIG. 3.

Embodiments of the present invention will be described in detail with reference to drawings below. In the following, a same number in the drawings indicates the same or an equivalent portion.

Figure 7:
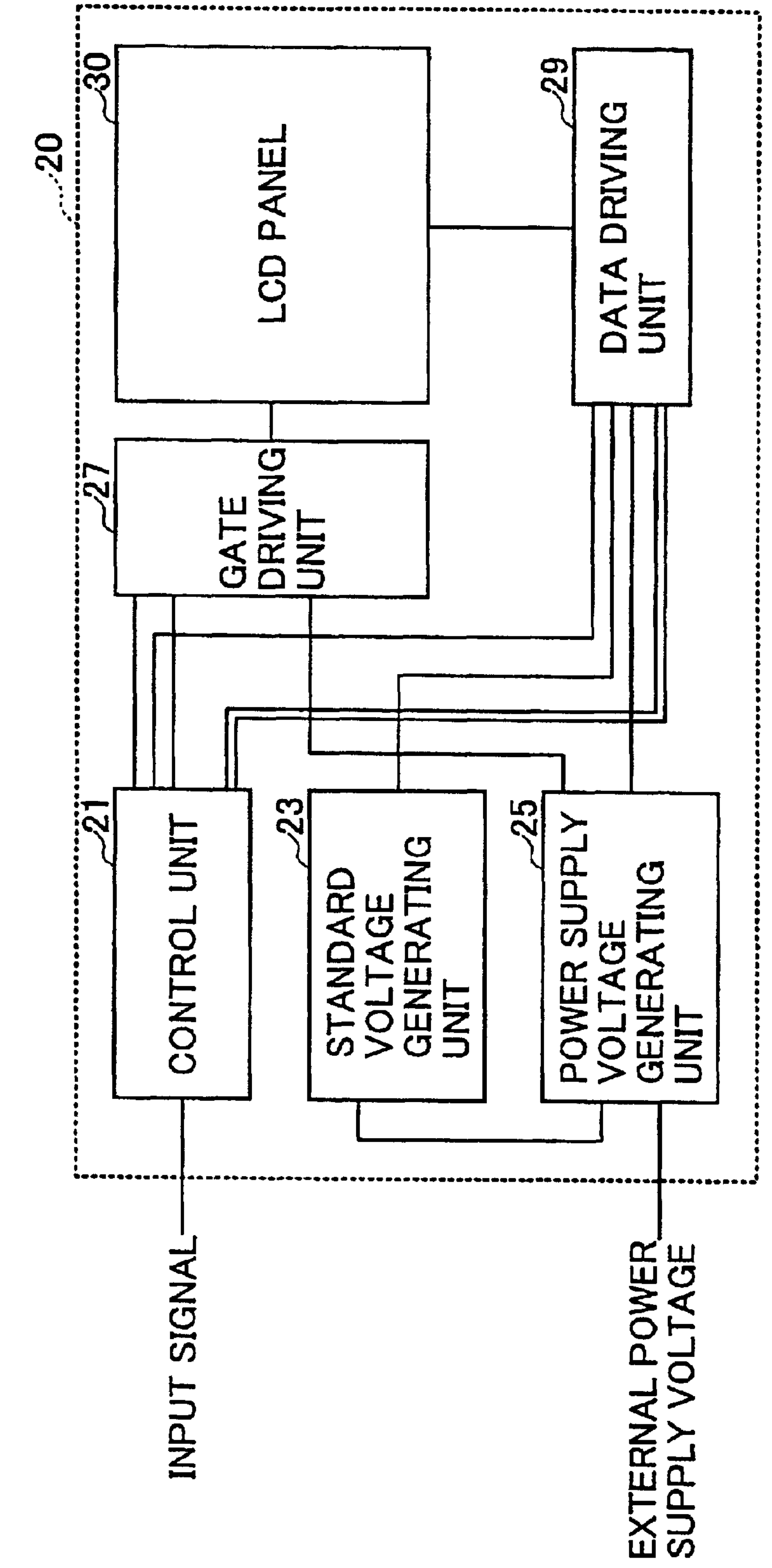
FIG. 7 is a block diagram showing the configuration of the liquid crystal display apparatus concerning the first embodiment of the present invention.

FIG. 7 shows the configuration of the liquid crystal display apparatus of the first embodiment of the present invention. As shown in FIG. 7, the liquid crystal display apparatus 20 of the first embodiment includes a control unit 21, a standard voltage generating unit 23, a power supply voltage generating unit 25, a gate driving unit 27, a data driving unit 29, and a liquid crystal panel 30. Here, the control unit 21 generates various control signals mentioned later according to an incoming signal supplied. Further, the standard voltage generating unit 23 is connected with the power supply voltage generating unit 25, and generates standard voltages (gradation voltages) that will be supplied to the data driving unit 29.

Further, the power supply voltage generating unit 25 generates an internal power supply voltage and a reference voltage Vref according to the external power supply voltage supplied from the outside, and supplies them to the gate driving unit 27 and the data driving unit 29. Further, the gate driving unit 27 chooses liquid crystal cells to which data is to be written from the liquid crystal cells that constitute the liquid crystal panel 30 according to the control signal supplied from the control unit 21, and the voltage supplied from the power supply voltage generating unit 25. Further, the data driving unit 29 supplies a data signal to the above-mentioned liquid crystal cell according to the control signal and data signal which are supplied from the control unit 21, and the voltage supplied from the standard voltage generating unit 23 and the power supply voltage generating unit 25.

Figure 8:
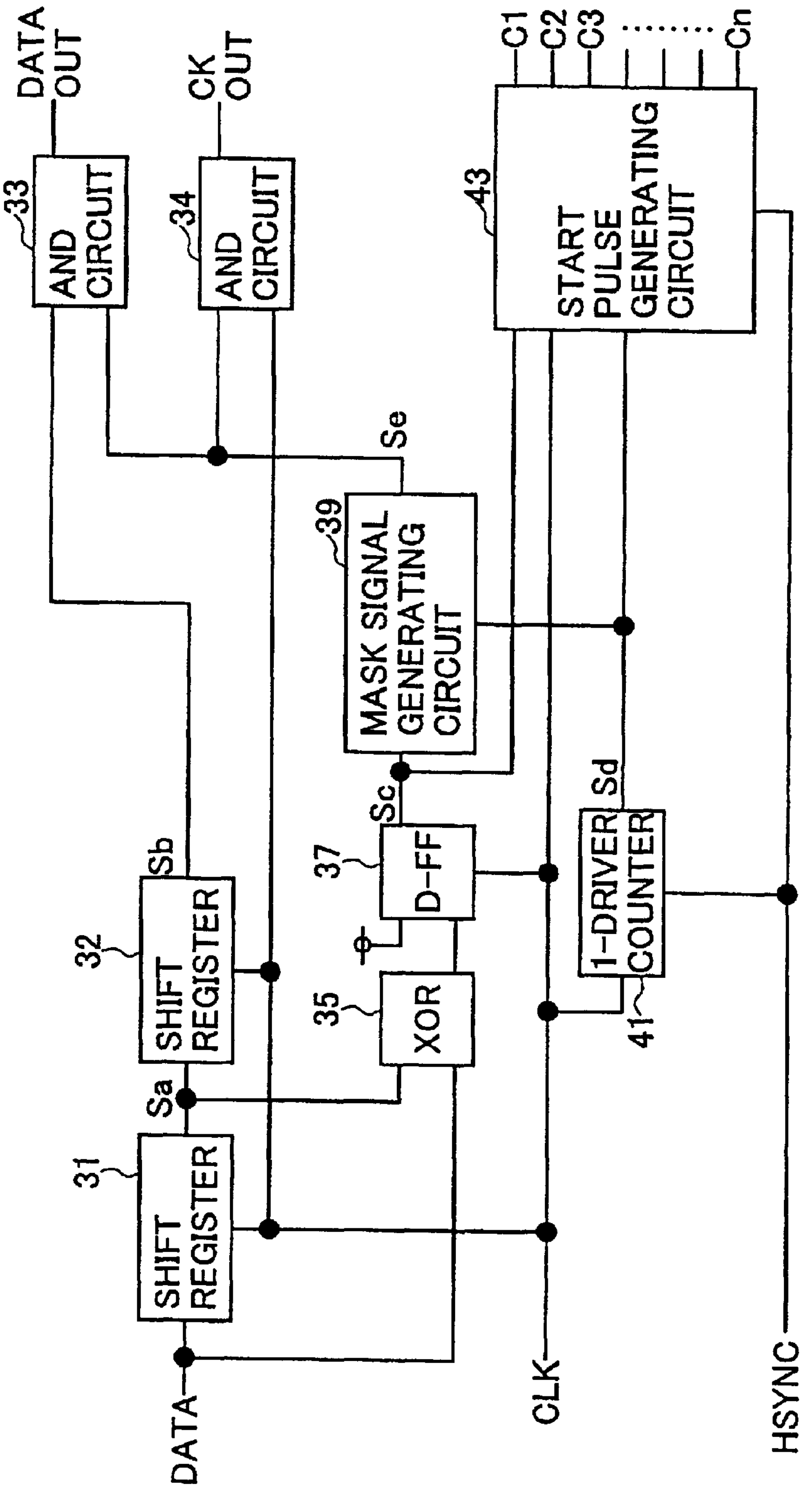
FIG. 8 is a block diagram showing the first configuration of a control unit shown in FIG. 7.

FIG. 8 is a block diagram showing the first configuration of the control unit 21 shown in FIG. 7. As shown in FIG. 8, the control unit 21 is equipped with shift registers 31 and 32, AND circuits 33 and 34, an exclusive OR circuit (XOR) 35, a delay flip flop (D-FF) 37, a mask signal generating circuit 39, the 1-driver counter 41, and a start pulse generating circuit 43.

Here, a data signal DATA and a clock signal CLK are supplied to the shift register 31, and the shift register 32 is connected to the shift register 31. Further, the input node of the exclusive OR circuit (XOR) 35 is connected to the output node and input node of the shift register 31. Further, the delay flip flop (D-FF) 37 is connected to the XOR 35, and the clock signal CLK is supplied. Further, the mask signal generating circuit 39 is connected to the D-FF 37 and the 1-driver counter 41.

Further, the AND circuit 33 is connected with the shift register 32 and the mask signal generating circuit 39, and outputs the data signal DATAOUT. In addition, the clock signal CLK and the signal Se outputted from the mask signal generating circuit 39 are supplied to the AND circuit 34, and the clock signal CKOUT is outputted.

Further, the clock signal CLK and the horizontal synchronization signal HSYNC are supplied to the 1-driver counter 41. And the start pulse generating circuit 43 is connected with the D-FF 37 and the 1-driver counter 41, is provided with the clock signal CLK and the horizontal synchronization signal HSYNC, generates data acquisition start signals (start pulses) C1–Cn, and supplies them to each data driver included in the data driving unit 29.

Here, the start pulse C1 is supplied to the first data driver, the start pulse C2 is supplied to the second data driver, the start pulse C3 is supplied to the third data driver, and the start pulse C4 is supplied to the fourth data driver.

In above, data capacity of the shift registers 31 and 32 shall be large enough to hold the data that one driver outputs in an operation.

Figure 9:
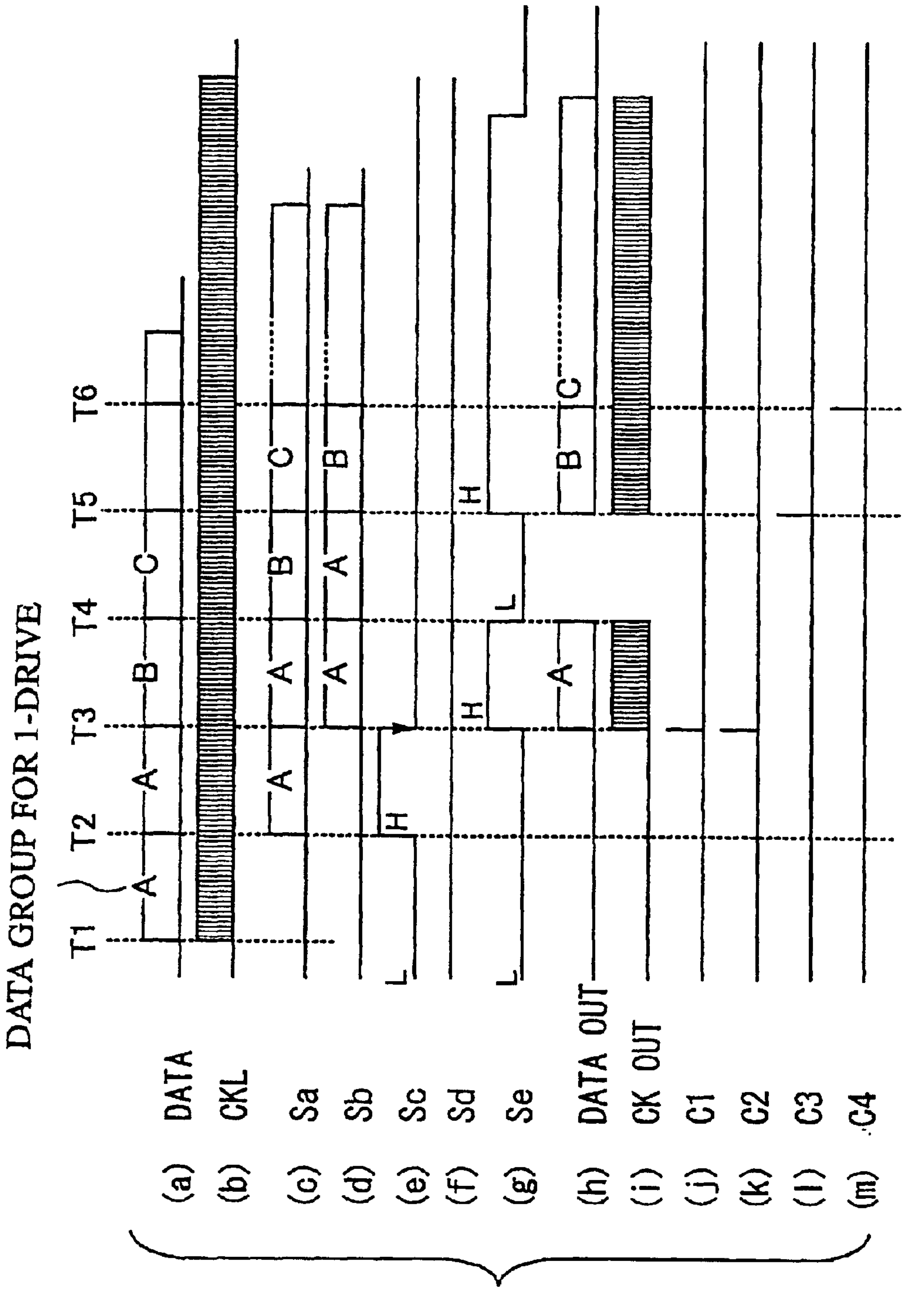
FIG. 9 is a timing chart showing the first operation of the control unit shown in FIG. 8.

Operation of the control unit shown in FIG. 8 below is described referring to FIG. 9. As shown in FIG. 9, each of the periods between time T1 and time T2, time T2 and time T3, time T3 and time T4, time T4 and time T5, and time T5 and time T6 (also called a "driver reading period"), a data group supplied to each corresponding data driver is supplied to the control unit as a data signal DATA. A description will follow for an example where the same data signal A is supplied to the first data driver and the second data driver, the data signal B is supplied to the third data driver, and the data signal C to the fourth data driver, respectively.

First, as shown in FIG. 9-(*a*), the data signal A to be supplied to the first data driver is stored in the shift register 31 during the period between the time T1 and the time T2. And if a data signal DATA to be supplied to the second data driver inputted into the shift register 31 during the next driver reading period is the same as the data signal A, the data signal A that is to be supplied to the first data driver will be transferred to the shift register 32.

At this time, the exclusive OR circuit 35 compares the signal Sa outputted from the shift register 31 shown in FIG. 9-(*c*) with the data signal DATA inputted into the shift register 31, and outputs a high-level signal because they are the same data signal A. And this signal is delayed by D-FF 37 , and the signal Sc which becomes high-level during the 1-driver reading period between the time T2 and the time T3 as shown in FIG. 9-(*e*) is generated.

Next, the mask signal generating circuit 39 latches the signal Sc with a clock signal Sd generated in the 1-driver counter 41 as shown in FIG. 9-(*f*). And the mask signal generating circuit 39 generates and outputs the signal Se that is made the low level during the 1-driver reading period in response to the clock signal Sd supplied first after the signal Sc has shifted to the low level.

In this manner, while the AND circuit 33 outputs the data signal DATAOUT shown in FIG. 9-(*h*) to a driver by taking the logical product of the signal Se shown in FIG. 9-(*g*), and the signal Sb shown in FIG. 9-(*d*), the AND circuit 34 outputs the clock signal CKOUT shown in FIG. 9-(*i*) to a driver by taking the logical product of the clock signal CLK shown in FIG. 9-(*b*) and the signal Sb shown in FIG. 9-(*d*).

On the other hand, as shown in FIG. 9-(*j*) and FIG. 9-(*k*), the start pulse generating circuit 43 supplies the start pulses C1 and C2 which are activated simultaneously at the time T3 when the supplied signal Sc shifts from the high level to the low level to the first data driver and the second data driver, respectively. Thereby, the first and second data drivers simultaneously take in the same data signal A supplied between time T3 and time T4 according to the start pulses C1 and C2, respectively.

In addition, since the start pulse C3 generated by the start pulse generating circuit 43 is activated at the time T5 and the start pulse C4 is activated at the time T6, as shown in FIG. 9-(*l*) and FIG. 9-(*m*), the third data driver takes in the data signal B according to the start pulse C3, and the fourth data driver takes in the data signal C according to the start pulse C4, as shown in FIG. 9-(*h*).

As mentioned above, when supplying the data signal A, for example, to the first data driver, data can be simultaneously supplied also to the second data driver with the data signal A by activating the start pulse C2 to the high-level simultaneously with the start pulse C1. Accordingly, in this case, it is not necessary to supply a data signal to the second data driver in the 1-driver reading period immediately after supplying the data signal to the first data driver as shown in FIG. 9-(*i*). Therefore, it becomes unnecessary for this period to supply the clock signal CKOUT to a data driver, and it can stop the clock signal CKOUT. From this, the EMI level by this clock signal CKOUT can be reduced.

Figure 10:
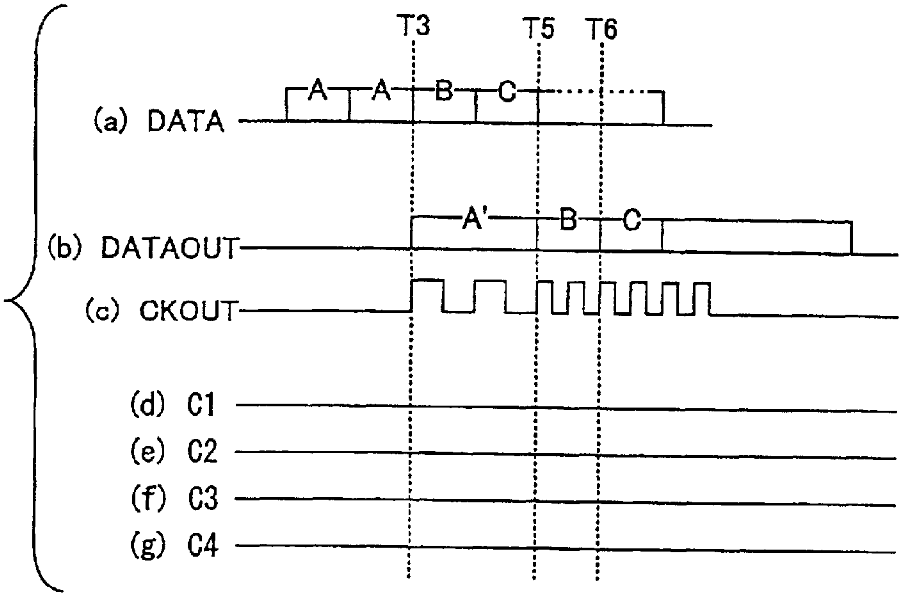
FIG. 10 is a timing chart showing the second operation of the control unit shown in FIG. 8.

Here, instead of stopping temporarily the clock signal CKOUT supplied to a data driver as mentioned above, a clock signal CKOUT that is generated by dividing the clock signal CLK by, e.g., 2 may be generated, while a data signal A' which has a double period of the data signal A is supplied between the time T3 and the time T5 to the first and second data drivers as shown in FIG. 10. By making the first and the second data driver to take in the data signal A' simultaneously in synchronous with the clock signal CKOUT mentioned above, an EMI level can be reduced like the above.

Figure 11:
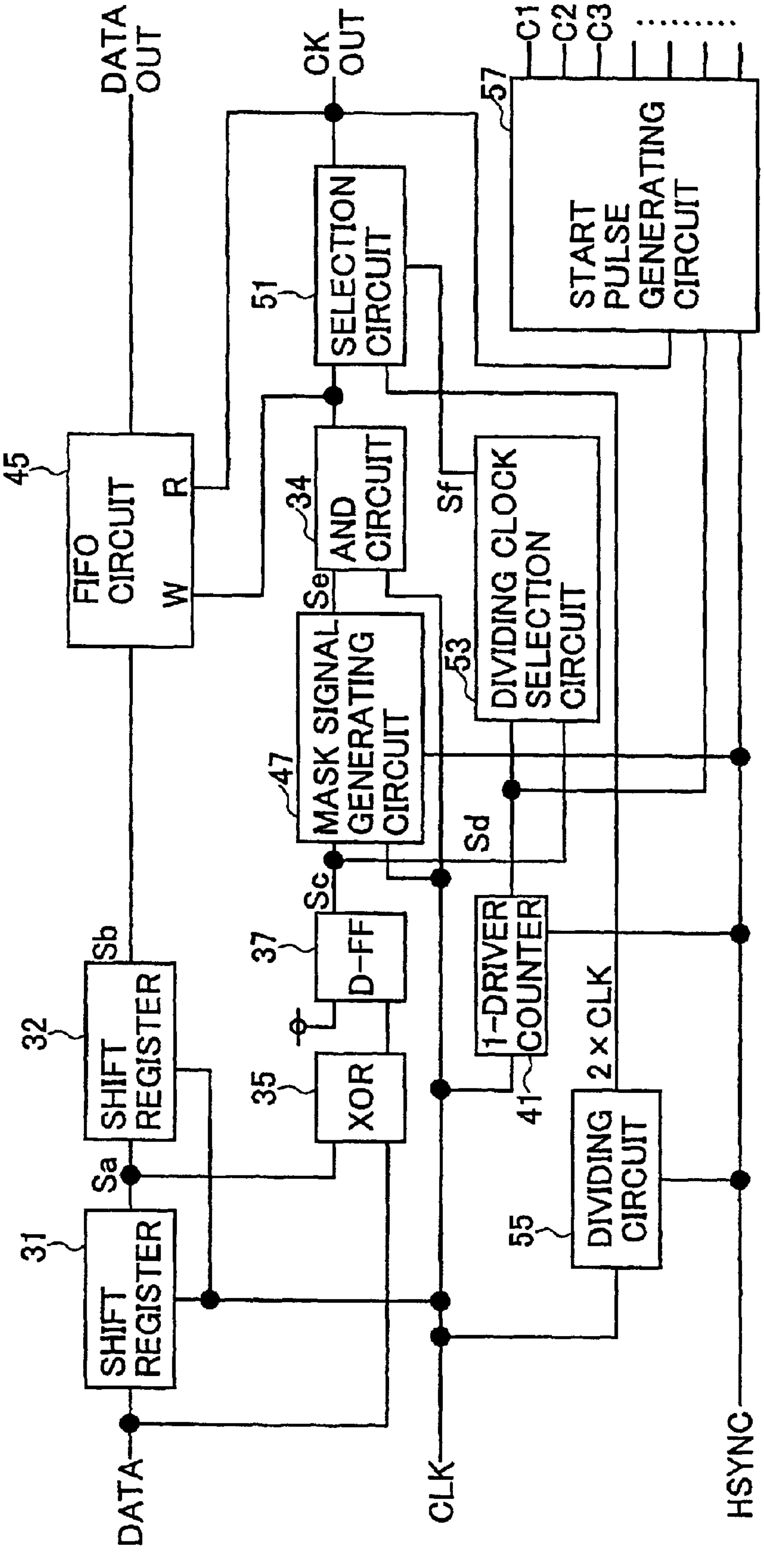
FIG. 11 is a block diagram showing the second configuration of the control unit shown in FIG. 7.

More details will follow. FIG. 11 is a block diagram showing the second configuration of the control unit shown in FIG. 7. Although the control unit shown in FIG. 11 has a similar configuration to the control unit shown in FIG. 8, it is different by further including a FIFO (First-In First-Out) circuit 45 and a divider 55 and a divider clock selection circuit 53 and a selection circuit 51.

Here, the FIFO circuit 45 is connected to the shift register 32, and the clock signal CLK is supplied to the divider 55. Further, the divider clock selection circuit 53 is connected to the 1-driver counter 41, and the selection circuit 51 is connected to the AND circuit 34.

Figure 12:
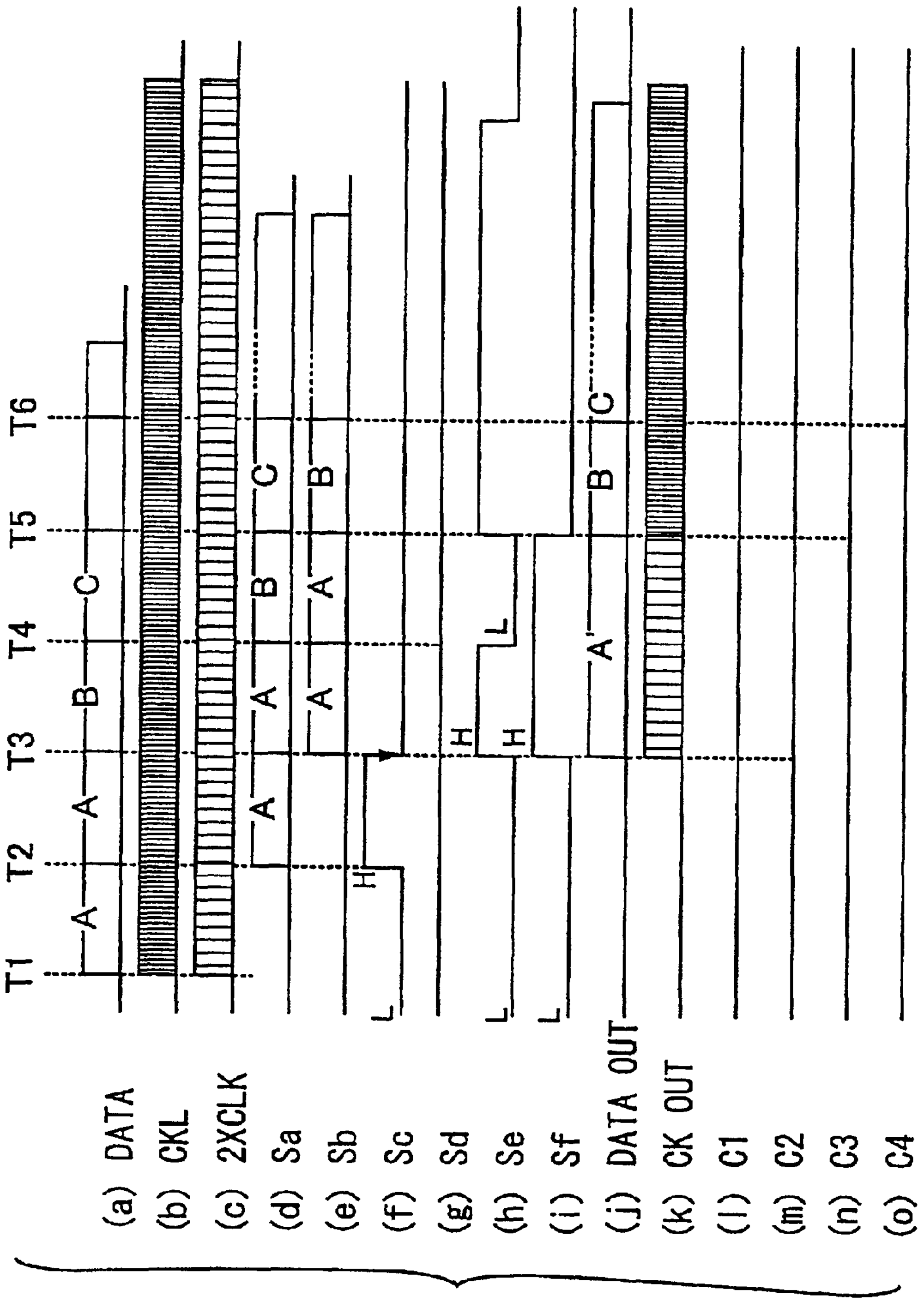
FIG. 12 is a timing chart showing operation of the control unit shown in FIG. 11.

In the control unit which has the above configuration, the clock signal CLK is divided by 2 by the divider as shown in FIG. 12-(*b*) to generate a clock signal 2×CLK shown in FIG. 12-(*c*). Further, the divider clock selection circuit 53 detects that the signal Sc shown in FIG. 12-(*f*) becomes high-level between time T2 and time T3, and generates a signal Sf (FIG. 12-(*i*)) which becomes high-level during the period (from time T3 to time T5) in which it supplies the same data signal A to the first and second data drivers.

Further, as shown in FIG. 12-(i k), the selection circuit 51 outputs the clock signal 2×CLK shown in FIG. 12-(*c*) from time T3 to the time T5, and the clock signal CLK shown in FIG. 12-(*b*) after time T5 according to the supplied signal Sf, respectively and selectively.

On the other hand, while the FIFO circuit 45 takes in the data signal A supplied from the shift register 32 between time T3 and time T4 according to the clock signal CLK supplied to W terminal from the AND circuit 34, this data signal A is outputted as data signal A' shown in FIG. 12-(*j*) according to the clock signal CKOUT (FIG. 12-(*k*)) supplied from the selection circuit 51 between time T3 and time T5.

Figure 13:
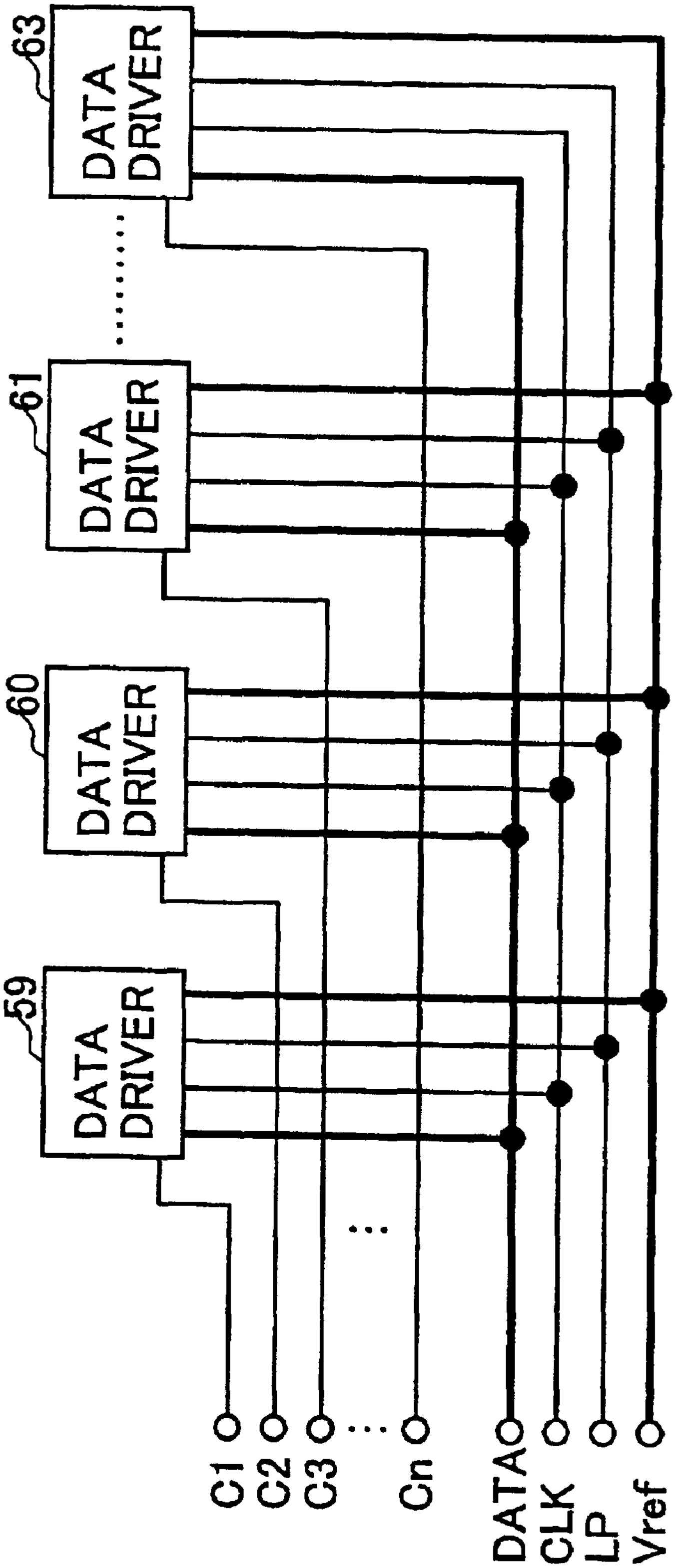
FIG. 13 is a block diagram showing the configuration of the data driving unit shown in FIG. 7.

Further, the data driving unit 29 of the first embodiment may include data drivers 59–63 installed in parallel as shown in FIG. 13. Here, display start signals C1–Cn which correspond to the data drivers 59–63 shown in FIG. 13, respectively, are supplied, and the data signal DATA acquisition timinig is controlled by each of the data drivers 59–63.

Figure 14:
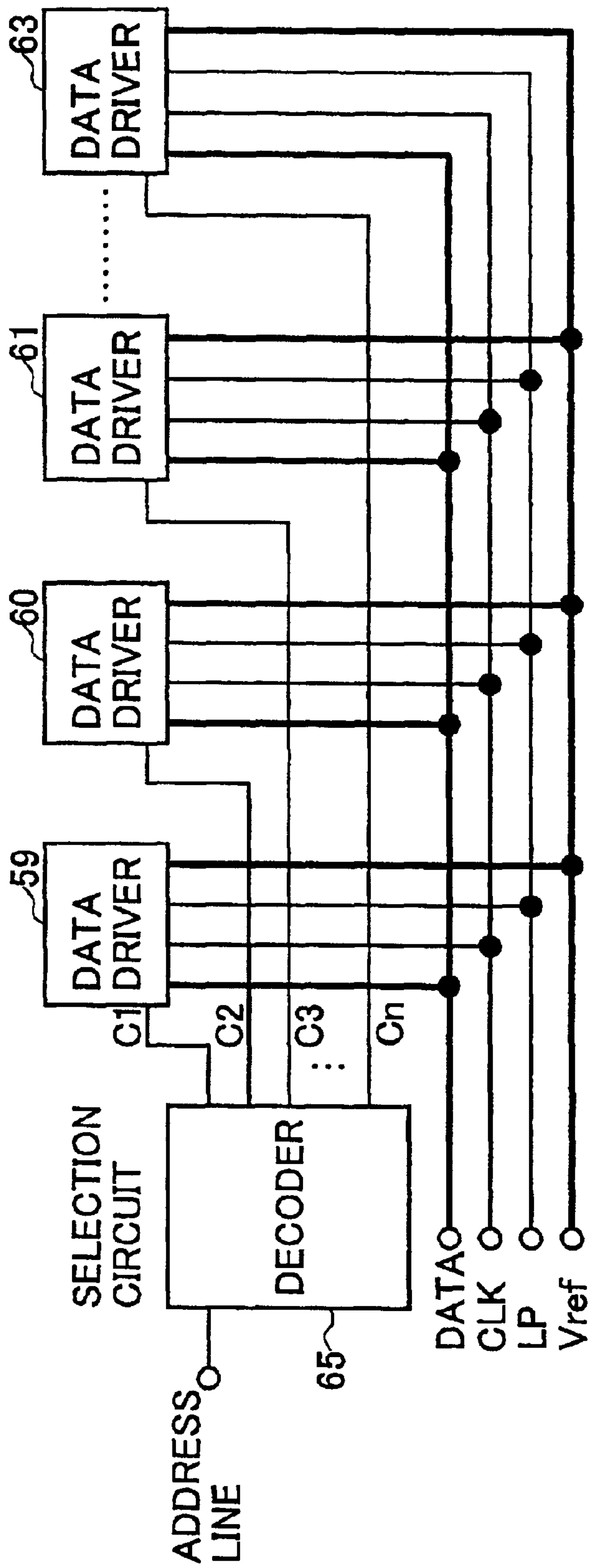
FIG. 14 is a block diagram showing other configuration of the data driving unit shown in FIG. 7.
Figure 15:
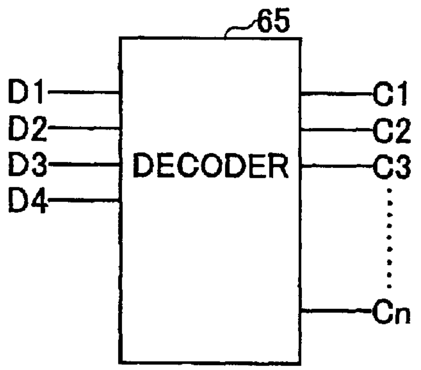
FIG. 15 is describes the decoder shown in FIG. 14.

In addition, these display start signals C1–Cn may be generated by a decoder 65 connected to the address line as shown in FIG. 14. Here, the decoder 65 generates the display start signals C1–Cn by decoding supplied addresses D1–D4 as shown in FIG. 15-(*a*) and FIG. 15-(*b*). According to such a data driving unit 29, the display start signals C1–Cn are controllable by providing a few address lines.

Figure 16:
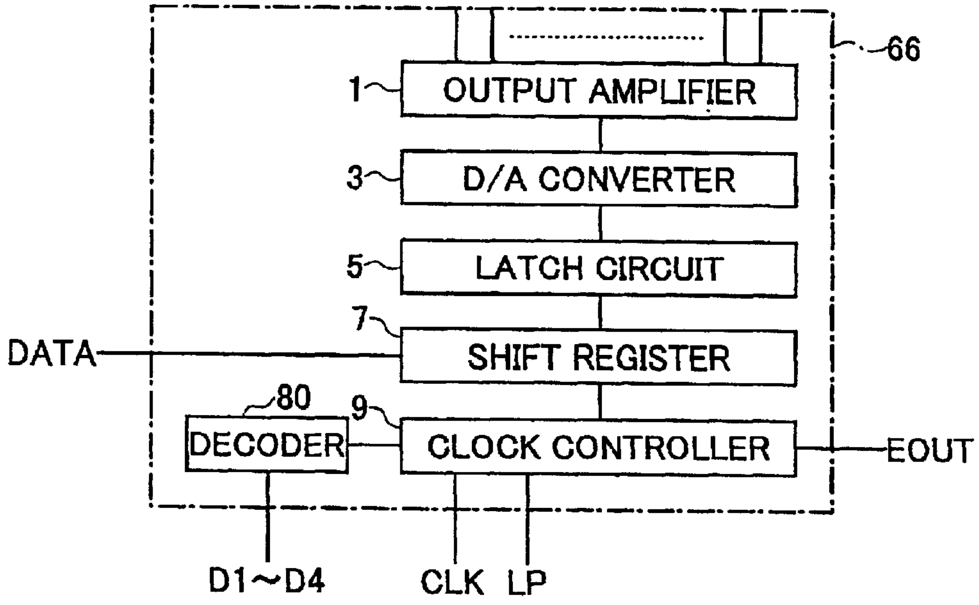
FIG. 16 is a block diagram showing the configuration of the data driver concerning the first embodiment of the present invention.
Figure 17:
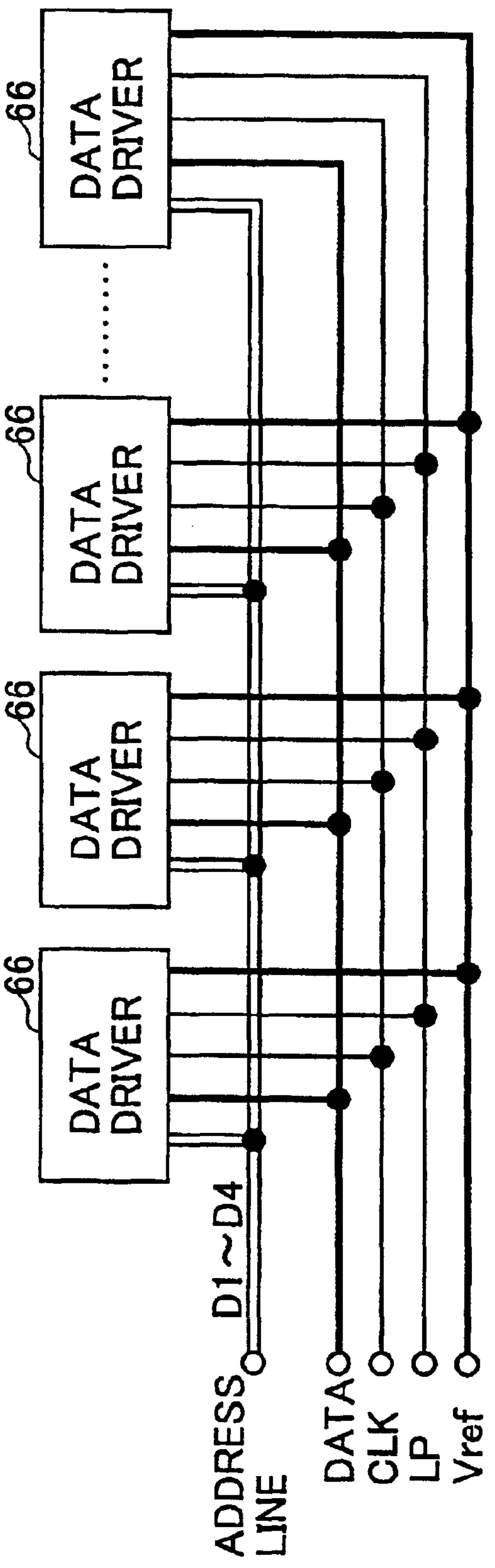
FIG. 17 is a block diagram showing the configuration of the data driving unit constituted by the data driver shown in FIG. 16.

Further, instead of providing the decoder 65 shown in FIG. 14, a decoder 80 may be provided in each data driver 66 as shown in FIG. 16, and the data drivers 66 may be provided in parallel as shown in FIG. 17.

As mentioned above, according to the liquid crystal display apparatus of the first embodiment of the present invention, the clock signal for transmitting a data signal can be stopped or the frequency of the clock signal can be reduced when supplying the same data signal to two or more data drivers, thereby reducing an EMI level and power consumption.

Second Embodiment

Figure 18:
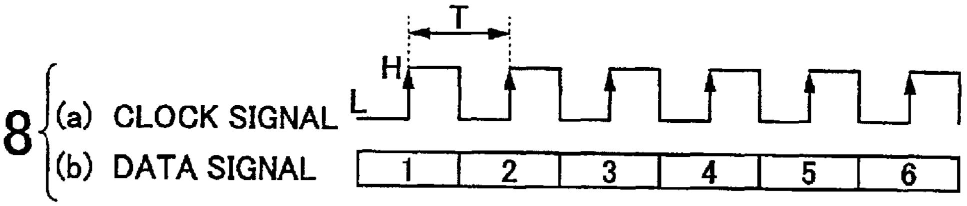
FIG. 18 is a timing chart showing the data acquisition timing by a single edge clock signal used conventionally.
Figure 19:
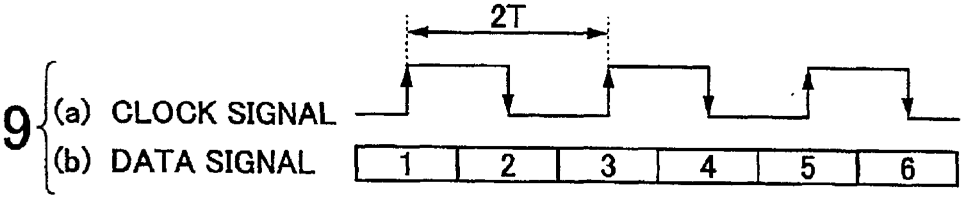
FIG. 19 is a timing chart showing the data acquisition timing by a double edge clock signal used conventionally.

Generally, in the conventional liquid crystal display apparatus, a single edge driving or a double edge driving is adopted. The "single edge driving" is a driving method wherein a data signal is taken in to a data driver using a timing of the level change from one level to the other, e.g., from the low level to the high level with the clock signal of a cycle T as shown in FIG. 18. Further, the "double edge driving" shown in FIG. 19 is a driving method wherein a data signal is taken in to a data driver at a timing of both edges, i.e., logic level changes, with the clock signal of cycle 2T.

Figure 20:
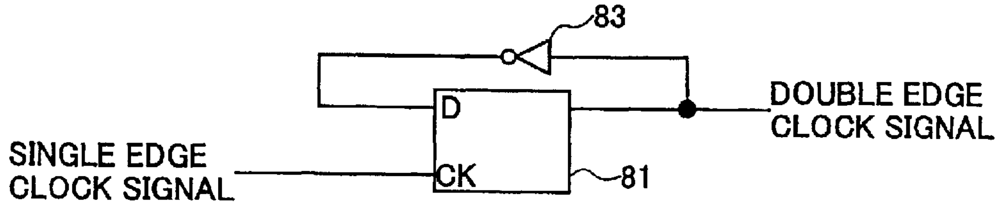
FIG. 20 is a circuit diagram showing a circuit which generates the double edge clock signal shown in FIG. 19.

In addition, the clock signal (double edge clock signal) of cycle 2T is generated by the circuit that includes a delay flip flop (D-FF) circuit 81 and an inverter 83 as shown in FIG. 20. Here, the input node of the inverter 83 is connected to the output node of the D-FF circuit 81, and the output node of the inverter 83 is connected to the D terminal of the D-FF circuit 81.

Figure 21:
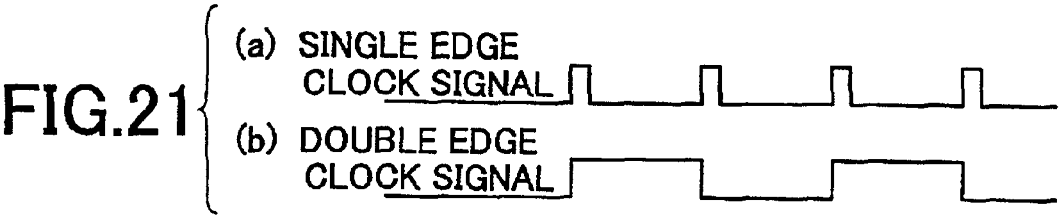
FIG. 21 is a timing chart showing operation of the circuit shown in FIG. 20.

In the circuit which has such configuration as above, the signal (single edge clock signal) of the cycle T shown in FIG. 21-(*a*) is supplied to CK terminal of the D-FF circuit 81, and the double edge clock signal shown in FIG. 21-(*b*) is outputted from the D-FF circuit 81.

Conventionally, only one of the driving methods has been adopted in a circuit even if the circuit has a capability of executing the two kinds of driving methods, namely the single edge driving and the double edge driving as mentioned above, and an EMI measure has been taken for eliminating the noise of a clock signal, using a filter, a bead (coil) and the like.

However, as mentioned above, since the method using a filter, a bead and the like is subjected to influences of a mutual phase relationship between the clock signal and the data signals, it has the problem that an EMI level cannot necessarily be reduced to a satisfactory value.

Further, a method of slightly shifting the clock signal frequency to scatter the noise peak of harmonics has recently been adopted. The method, however, uses the frequency shifted clock signal that is asynchronous to the original clock signal, causing a problem that synchronization could not be taken to the data signal. To solve this, a special IC has been required, causing a cost rise.

In the following, the second embodiment of the present invention for the liquid crystal display apparatus will be described, wherein the problem mentioned above is solved by distributing the peak frequency of the EMI noise generated from the clock signal.

Although the liquid crystal display apparatus of the second embodiment of the present invention has the same configuration as the liquid crystal display apparatus of the first embodiment shown in FIG. 7, each data driver included in the data driving unit is capable of being driven by either of the driving methods of the single edge driving and the double edge driving. A different driving method is chosen according to the control signal supplied. Further specific descriptions will follow hereunder.

Figure 22:
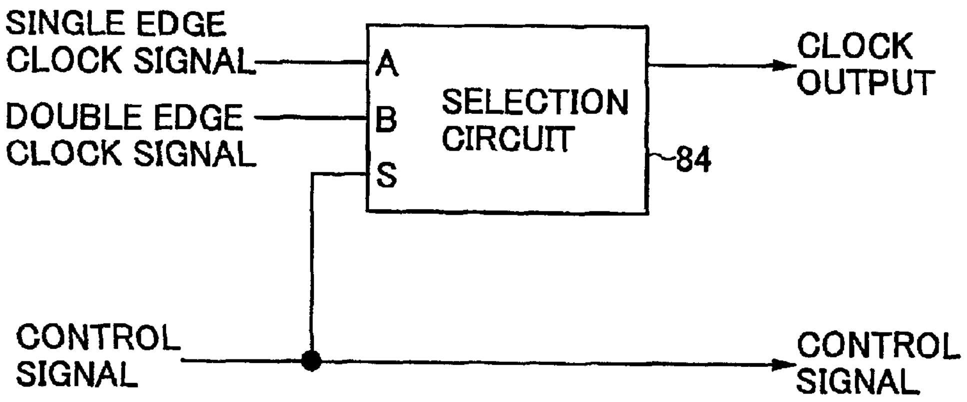
FIG. 22 shows a selection circuit included in the control unit concerning the second embodiment of the present invention.

FIG. 22 is a drawing showing the selection circuit included in the control unit which is included in the liquid crystal display apparatus of the second embodiment of the present invention. As shown in FIG. 22, a single edge clock signal is supplied to the A terminal of the selection circuit 84, a double edge clock signal is supplied to the B terminal, and a control signal is supplied to the S terminal.

Figure 23:
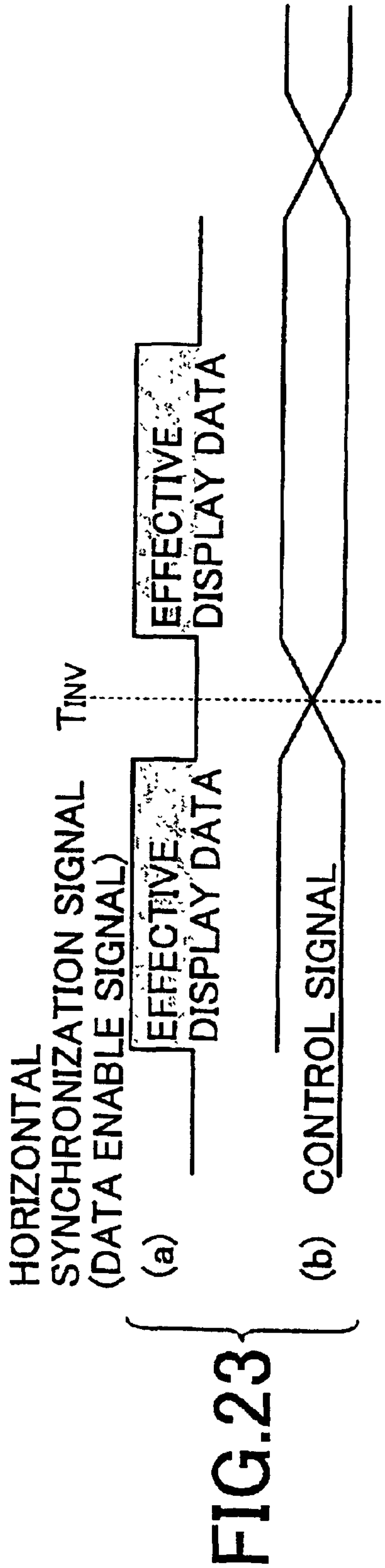
FIG. 23 is a timing chart showing operation of the selection circuit shown in FIG. 22.

Here, the selection circuit 84 outputs selectively either the single edge clock signal or the double edge clock signal according to the control signal. Here, although the control signal can be arbitrarily generated by the control unit, as shown in FIG. 23, an erroneous acquisition of the data signal can be avoided by inverting the control signal at the time $T_{INV}$ that is after the data driver latches an effective display data.

Figure 24:
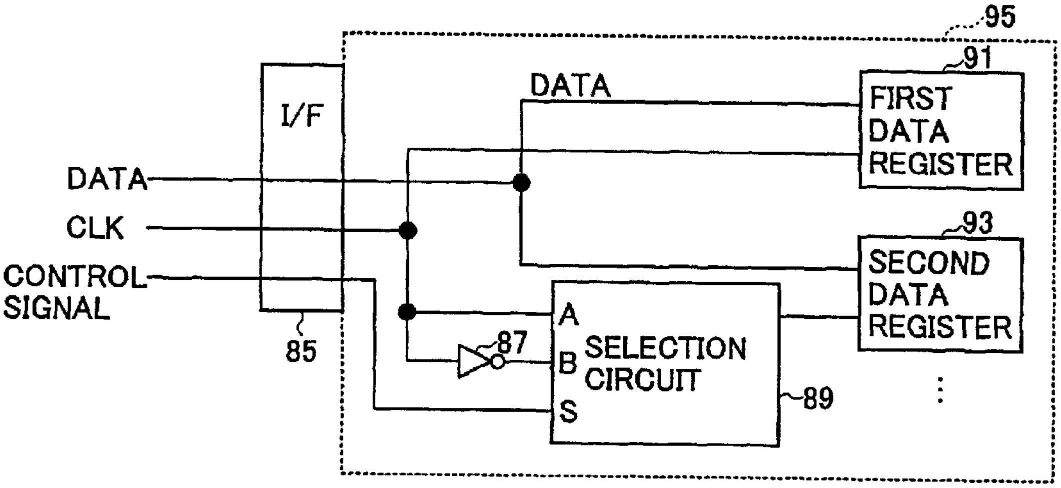
FIG. 24 shows the configuration of the driver concerning the second embodiment of the present invention.

FIG. 24 is a drawing showing the configuration of a data driver 95 in the liquid crystal display apparatus of the second embodiment. As shown in FIG. 24, the data driver 95 has a first data register 91, a second data register 93, the selection circuit 89 and the inverter 87. Here, a data signal DATA is supplied to the first and the second data registers 91 and 93, the clock signal CLK is supplied to the first data register 91, the A terminal of the selection circuit 89 and the inverter 87, and the control signal is supplied to the S terminal of the selection circuit 89, respectively, via the interface unit 86. Further, the output node of the inverter 87 is connected to the B terminal of the selection circuit 89, and the output node of the selection circuit is connected to the second data register 93.

In the data driver 95 which has such configuration as above, the first and the second data registers 91 and 93 acquire the data signal DATA only at the so-called rising timing, that is, at the transition from the low level to the high level, of the clock signal inputted.

Figure 25:
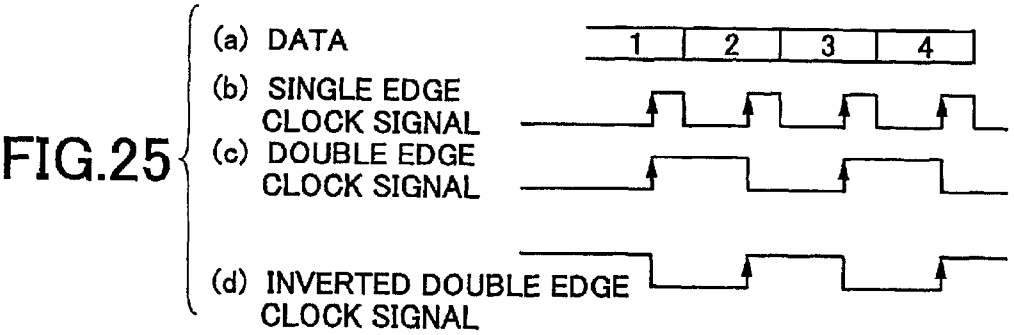
FIG. 25 is a timing chart showing operation of the driver shown in FIG. 24.

On the other hand, when there is a phase relationship between the data signal DATA as shown in FIG. 25-(*a*) and the single edge clock signal as shown in FIG. 25-(*b*), the double edge clock signal shown in FIG. 25-(*c*) is generated based on this single edge clock signal, and the inverted double edge clock signal shown in FIG. 25-(*d*) is generated by the inverter 87.

Here, since the even-numbered data signal cannot be taken in to a corresponding register even if the double edge clock signal shown in FIG. 25-(*c*) is supplied when the double edge driving of the data driver 95 is carried out, the selection circuit 89 is controlled by the control signal so that the inverted double edge clock signal shown in FIG. 25(*d*) is supplied to the even-numbered register. That is, in the selection circuit 89 corresponding to the even-numbered register, the signal outputted from the inverter 87 according to the control signal supplied is outputted selectively.

As mentioned above, according to the liquid crystal display apparatus of the second embodiment of the present invention, since the single edge driving and the double edge driving can be arbitrarily changed by simple configuration, an EMI level can be reduced by distributing the peak frequency of the EMI noise generated from the clock signal.

Third Embodiment

With the data processing speed of systems becoming higher, system driving clock of information machines and equipment is accelerating. Accordingly, circuits are driven by high frequency clocks, causing an increasing necessity of suppressing the noise level of EMI.

Here, although the measures of using a bead and a filter or strengthening a shield structurally have conventionally been taken, in the present condition that drive frequency becomes high, there is a problem that the conventional methods of only eliminating the noise of a clock waveform are insufficient.

Further, although there is the method of moving the frequency of a clock as a solution means, thereby scattering the peak of harmonics, it has a problem that the frequency-shifted clock is asynchronous to the original clock, causing an inability to take synchronization with data.

Then, in the liquid crystal display apparatus of the third embodiment of the present invention, the noise level concentrated on one point is scattered to other points, thereby lowering the noise level by fluctuating the change timing of the waveform which determines the noise level of EMI.

In addition, the following formula expresses the n-th harmonics among the Fourier ingredients in a general high frequency pulse.

$$aA+A/n\pi\times[\mathrm{root}2(1-\cos 2\pi an)]\times\sin(n\omega t+\phi)$$

In the formula above, A represents the amplitude and a represents the duty ratio. Therefore, the harmonics change as the duty ratio changes. In the following, specific descriptions will follow about the liquid crystal display apparatus of the third embodiment.

Figure 26:
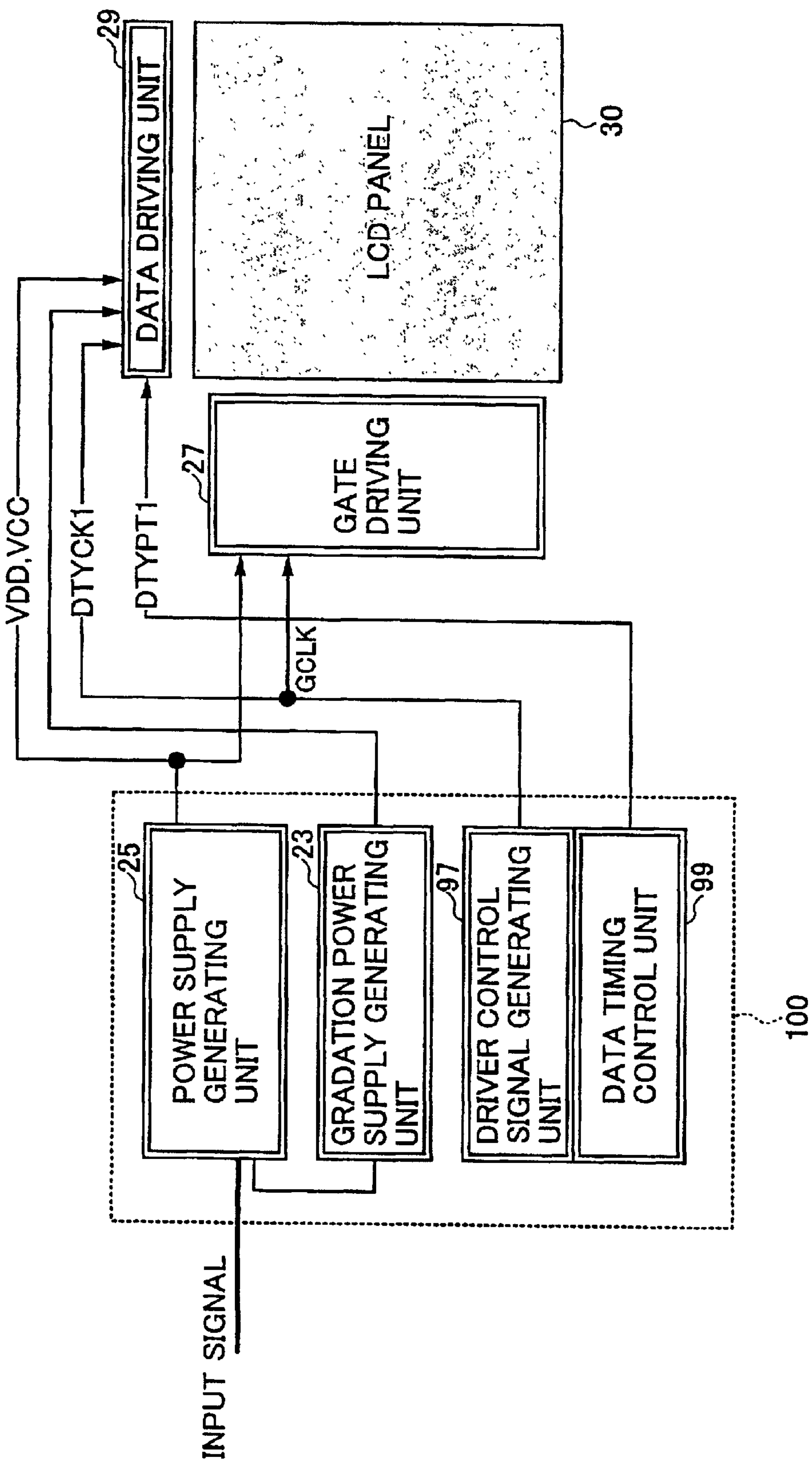
FIG. 26 shows the configuration of the liquid crystal display apparatus concerning the third embodiment of the present invention.

FIG. 26 is a block diagram showing the configuration of the liquid crystal display apparatus of the third embodiment of the present invention. As shown in FIG. 26, the liquid crystal display apparatus of the third embodiment includes the gate driving unit 27, the data driving unit 29, the liquid crystal panel 30, and a control unit 100. Here, the gate driving unit 27 and the data driving unit 29 are connected to the control unit 100, and the liquid crystal panel 30 is connected to the gate driving unit 27 and the data driving unit 29.

Further, the control unit 100 includes a gradation power supply generating unit 23, a power supply generating unit 25, a driver control signal generating unit 97, and a data timing control unit 99. In addition, the driver control signal generating unit 97 generates signals for driving the gate driving units 27 and the data driving unit 29, such as a gate clock GCLK and a data clock. Further, the data timing control unit 99 synchronizes the data with the data clock generated by the driver control signal generating unit 97.

Figure 27:
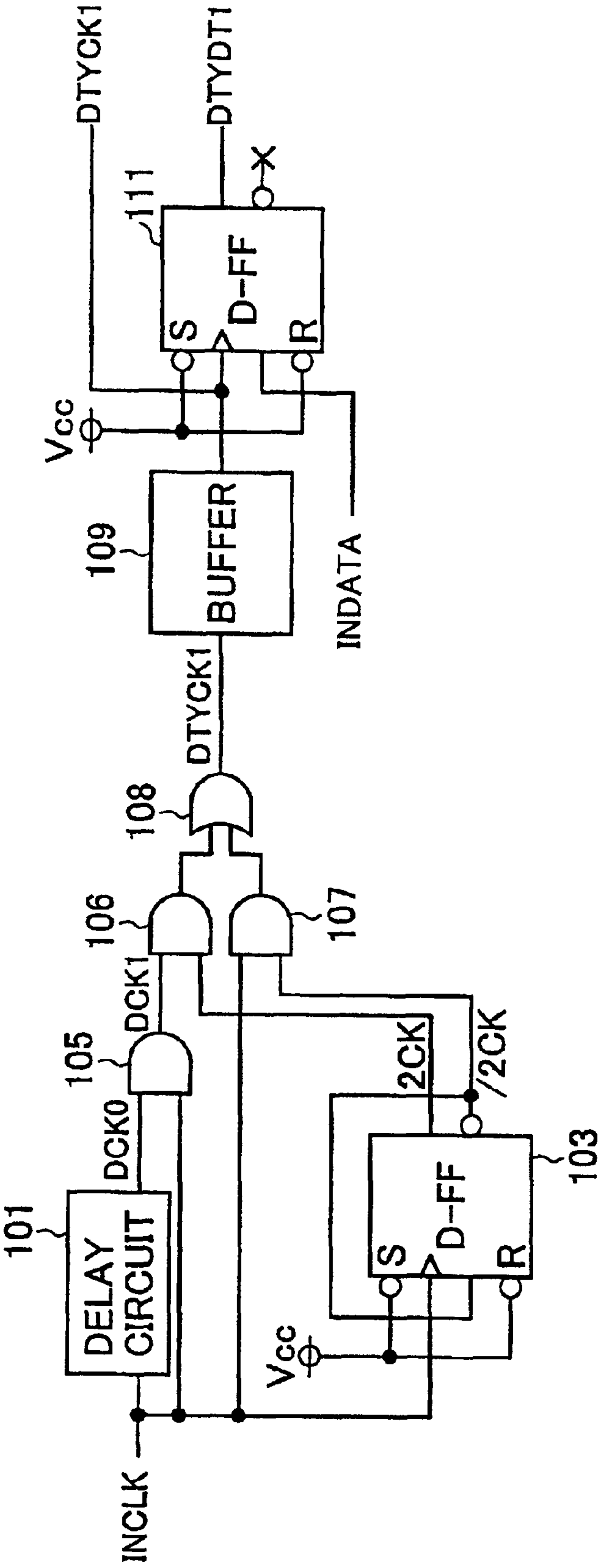
FIG. 27 shows the configuration of the circuit included in the control unit shown in FIG. 26.

FIG. 27 shows the configuration of the circuit included in the driver control signal generating unit 97 and the data timing control unit 99 which were shown in FIG. 26. This circuit is equipped with a delay circuit 101, delay flip flop circuits 103 and 111, AND circuits 105–107, an OR circuit 108, and a buffer 109 as shown in FIG. 27. In addition, a clock signal INCLK is supplied to the delay circuit 101 and the delay flip flop 103 from outside of the liquid crystal display apparatus. Further, a clock signal DCK0 outputted from the delay circuit 101 and the clock signal INCLK are supplied to the AND circuit 105. To the AND circuit 106, the clock signal DCK1 outputted from the AND circuit 105 and a clock signal 2CK outputted from the delay flip flop 103 are supplied. Further, to the AND circuit 107, the clock signal INCLK and the inverted clock signal /2CK outputted from the delay flip flop 103 are supplied.

In addition, two signals outputted from the AND circuits 106 and 107 are supplied to the OR circuit 108, where a logical sum is calculated and the duty clock signal DTYCK1 is generated. The duty clock signal DTYCK1 is buffered by the buffer 109. Further, the signal outputted from the buffer 109 and the signal INDATA supplied from the outside of the liquid crystal display apparatus are inputted to the delay flip flop 111, and the duty data signal DTYDT1 is generated.

Figure 28:
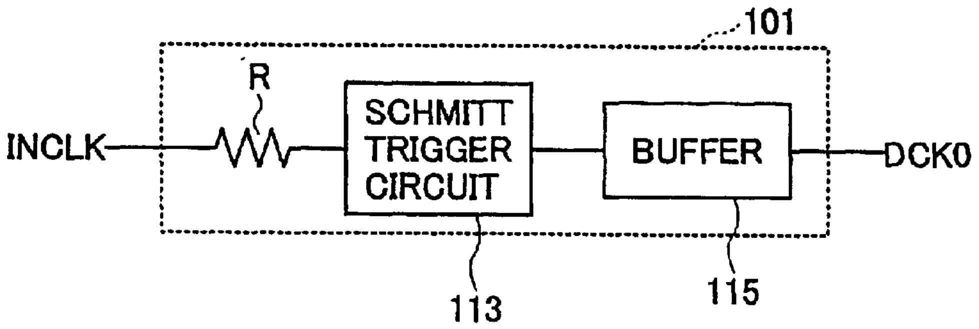
FIG. 28 shows the first example of configuration of the delay circuit shown in FIG. 27.
Figure 29:
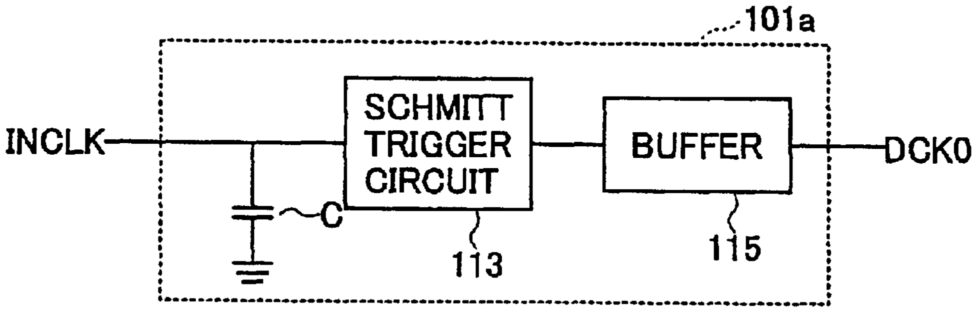
FIG. 29 shows the second configuration of the delay circuit shown in FIG. 27.
Figure 30:
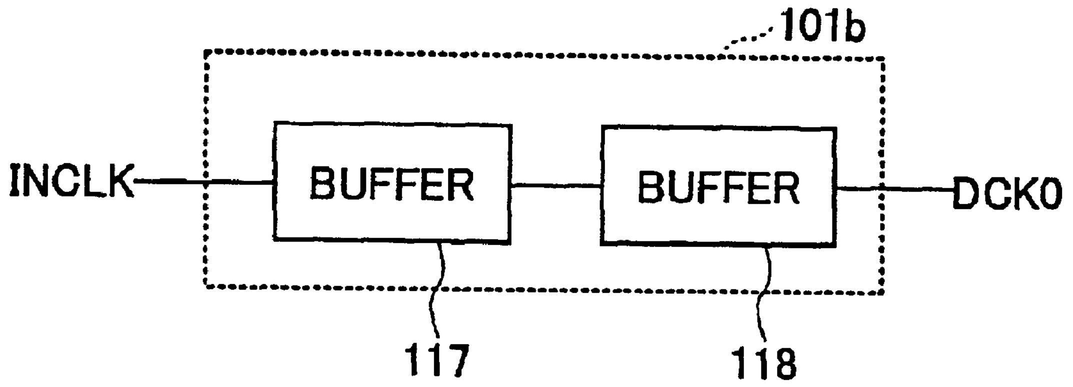
FIG. 30 shows the third configuration of the delay circuit shown in FIG. 27.

Here, the delay circuit 101 shown in FIG. 27 may include a resistor R, a Schmitt trigger circuit 113, and a buffer 115 connected in series as shown in FIG. 28. Further, the delay circuit 101 may employ a delay circuit 101*a* which has a capacitor C with one electrode thereof grounded as shown in FIG. 29 instead of the resistor R. The waveform of the clock signal INCLK inputted is made blunt by the above-mentioned resistor R and capacitor C. Further, the above-mentioned delay circuit 101 can also be replaced by a delay circuit 101*b* that includes a buffer 117 with a voltage level lower than the clock signal INCLK inputted, and buffer 118 which converts the level of the inputted signal to the same voltage level as the clock signal INCLK, connected in series as shown in FIG. 30.

Figure 31:
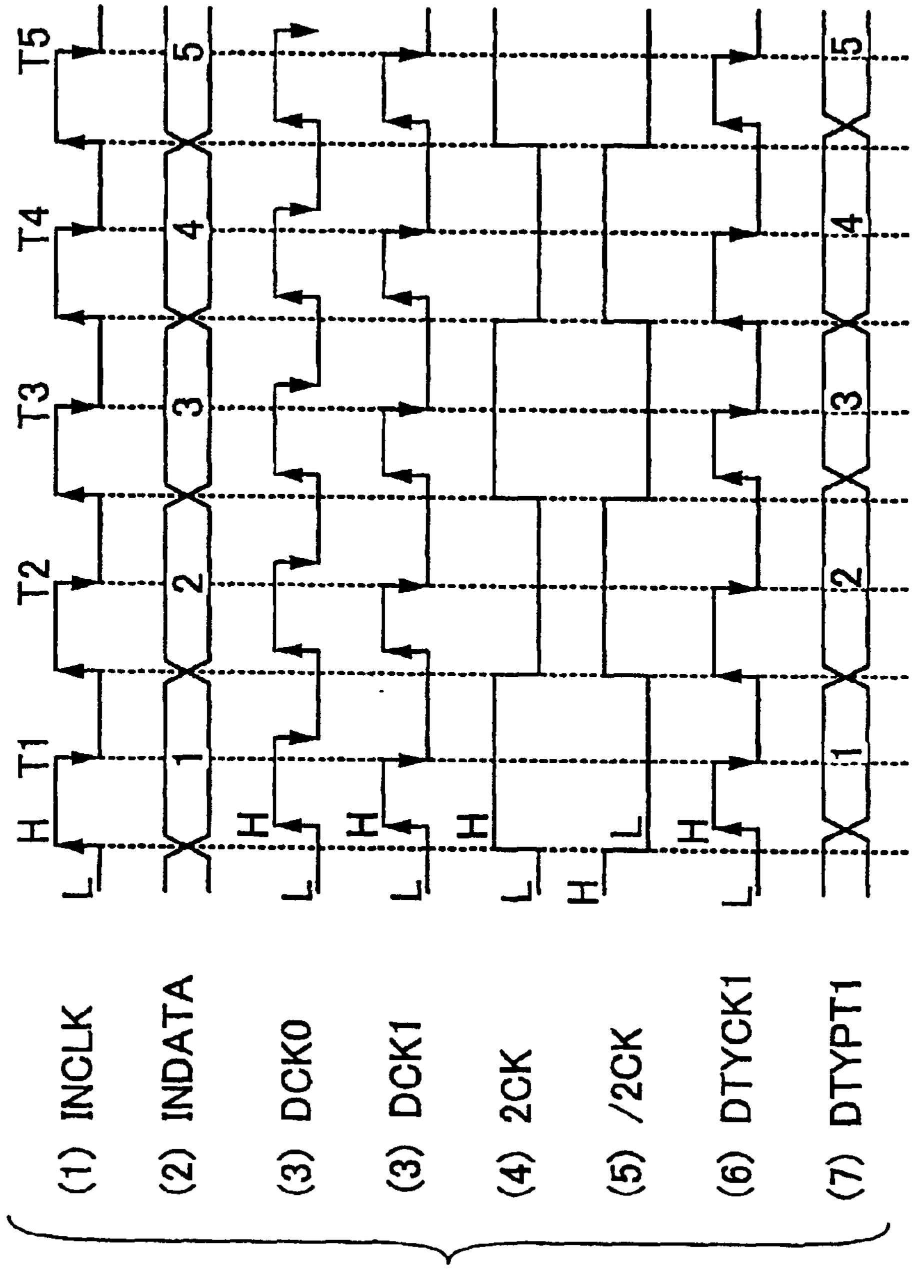
FIG. 31 is a timing chart showing operation of the circuit shown in FIG. 27.

In the following, operation of the circuit shown in FIG. 27 will be described with reference to the timing chart of FIG. 31. First, the clock signal DCK0 is generated by the delay circuit 101 that gives a predetermined time delay to the clock signal INCLK inputted into the liquid crystal display apparatus from the exterior as shown in FIG. 31-(1) and FIG. 31-(3). Further, the AND circuit 105 calculates a logical product of the clock signal INCLK shown in FIG. 31-(1) and the clock signal DCK0 shown in FIG. 31-(3), and generates the clock signal DCK1 shown in FIG. 31-(3). Here, the clock signal DCK1 is same as the clock signal INCLK shown in FIG. 31-(1) except for the delayed rising edge, a change from the low level (L) to the high level (H).

On the other hand, the clock signal 2CK is generated by the delay flip flop 103 as shown in FIG. 31-(4) and FIG. 31-(5). The logic level of the signal changes at every rising edge timing of the clock signal INCLK shown in FIG. 31-(1), and this signal turns into a clock signal which has a cycle that is twice the clock signal INCLK. In addition, the inverted clock signal /2CK shown in FIG. 31-(5) which is an inversion of the clock signal 2CK inverted by the delay flip flop 103 is generated.

In addition, the AND circuit 106 calculates the logical product of the clock signal DCK1 shown in FIG. 31-(3), and clock signal 2CK shown in FIG. 31-(4). The AND circuit 107 calculates a logical product of the clock signal INCLK shown in FIG. 31-(1) and the inverted clock signal /2CK shown in FIG. 31-(5).

In this manner, the duty clock signal DTYCK1 shown in FIG. 31-(6) is generated by the OR circuit 108. That is, the duty ratio of this duty clock signal DTYCK1 varies for every clock, repeating an alternation between the clock signal DCK1 shown in FIG. 31-(3) and the clock signal INCLK shown in FIG. 31-(1).

Further, the delay flip flop 111 delays the above-mentioned data signal INDATA according to the duty clock signal DTYCK1, and generates and outputs a duty data signal DTYDT1 shown in FIG. 31-(7). Here, this duty data signal DTYDT1 is made to synchronize with the so-called rising edge timing of the duty clock signal DTYCK1, as shown in FIG. 31-(6) and FIG. 31-(7).

Further, the above-mentioned duty clock signal DTYCK1 and the duty data signal DTYDT1 are supplied to the data driving unit 29 shown in FIG. 26. At this time, each data driver included in the data driving unit 29 takes in the duty data signal DTYDT1 at the times T1–T5, respectively, at which the duty clock signal DTYCK1 changes its status from the high level to the low level.

Although the case where the clock signal INCLK was given the predetermined time delay by the delay circuit 101 shown in FIG. 27 has been described in the above, the clock signal INCLK may be delayed in parallel by two or more delay devices that have different delay constants, and the two or more delayed duty clock signals that have been generated with different phases may be supplied to the AND circuit 105 alternately at every arbitrary time.

As mentioned above, according to the liquid crystal display apparatus of the third embodiment of the present invention, the clock signal which has a delayed rising edge in comparison with the clock signal INCLK supplied from the outside of the liquid crystal display apparatus is generated and supplied to the data driver, enabling the data driver to take in data by the duty clock signal DTYCK1 which synchronizes with the clock signal INCLK and the data signal, and to scatter the harmonics generated, lowering the peak of EMI.

Fourth Embodiment

Figure 6:
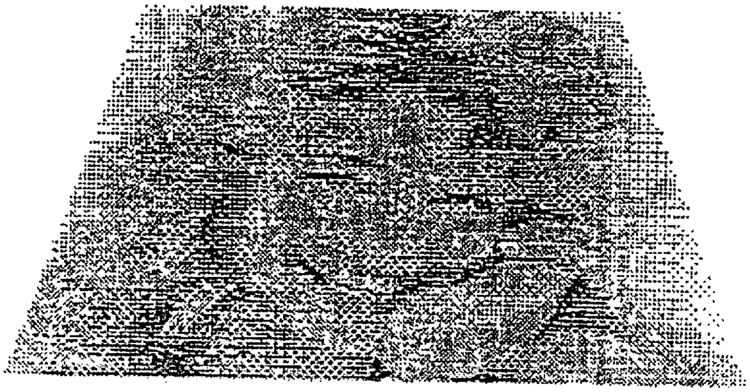
FIG. 6 describes the problem of the liquid crystal display apparatus shown in FIG. 3.

In the display of a middle tone, a problem is that the whole picture becomes white and contrast falls, as shown in FIG. 6. The problem has turned out to be peculiar to an MVA type liquid crystal display apparatus or a liquid crystal panel with divided orientation.

Figure 32:
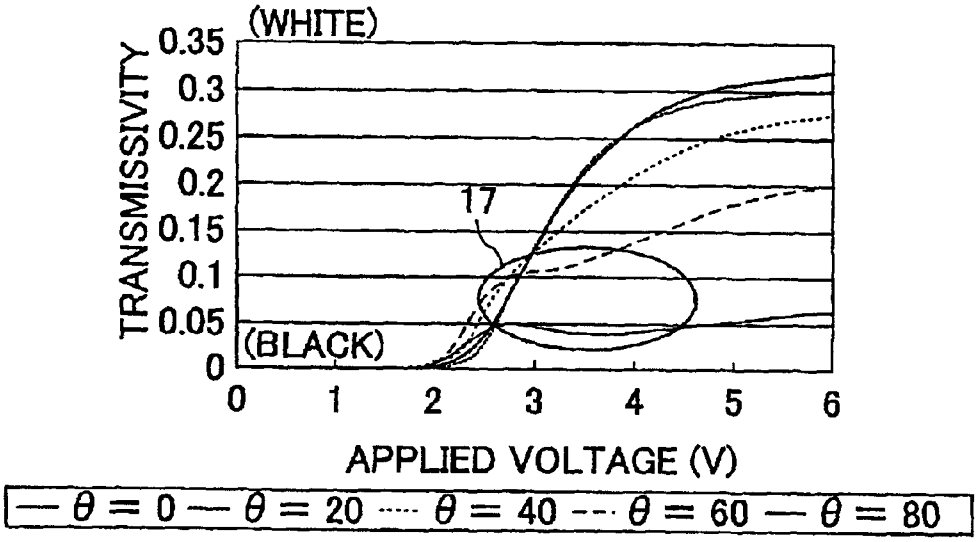
FIG. 32 is a graph showing the T-V characteristics of the conventional MVA type liquid crystal display apparatus.

Here, FIG. 32 shows the T-V characteristics (applied voltage dependability of transmissivity) in a lower viewing-angle direction (a liquid crystal molecule responds so that it may incline in the four directions of the upper right, the lower right, the upper left, and the lower left) of an MVA type liquid crystal panel. Although the T-V characteristic surges at the portion 17 corresponding to a middle tone as shown in FIG. 32, it is because the effective birefringence index of the liquid crystal molecule which inclines in the direction of a viewer who observes the liquid crystal panel becomes small.

Figure 5:
FIG. 5 shows an example of the front view of a picture displayed by the liquid crystal display apparatus shown in FIG. 3.
Figure 33:
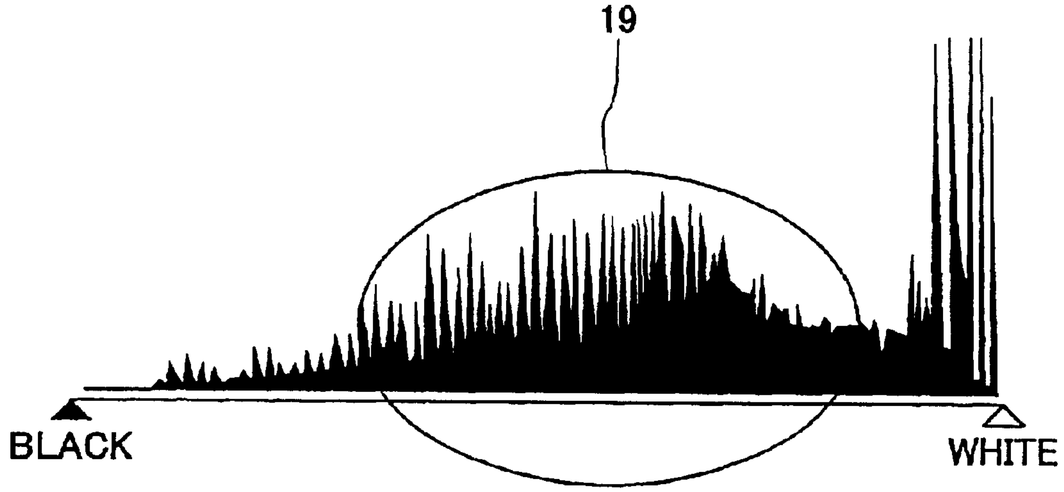
FIG. 33 is a graph showing the gradation and luminosity histogram of a picture whose viewing angle characteristic problem becomes remarkable among pictures displayed on the conventional MVA type liquid crystal display apparatus.

On the other hand, FIG. 33 is a histogram showing the relation between the gradation and the number of dots within the display area of the picture shown in FIG. 5, which is a typical picture that becomes white. While there are not so many gradations near black as shown in FIG. 33, there are many dots in the portion 19 indicative of middle gradation. It is conceived that because the middle gradation area that occupies a large proportion in the number of dots surges as shown by the portion 17 in FIG. 32, the contrast among middle tones largely falls, making the picture appear light and whitish.

Figure 35:
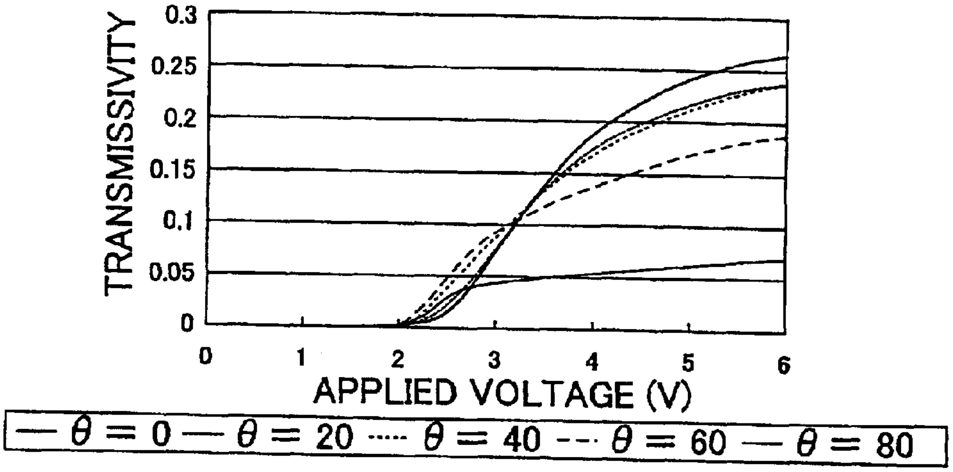
FIG. 35 is the first graph showing the dependability on product $\Delta n$ d of the T-V characteristics in the conventional MVA type liquid crystal display apparatus.
Figure 36:
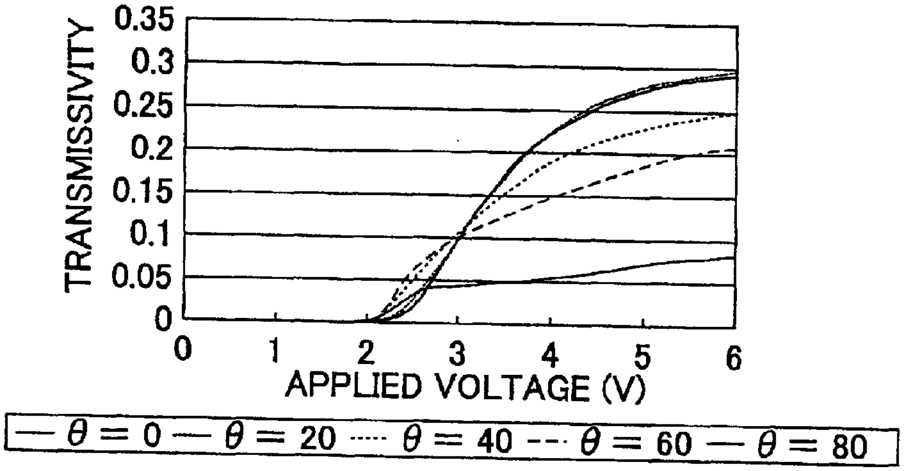
FIG. 36 is the second graph showing the dependability on product $\Delta n$ d of the T-V characteristics in the conventional MVA type liquid crystal display apparatus.
Figure 37:
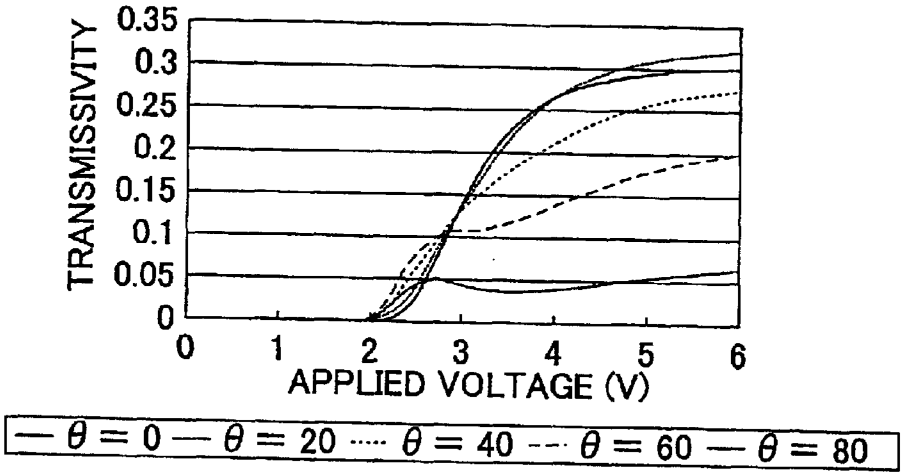
FIG. 37 is the third graph showing the dependability on product $\Delta n$ d of the T-V characteristics in the conventional MVA type liquid crystal display apparatus.

Here, the T-V characteristics for the front and the lower viewing angles are given in FIGS. 35 through FIG. 37 for different products of Δn representing the anisotropy of the refractive index of a liquid crystal panel, and d representing the thickness (cell thickness) of a liquid crystal cell at 245 nm, 287 nm, or 345 nm. Here, the above-mentioned anisotropy of the refractive index Δn means (n1−n2), where n1 represents the refractive index ingredient in a longitudinal axis of a liquid crystal molecule, and n2 represents the refractive index ingredient in the perpendicular axis of the longitudinal axis of the liquid crystal molecule.

In other words, FIGS. 35, 36 and 37 show the T-V characteristics for the cell thickness of 3 μm, 3.5 μm and 4.2 μm, respectively, when the above mentioned refractive index anisotropy is set at 0.082.

Here, when the cell thickness is 3 μm, the T-V characteristics are almost monotonous as shown in FIG. 35. On the other hand, when the cell thickness is 4.2 μm, the T-V characteristics in the middle tone range surge for the viewing angles 60 degrees and 80 degrees as shown in FIG. 37. Further, as shown in FIG. 36, the case with the cell thickness of 3.5 μm positions between the case with the cell thickness 3 μm as shown in FIG. 35 and the case with the cell thickness of 4.2 μm as shown in FIG. 37.

From above, it is understood that the larger the product of the refractive index anisotropy Δn of the liquid crystal panel and the cell thickness d, the larger the surge of the T-V characteristics, causing the above picture to tend to produce a whitish appearance.

Figure 34:
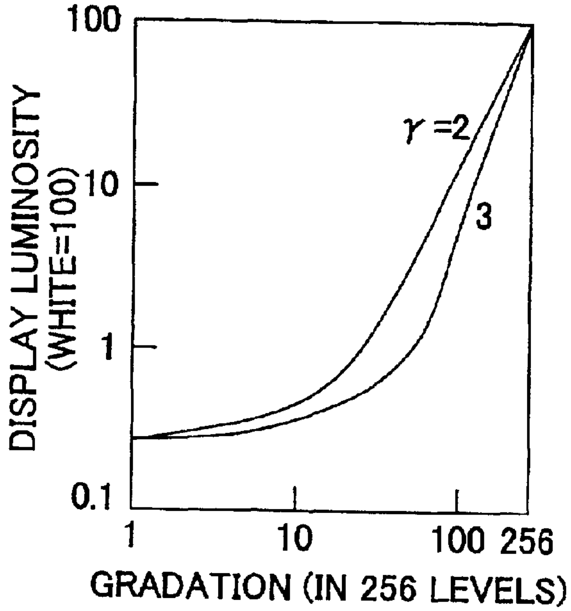
FIG. 34 is a graph describing the definition of the gradation-luminosity characteristic $\gamma$.

Therefore, in the fourth embodiment of the present invention, the larger the product of the refractive index anisotropy Δn of the liquid crystal panel and the cell thickness d, the larger γ value in the T-V characteristics is employed. FIG. 34 is a graph showing gradation vs. luminosity characteristics where the luminosity is taken for the vertical axis (in the log scale) with the white color defined as 100 and the gradations are taken for the horizontal axis (in the log scale). In this graph, the γ value is defined as the inclination of the graph in the high gradation area. In FIG. 34, graphs are shown for the γ value of 2 and 3, respectively.

In the liquid crystal display apparatus applied to the fourth embodiment of the present invention here, the γ value is set up so that the following conditions (1) are satisfied.

$$\gamma=\Delta n\ d(\text{in nm})\times 0.008\pm 30\%\text{ and }\gamma>1.9 \quad (1)$$

And more specifically, when the product Δn d of a liquid crystal panel was set at 280 nm, the γ value was set at between 2.0 and 2.3, and when the product Δn d of and a liquid crystal panel was set at 345 nm, the γ value was set at between 2.15 and 3, with an adjustment of about ±30% as appropriate.

In the following, the principle of the liquid crystal display apparatus applied to the fourth embodiment of the present invention will be described. If a large value is set up as the γ value, the display luminosity in a high gradation will become a low value as compared with the highest luminosity. For example, the display luminosity of the 100th gradation will be about 15% ($100\times(100/256)^2\approx 15.2$) of the maximum white luminosity when the γ value is 2 as shown in FIG. 34. In contrast, the same will be about 6% ($100\times(100/256)^3\approx 5.96$), when the γ is 3. It means that the larger the γ becomes, the smaller the luminosity to display the same gradation will become. Consequently, the applied voltage to the liquid crystal panel will become a low value relatively. That is, a relatively lower voltage will be applied when the γ value is higher in displaying a certain picture.

In the liquid crystal display apparatus of the fourth embodiment, when the product Δn d in a liquid crystal panel has a big value relatively, the γ value is set at a large value. As mentioned above, this is equivalent to displaying a picture at a relatively low driving voltage, when the product Δn d is a large value.

And when the γ value is set up as mentioned above, a middle tone will be displayed on driving voltages lower than the driving voltage at which the T-V characteristics in the vertical and horizontal viewing angles surge in the T-V characteristics shown in FIG. 32. In this case, the T-V characteristics in the four-direction viewing angles in the display area are such that the luminosity changes corresponding to changes in voltage in the all cases, thereby suppressing the deterioration in the contrast in slanted viewing angles for a middle tone. Therefore, in the liquid crystal display apparatus of the fourth embodiment, the monochrome contrast and the white luminosity are maintained.

Furthermore, while avoiding black crushing by assigning gradations finely to the middle tones on the black side, the contrast of the middle tones on the white side can also be maintained by using only the middle tone on the black side before the T-V characteristics begins to surge as the middle tones. In addition, each color will be emphasized such that reddish skin color will be more reddish, bluish color will become more bluish, and green tree leaves will be presented greener.

By the way, in the liquid crystal display apparatus of the fourth embodiment, when a γ value is selected, it is important to set it at 2 as the actual γ value itself in accordance with a CRT. Here, if the γ value is set at 2 for an MVA type LCD (liquid crystal display apparatus) that is designed for a larger γ value to realize a bright display, pictures will become unbearably whitish in all of the viewing angles. If an MVA type LCD with a smaller product of Δn d, a natural color display can be realized for front viewing by setting the γ value at about 2.

Figure 38:
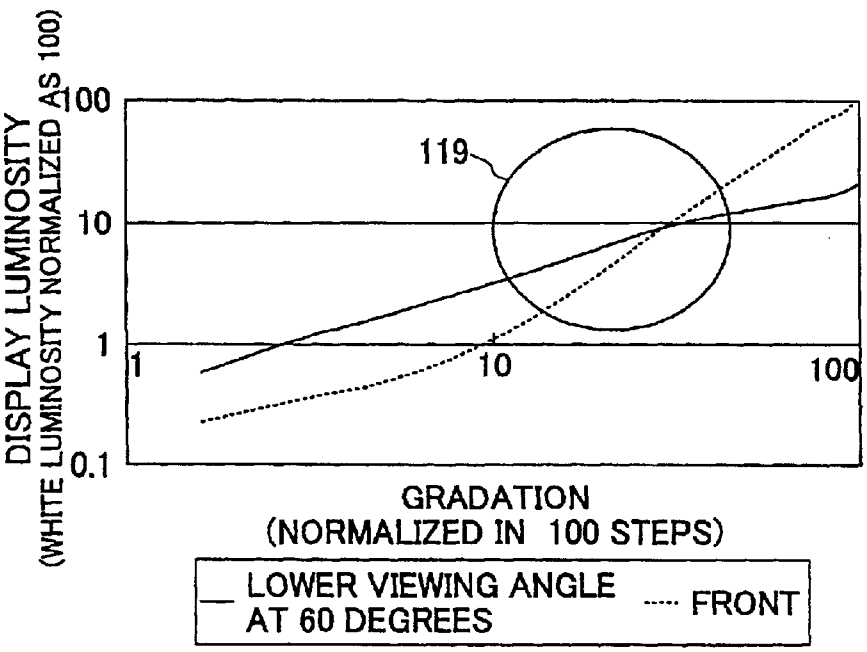
FIG. 38 is the first graph describing the gradation-luminosity characteristics of the liquid crystal display apparatus concerning the fourth embodiment of the present invention.
Figure 39:
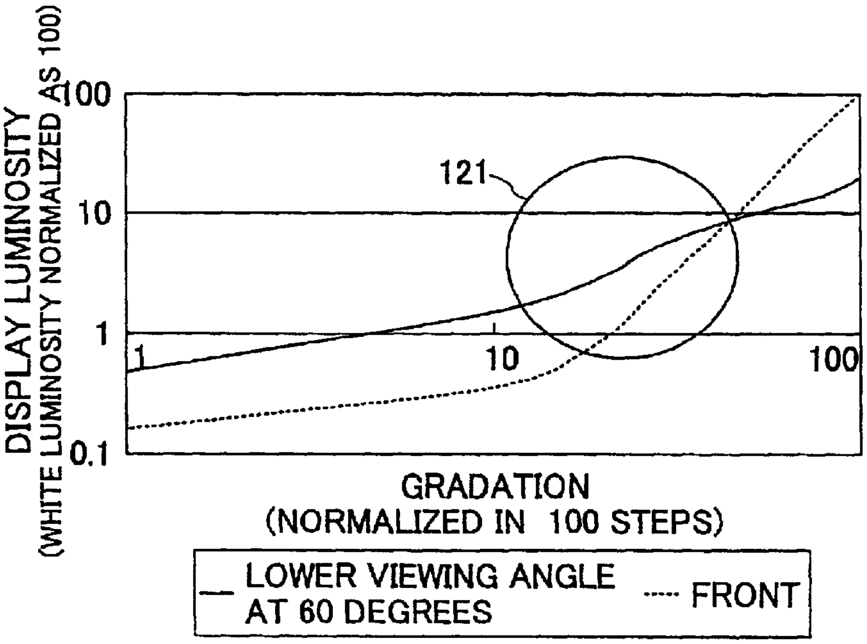
FIG. 39 is the second graph describing the gradation-luminosity characteristics of the liquid crystal display apparatus concerning the fourth embodiment of the present invention.

FIG. 38 and FIG. 39 are graphs showing simulation results of the gradation-luminosity characteristics when actually adjusting the γ value. Here, the vertical log axis represents luminosity with a luminosity of the white color normalized at 100, and the horizontal log axis represents the gradation with the maximum gradation normalized at 100, respectively. Further, the solid line represents the gradation-luminosity characteristics for a viewing angle of 60 degrees below the horizon, and the dashed line represents these characteristics for a front viewing, respectively. In this simulation, a 4-division panel of the MVA type LCD was assumed.

FIG. 38 shows these characteristics in case the γ value is set at 2, where the change in the luminosity corresponding to the change in the gradation is small in the middle tone indicated as a portion 119. This is because a portion in which the T-V characteristics surge is mainly used for middle tones. On the other hand, characteristics with the γ value set at about 3 are shown in FIG. 39, where the luminosity increases corresponding to an increase in gradation with a predetermined inclination as shown in a portion 121 in the middle tone range. Further, this is because the portion having the surge in the T-V characteristics is set more on the higher gradation side.

Further, as mentioned above, it is important to set the γ value at about 2 in order to realize a natural tone of the display when viewed in the front. From this, it is important that the γ value is set at between 2.2 and 3 for an MVA type LCD of the present, in which the product Δn d is 345 nm, and the γ value is set about 2 or 2.2 for LCDs with the product Δn d of such as around 280 nm.

Figure 40:
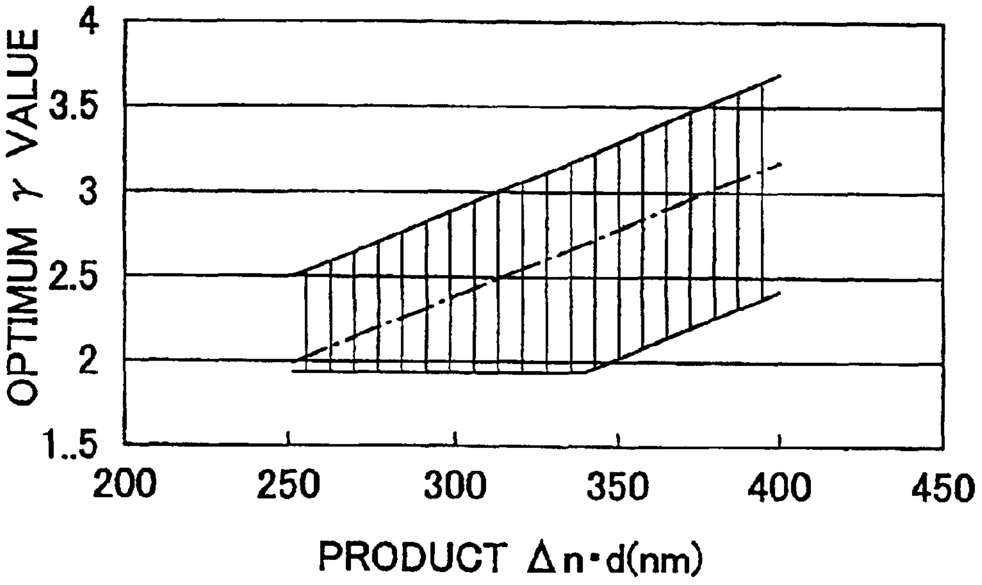
FIG. 40 is the third graph describing the gradation-luminosity characteristics of the liquid crystal display apparatus concerning the fourth embodiment of the present invention.

In addition, FIG. 40 shows results that were verified comparing actual displays. In addition, the vertical axis expresses an optimal γ value and the horizontal axis expresses a product Δn d (nm) of the liquid crystal panel. Here, as shown in FIG. 40, the displayed picture quality was satisfactory in the vertically hashed area that satisfies the condition (1) presented in above, and further the best picture quality was obtained at points that make up the dash-dot-dash line shown in FIG. 40.

Generally, when the γ value is set up at a big value, the tendency is that pictures are displayed clearer at the expense of natural appearance; therefore, alteration or adjustment should be made according to a use and an individual preference.

Figure 41:
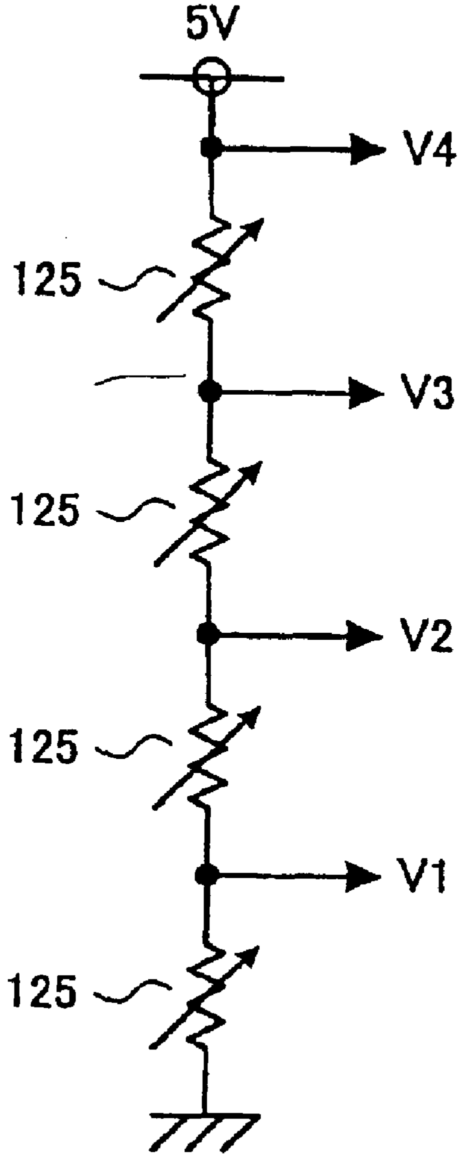
FIG. 41 describes how to adjust the gradation-luminosity characteristic $\gamma$ of the liquid crystal display apparatus concerning the fourth embodiment of the present invention.

The adjustment of the γ value in the above can be realized by two or more variable resistors 125 connected in series between the 5V power supply node and the grounding node as shown in FIG. 41, thereby changing those resistance values to adjust each gradation voltage V1–V4 supplied to a data driver as adequate.

As mentioned above, according to the liquid crystal display apparatus of the fourth embodiment of the present invention, a display and the viewing-angle characteristics of an MVA type LCD are improvable. Especially, when product Δn d is large, satisfactory view angle characteristics can be realized, and an MVA type liquid crystal display apparatus with more high display luminosity can be realized as the result thereof.

Fifth Embodiment

The liquid crystal display apparatus of the fifth embodiment of the present invention solves the problem described in the implementation of the fourth embodiment described above, i.e., the problem that the whole picture becomes white in displaying middle tones, and contrast falls.

Figure 42:
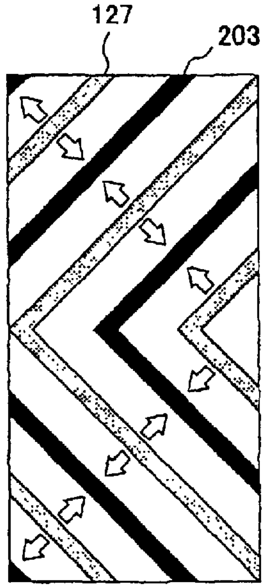
FIG. 42 is a plane view showing the layout of the display area of the conventional MVA type liquid crystal display apparatus.

FIG. 42 is a plane view showing the layout of the display area in the conventional MVA type liquid crystal display apparatus. As shown in FIG. 42, the display area in the conventional MVA type liquid crystal display apparatus includes a bank-shaped dielectric structure 127 formed on a pixel electrode substrate arranged in a deeper position (deeper in the z-axis) of FIG. 42, and a dielectric structure 203 formed on a common electrode substrate arranged in a front position (shallower in the z-axis) of FIG. 42. The two elements are installed so that the image (line) becomes alternating and in a predetermined interval when it is right-projected on the same plane. In addition, the above-mentioned lines are parallel lines running from the upper right to the lower left in the upper half of the display area, and from the upper left to the lower right in the lower half as shown in FIG. 42. In addition, the line running directions may be reversed in the upper and the lower halves of the display area mentioned above.

In addition, in the display area that has the above structure, liquid crystal molecules are oriented to the direction shown by the arrows.

Here, the structure of the display area in the liquid crystal display apparatus of the fifth embodiment is such that a ratio of the area where the liquid crystal molecules are reversed for an upper viewing angle is reduced. That is, the area in which the liquid crystal molecules are oriented upward is made smaller, and the area in which they are oriented downward is made larger.

Figure 48:
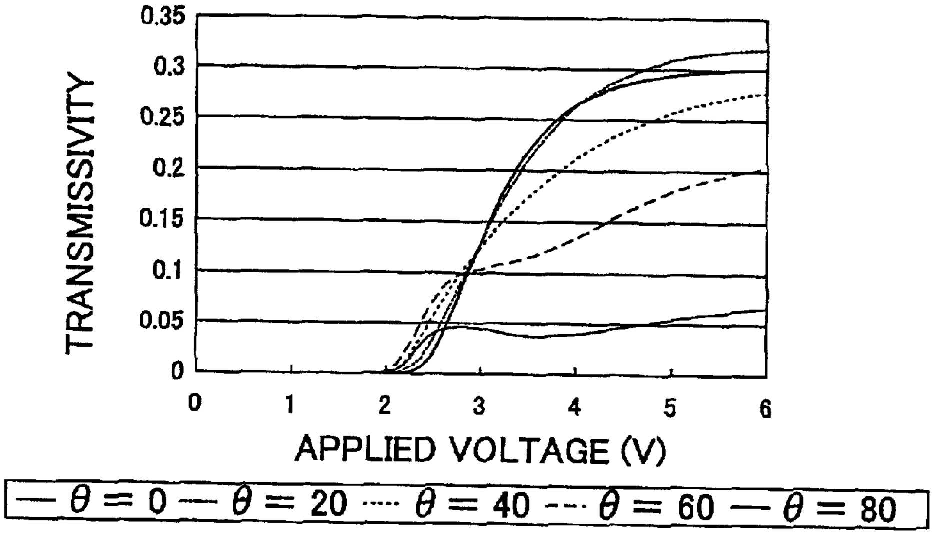
FIG. 48 is a graph showing the T-V characteristics in the conventional liquid crystal display apparatus shown in FIG. 42 and FIG. 44.
Figure 49:
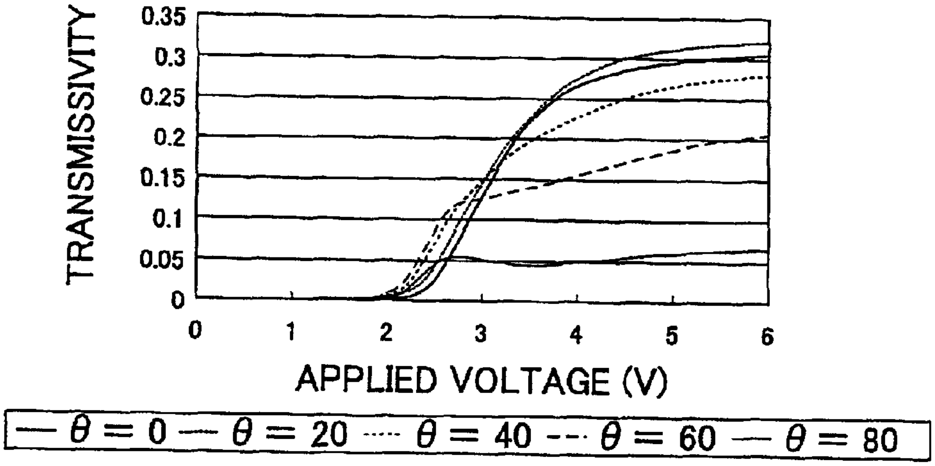
FIG. 49 is the first graph showing the T-V characteristics of the liquid crystal display apparatus concerning the fifth embodiment of the present invention.
Figure 50:
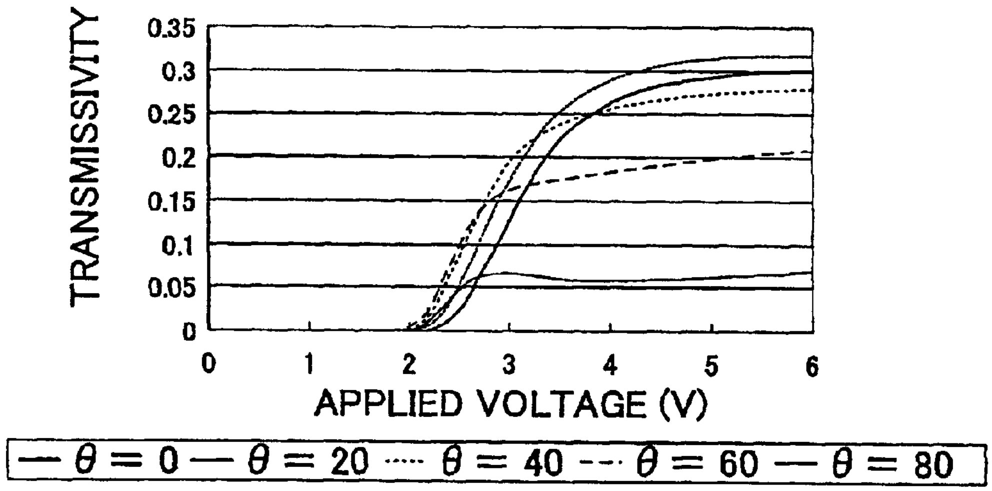
FIG. 50 is the second graph showing the T-V characteristics of the liquid crystal display apparatus concerning the fifth embodiment of the present invention.

FIG. 48 shows simulated T-V characteristics of a liquid crystal display apparatus in which the area ratio of the area where the liquid crystal molecules incline right-upward or left-upward (reversal area) to the area where they incline right-downward or left-downward (non-reversal area)is set to 1:1 in the conventional MVA type LCD. FIG. 49 shows simulated T-V characteristics of a liquid crystal display apparatus that the above-mentioned ratio is set to 1:1.5, and FIG. 50 shows simulated T-V characteristics of a liquid crystal display apparatus that the above-mentioned ratio is set to 1:4.

Figure 43:
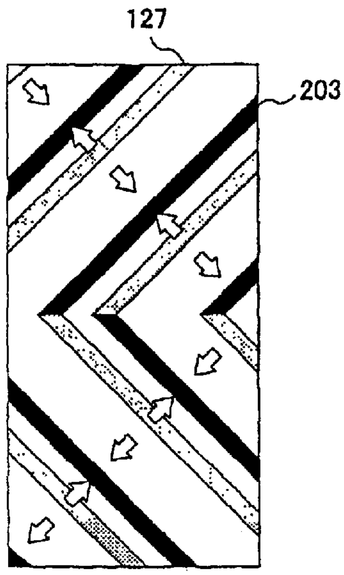
FIG. 43 is a plane view showing the layout of the display area in the liquid crystal display apparatus concerning the fifth embodiment of the present invention.

To increase the area where the liquid crystal molecules incline right-downward or left-downward in the drawing above, the intervals of the dielectric structures 127 and 203 are changed alternately so that the area where the liquid crystal molecule lean to right-downward is made the larger and the area where the liquid crystal lean to right-upward is made the smaller in the upper half of the display area as shown in FIG. 43. Further, in the lower half of the display area, the intervals of the dielectric structures 127 and 203 are changed alternately so that the area where the liquid crystal molecules lean to left-downward is made the larger and the area where the liquid crystal molecules lean to right-upward is made the smaller. While in the conventional display area shown in FIG. 42, each of the dielectric structure 127 and 203 has been formed contiguously for the upper and lower half areas, the both halves of the display area in the fifth embodiment are formed discretely as shown in FIG. 43.

There will be a higher tendency for contrast to fall in lower viewing angles according to the layout as shown in FIG. 43. However, when a monitor is usually placed on a desk, viewing the monitor from the lower viewing angles will be rare. On the other hand, it is higher likely that the monitor may be viewed from upper viewing angles by a person standing, wherein a picture display with no degradation in contrast can be provided.

As shown in FIG. 48, the T-V characteristic waves as the viewing angle is enlarged in the conventional MVA type LCD. The waving of this T-V characteristic causes reduction in the contrast of the picture displayed as mentioned above. The liquid crystal molecules which incline to the upper right or the upper left are the cause of the wave in the above T-V characteristics. When the ratio of these molecules is reduced, the extensiveness of the waving becomes less as shown in FIG. 49 (when the ratio of the area where liquid crystal molecules incline upward on the drawing, and the are where they incline to downward is 2:3), and FIG. 50 (when the ratio of the area where liquid crystal molecules incline upward on the drawing, and the area where they incline downward is 1:4). This is because the characteristics of the liquid crystal molecules which incline to the lower right or the lower left show up preferentially.

Figure 44:
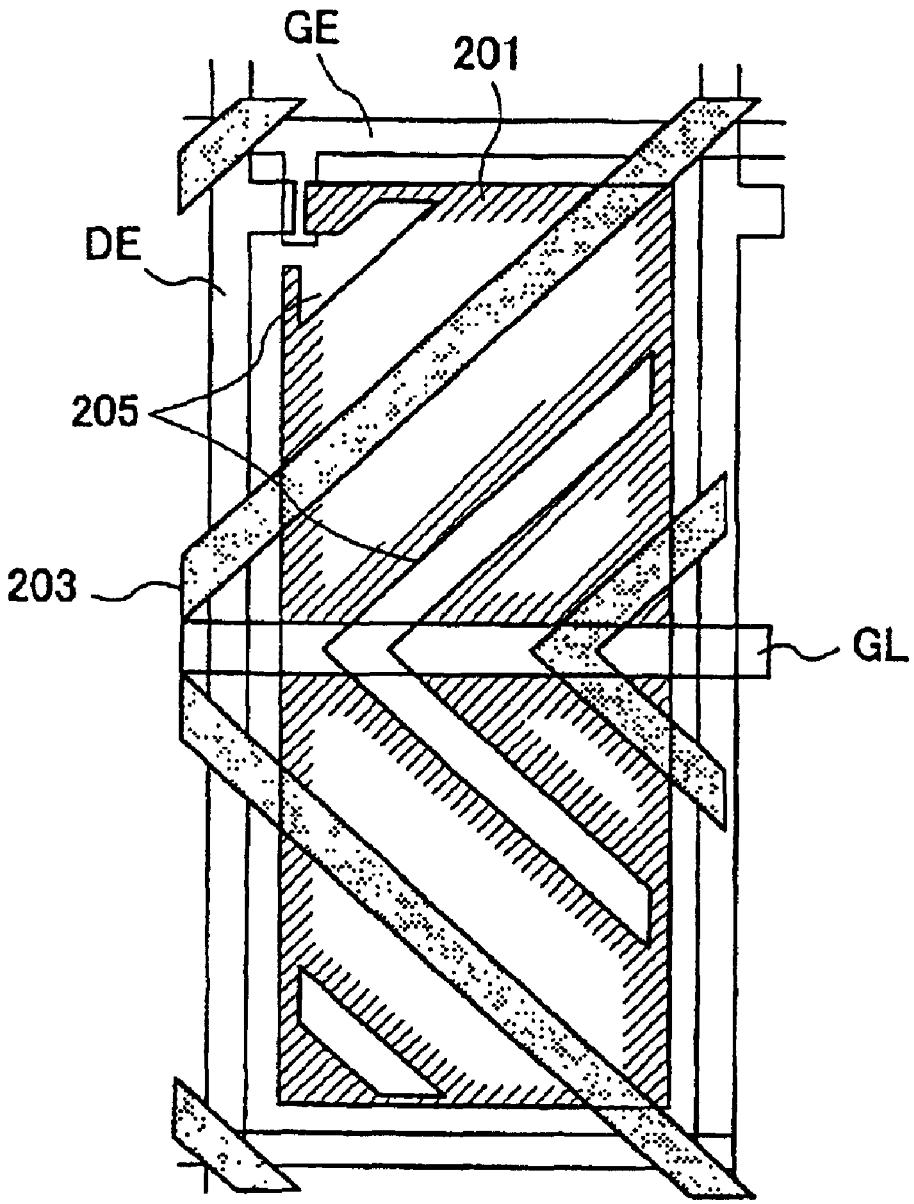
FIG. 44 is a plane view showing the layout of the display area in the conventional MVA type liquid crystal display apparatus.

In the following, the case where the present invention is applied to an MVA type liquid crystal display apparatus will be described. FIG. 44 is a plane view showing the layout of the display area in the conventional MVA type liquid crystal display apparatus. As shown in FIG. 44, an ITO pixel electrode 201, a data electrode DE which transmits a data signal to the ITO pixel electrode 201, a gate electrode GE which constitutes a TFT gate, an auxiliary capacity electrode GL for forming an auxiliary capacitance and a slit 205 are formed on the TFT substrate which constitutes the conventional MVA type liquid crystal display apparatus.

On the other hand, a bank-like dielectric structure 203 is formed on the opposite substrate (it is also called a common electrode substrate or CF substrate) which faces the TFT substrate described above. In addition, the same effect can be obtained by forming a slit instead of this dielectric structure 203.

Figure 45:
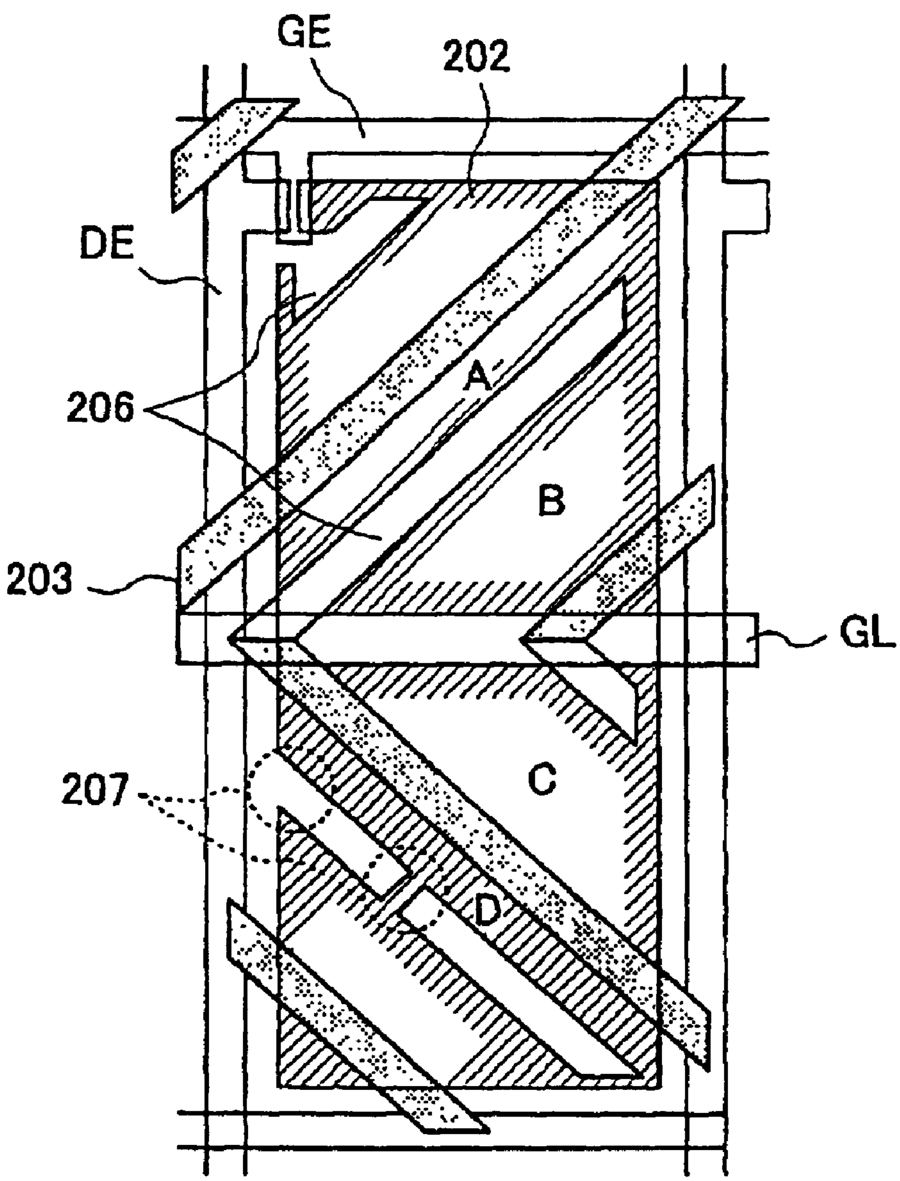
FIG. 45 is a plane view showing the example of the layout of the display area in the liquid crystal display apparatus concerning the fifth embodiment of the present invention.
Figure 47:
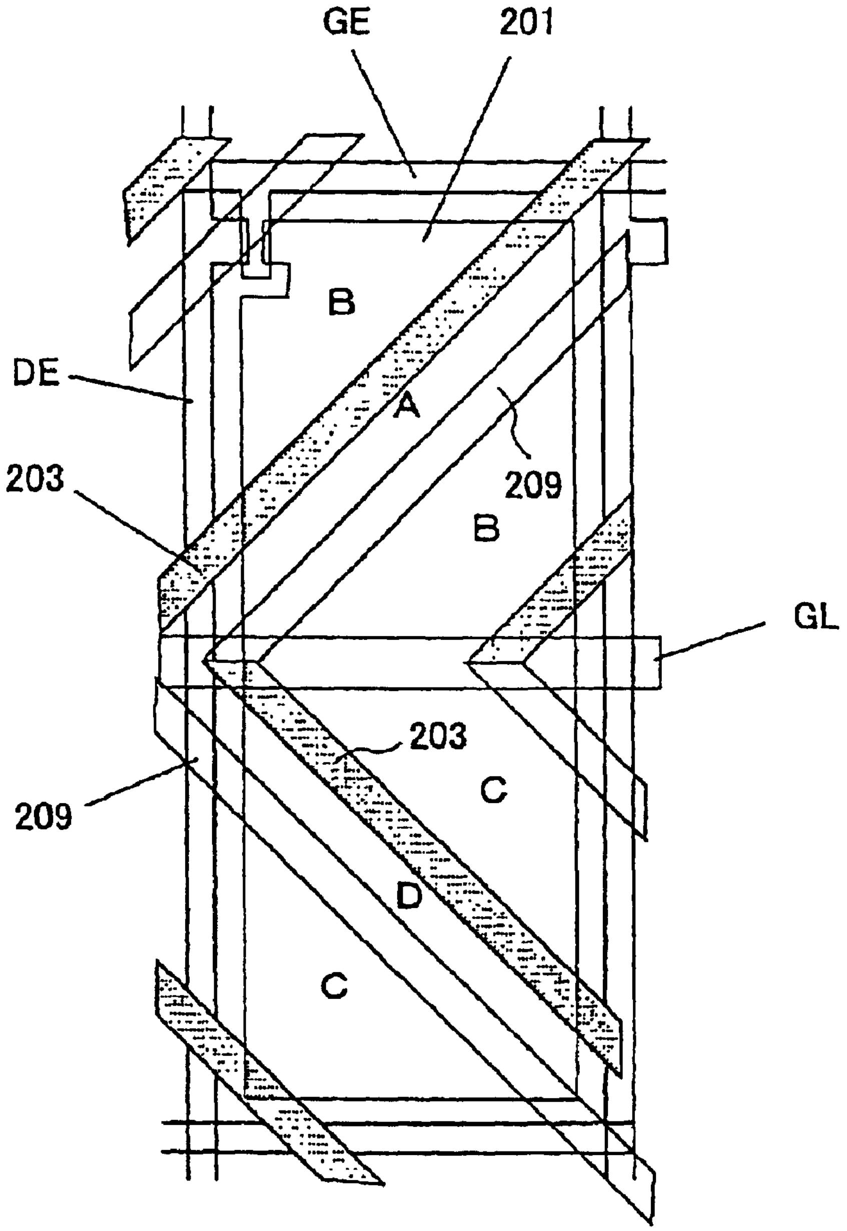
FIG. 47 is a plane view showing a further another example of the layout of the display area in the liquid crystal display apparatus concerning the fifth embodiment of the present invention.

Conversely, in the display area of the liquid crystal display apparatus of the fifth embodiment, as shown in FIG. 45, a slit 206 is formed on the ITO pixel electrode 202 on the TFT substrate, and the inclination direction of the liquid crystal molecule is determined by a slanting electric field generated by this portion. Here, the bank-like dielectric structures 209 and 203 may be prepared on each of the TFT substrate and the opposite substrate, respectively, thereby determining the inclination direction of the liquid crystal molecule by slanting the electric field from the ITO pixel electrode 202 as shown in FIG. 47. Further details will be described below.

Although the layout of the display area shown in FIG. 47 is comparatively simple, the interval of the dielectric structures 209 and 203 is made larger every other in forming the above-mentioned dielectric structures 209 and 203 in the TFT substrate and the opposite substrate, respectively. Further, in order to increase the rate of the liquid crystal molecules which incline in the lower viewing angle direction, the dielectric structure 209 formed on the TFT substrate and the dielectric structure 203 formed on the opposite substrate are formed so that they form a shape of the character of "<" through the upper half and lower half of the drawing. That is, while in the conventional liquid crystal display apparatus shown in FIG. 44, the dielectric structure 203 was formed on the opposite substrate such that it makes the character of "<" in the upper half and the lower half in the drawing, in the display area of the fifth embodiment shown in FIG. 47, the substrate that is the object for forming the dielectric structure that takes the "<" shape is replaced in the upper half and in the lower half of this display area.

By employing a layout such as above, satisfactory viewable range is widened only in the upper view angles. That is, although a liquid crystal molecule will incline downward in the area B and area C indicated in FIG. 47, since these areas are large, the view angle characteristics in the upper view angle direction will be improved.

On the other hand, although the layout shown in FIG. 45 is fundamentally the same as the layout shown in FIG. 47 described above, the slit 206 is formed on the ITO pixel electrode 202 instead of the dielectric structure 209 that was formed on a TFT substrate. In addition, in the layout shown in FIG. 47, the dielectric structure 209 may be formed on an arbitrary position, while there is a restriction in the layout shown in FIG. 45 that the slit cannot be extended to the end of the electrode. Further, the slits 206 may be connected within a pixel, and may be closed as shown in the portion 207 of FIG. 45.

Figure 46:
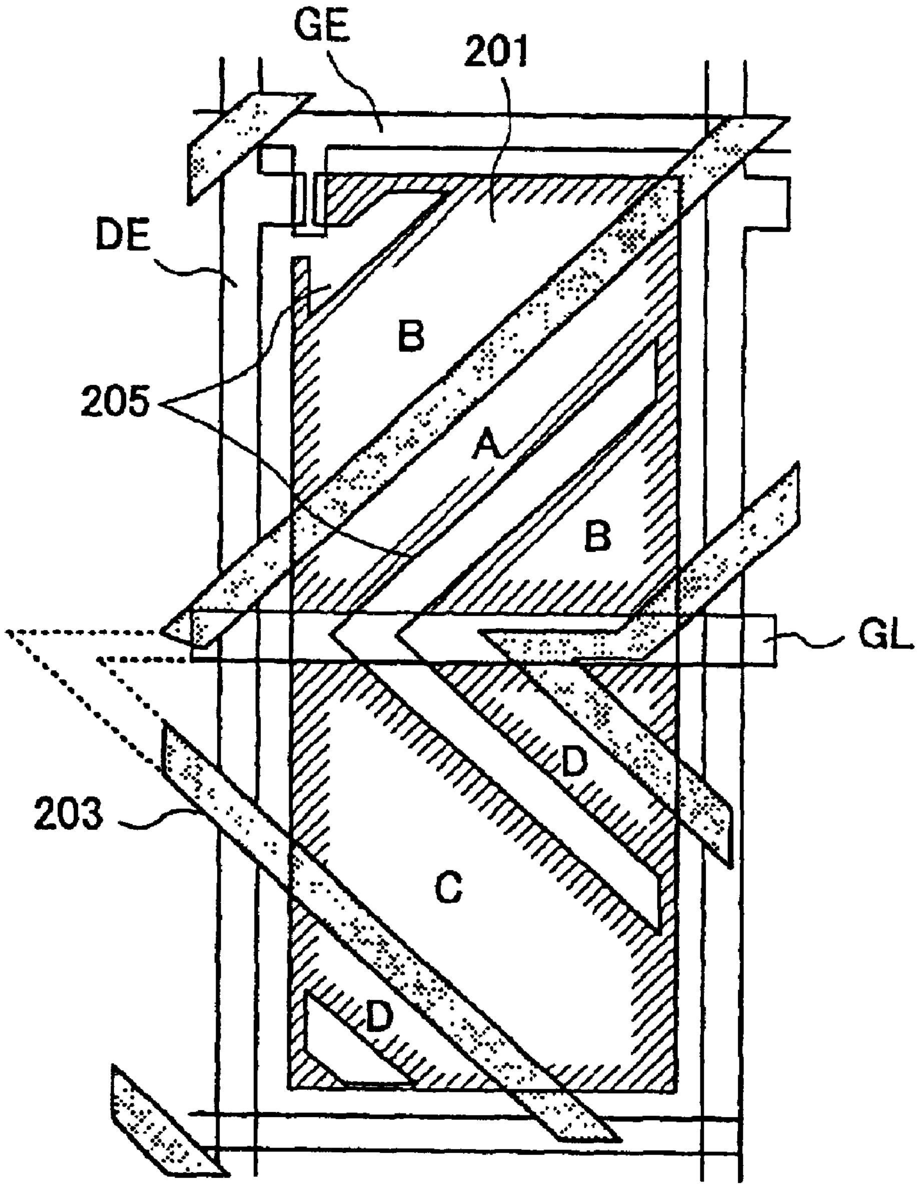
FIG. 46 is a plane view showing another example of the layout of the display area in the liquid crystal display apparatus concerning the fifth embodiment of the present invention.

Further, the layout shown in FIG. 46 gives priority to the layout of the slit 205, wherein the dielectric structures 203 and slits 205 are formed in the upper half and lower half of a display area, respectively, in one body as shown in the drawing, and are connected to each other. According to this layout, while the continuity between the adjoining pixels is maintained, orientation of the liquid crystal molecules can be evenly assigned in the vertical direction. In addition, thereby, a symmetrical view angle characteristic on either side is obtained.

As mentioned above, according to the liquid crystal display apparatus of the fifth embodiment of the present invention, the view angle characteristics of an MVA type liquid crystal display apparatus can be largely improved. In addition, the view angle characteristic in specific directions, such as an upper viewing-angle direction which becomes important in a monitor especially, is improvable.

Sixth Embodiment

Figure 51:
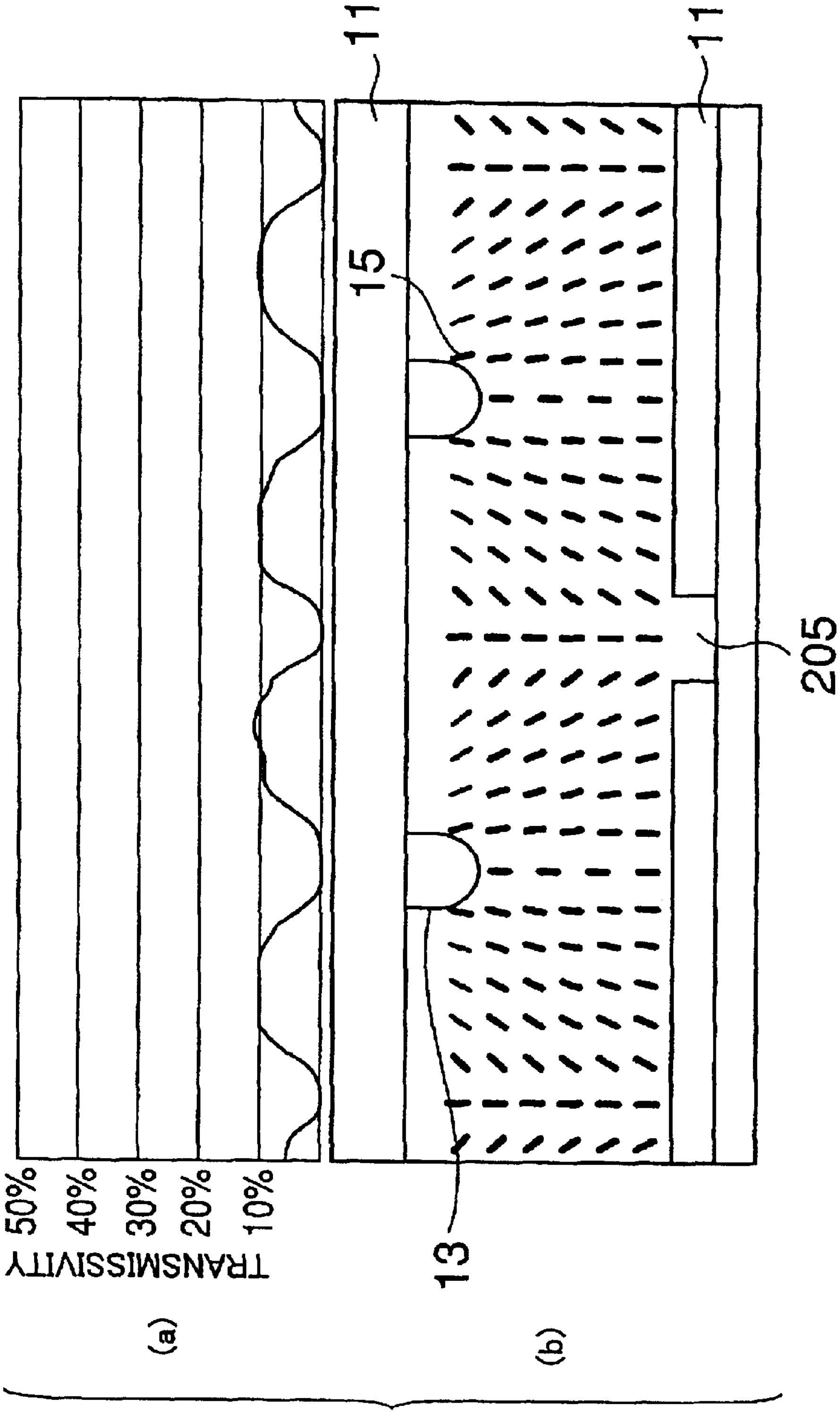
FIG. 51 describes the problem of the conventional MVA type liquid crystal display apparatus.

In the above-mentioned MVA type liquid crystal display apparatus, it has been a problem that the response speed in the picture display of a middle tone is slow. For example, in a picture in which people move in a dark background, the problem that hair drags has arisen. This was because all of the liquid crystal molecules 15 between the dielectric structure 13 and the slit 205 moved in the MVA type liquid crystal panel as shown in FIG. 51-(*b*). In addition, FIG. 51-(*a*) shows the transmissivity of the light in every place of a liquid crystal panel which has the structure shown in FIG. 51-(*b*).

Here, the reason for all the liquid crystal molecules 15 moving is that the whole threshold voltage is the same, while molecules nearby the slit 205 or the bank move first in the MVA type liquid crystal display apparatus. In addition, this originates from the fact that the electric field is uniformly impressed to the whole liquid crystal panel.

Figure 58:
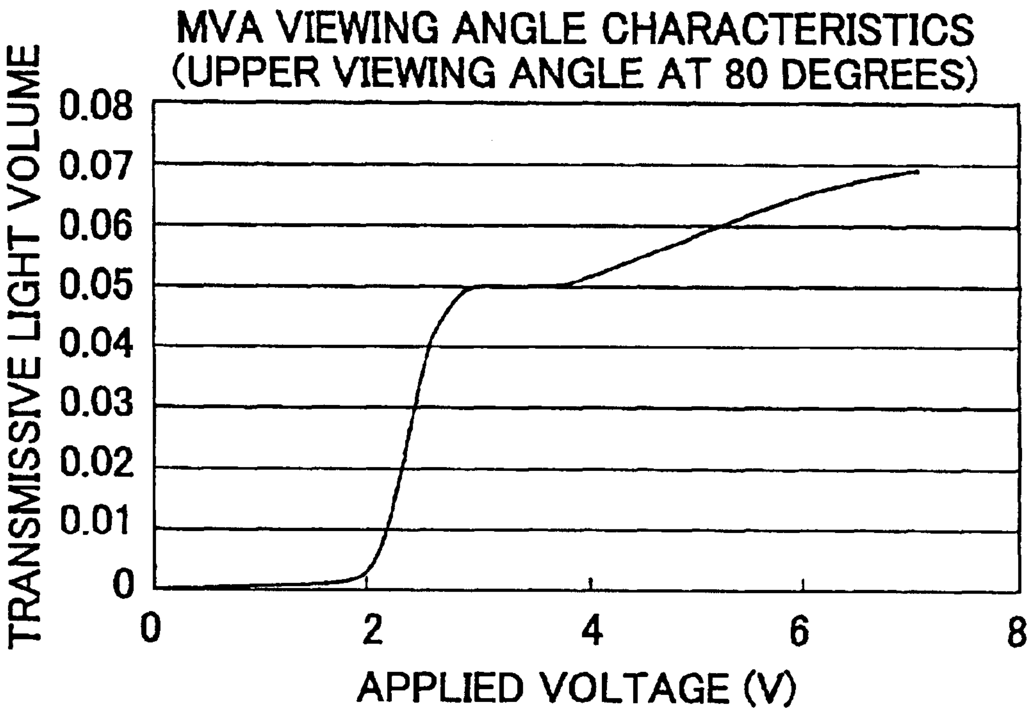
FIG. 58 is a graph showing the T-V characteristics in the upper viewing angle of the conventional MVA type liquid crystal display apparatus.

Further, the problem of the whitish picture in middle tones displayed by the picture display as mentioned above arises because the T-V characteristics surge in the four directions of the viewing angles in the middle tones as shown in FIG. 58.

Therefore, the liquid crystal display apparatus of the sixth embodiment in the present invention drives the liquid crystal molecule 15 on a low voltage, and makes only some liquid crystal molecules 15 respond by centralizing an electric field impressed on the liquid crystal molecules 15. Further specific descriptions will follow.

Figure 52:
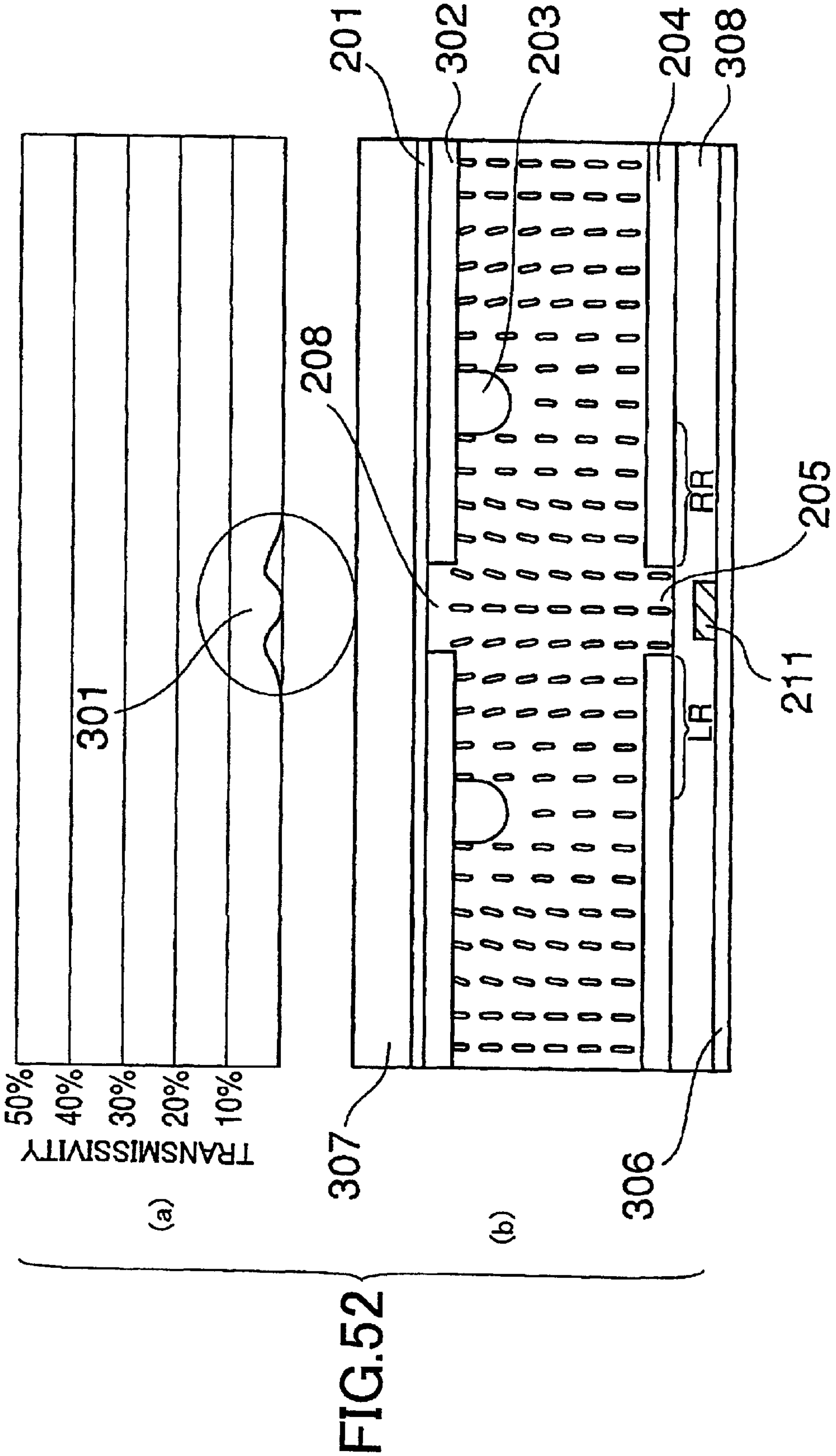
FIG. 52 describes the first example of structure of the liquid crystal display apparatus of the sixth embodiment of the present invention.

FIG. 52 describes the first example of structure of the liquid crystal display apparatus of the sixth embodiment of the present invention. FIG. 52-(*a*) is the graph showing the transmissivity of the light in every place of a liquid crystal panel which has the structure shown in FIG. 52-(*b*).

As shown in FIG. 52, an electrode 211 and an SiN layer 308 are formed on a glass substrate 306, and the ITO pixel electrode 204 on which the slit 205 is provided are formed. On the other hand, the ITO pixel electrode 201 is formed on the whole surface of a glass substrate 307 which faces [the glass substrate 306], and a resin layer 302 is formed on it. Here, a slit 208 which has a little narrower width than the slit 205 is formed on the resin layer 302 approximately directly above the slit 205 formed on the ITO pixel electrode 204. In addition, width of the slits 205 and 208 can be set to 3 to 20 micrometers, for example. Further, although a color filter is formed on the glass substrate 307, it is omitted in FIG. 52.

In addition, the bank-like dielectric structure 203 is formed on the above-mentioned resin layer 302. Here, the above-mentioned slits 205 and 208, the dielectric structure 203, the gate electrode GE, the data electrode DE, and an electrode 305 for auxiliary capacity formation are arranged according to the layout shown in FIG. 53. That is, the above-mentioned slits 205 and 208 and the dielectric structure 203 are arranged so that they bend into the character of "<" in each pixel which makes the display area in a structure such that the liquid crystal molecules 15 are oriented in the four directions.

Figure 53:
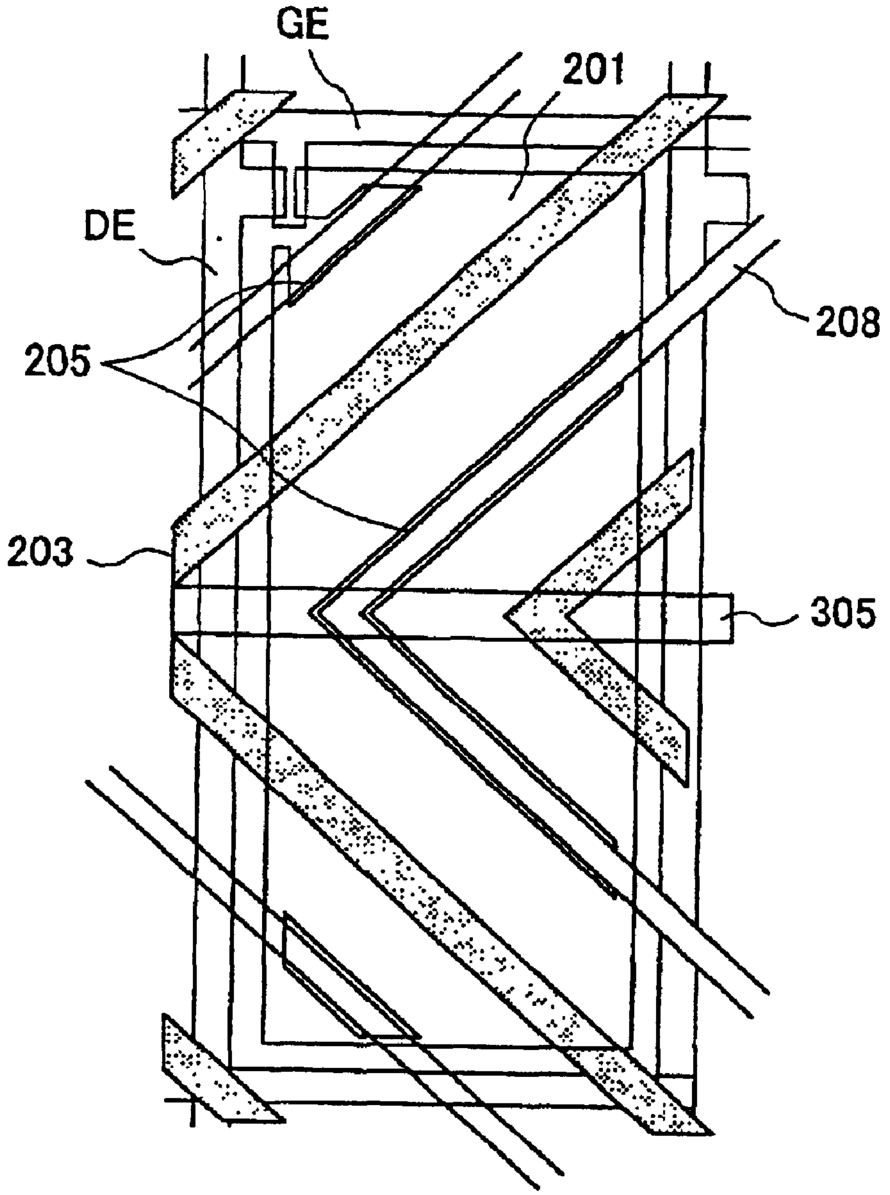
FIG. 53 is a plane view showing the layout of the liquid crystal display apparatus shown in FIG. 52.

In addition, although the slit 205 is formed so that it stops at the end of the ITO pixel electrode 201 in the pixel area as shown in FIG. 53, a slit 208 can be formed ranging over pixels.

According to the above structure, because the slit 208 formed on the resin layer 302 and the slit 205 formed on the ITO pixel electrode 204 are facing each other, an electric field in the slanted direction will concentrate especially in-between. That is, although the electric field impressed to the liquid crystal molecule 15 becomes slanting when only the above-mentioned slit 205 is formed and the slit 208 is not formed on the resin layer 302, the tendency for this electric field to be generated aslant becomes stronger by forming this slit 208.

In addition, under the influence of the slanting electric field generated as mentioned above, only the liquid crystal molecule 15 in the neighborhood of the slits 205 and 208 will respond selectively to the impressed voltage and their transmissivity will be raised as shown in the portion 301 of FIG. 52-(*a*). Although other liquid crystal molecules 15 also tend to respond at this time, threshold voltage becomes high under the influence of the resin layer 302. Therefore, when the applied voltage is low, only the liquid crystal molecules 15 in the neighborhood of the slits 205 and 208 respond, and since the response does not affect the surrounding liquid crystal molecules 15, further, it can accelerate the response speed of the liquid crystal molecules 15 in a middle tone.

In addition, the dielectric structure 203 is formed on order to determine the inclination direction of the liquid crystal molecules 15, and it collaborates with the slits 205 and 208 to direct the liquid crystal molecules 15 in the area indicated as LR in the drawing to the leftward direction, and the liquid crystal molecules in the area indicated as RR to the rightward direction, respectively.

Further, since the slit 205 can be formed without adding a process when the ITO pixel electrode 204 is formed, the above-mentioned glass substrate 306 can be a TFT substrate on which TFT is formed. In addition, the glass substrate 306 shown in FIG. 52 can be used as the opposite substrate.

Further, material of the above-mentioned resin layer 302 and the dielectric structure 203 is a positive type resist, wherein the thickness of the resin layer 302 is set at between 0.1 μm and 2 μm, and the height of the dielectric structure 203 is set at between 0.5 μm and 4 μm On the other hand, the above-mentioned electrode 211 can be formed by extending the auxiliary capacity electrode below the slit 205, and the width of this electrode 211 may be the almost same as the width of the slit 205.

Figure 54:
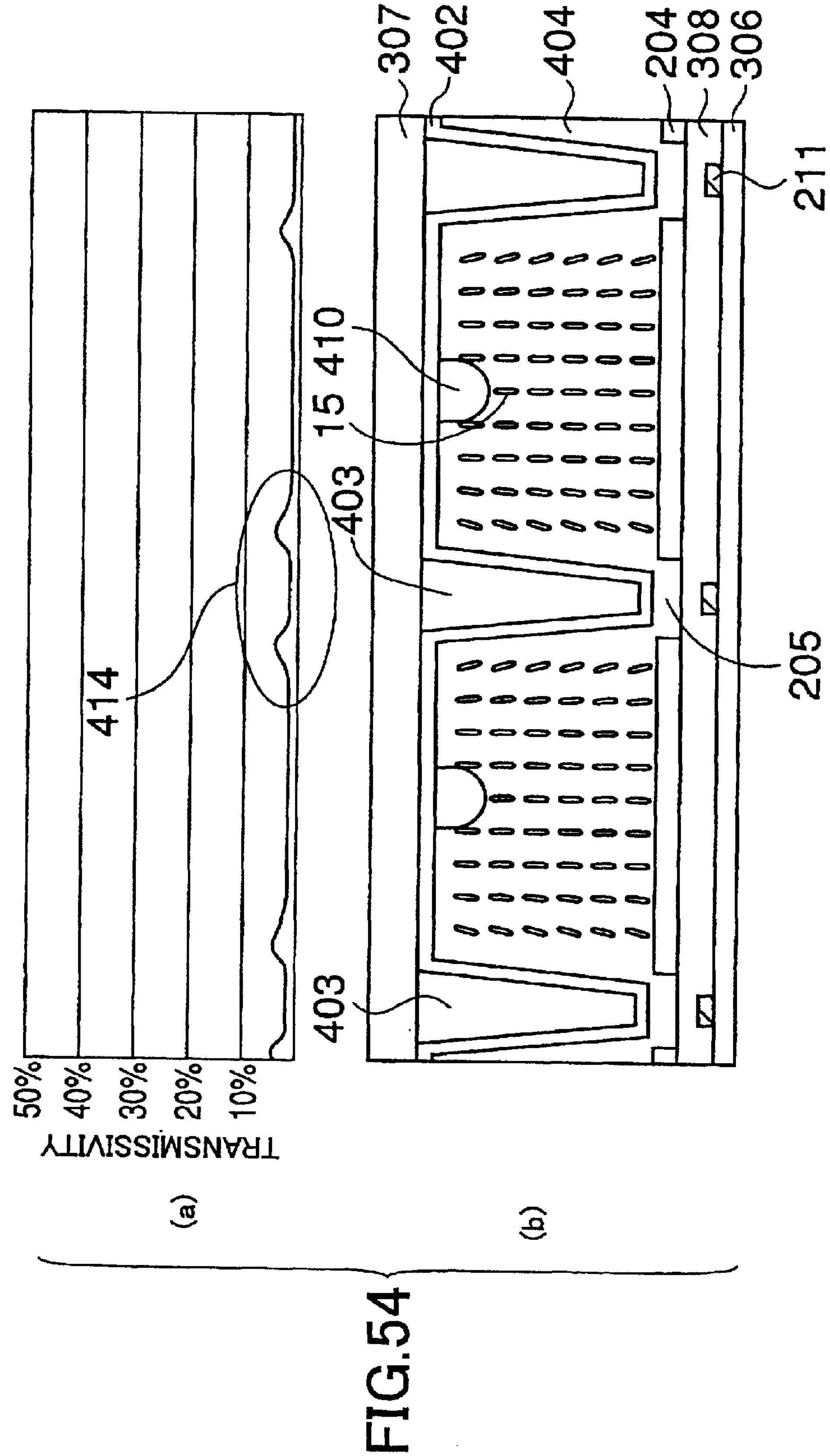
FIG. 54 describes the second example of structure of the liquid crystal display apparatus of the sixth embodiment of the present invention.
Figure 55:
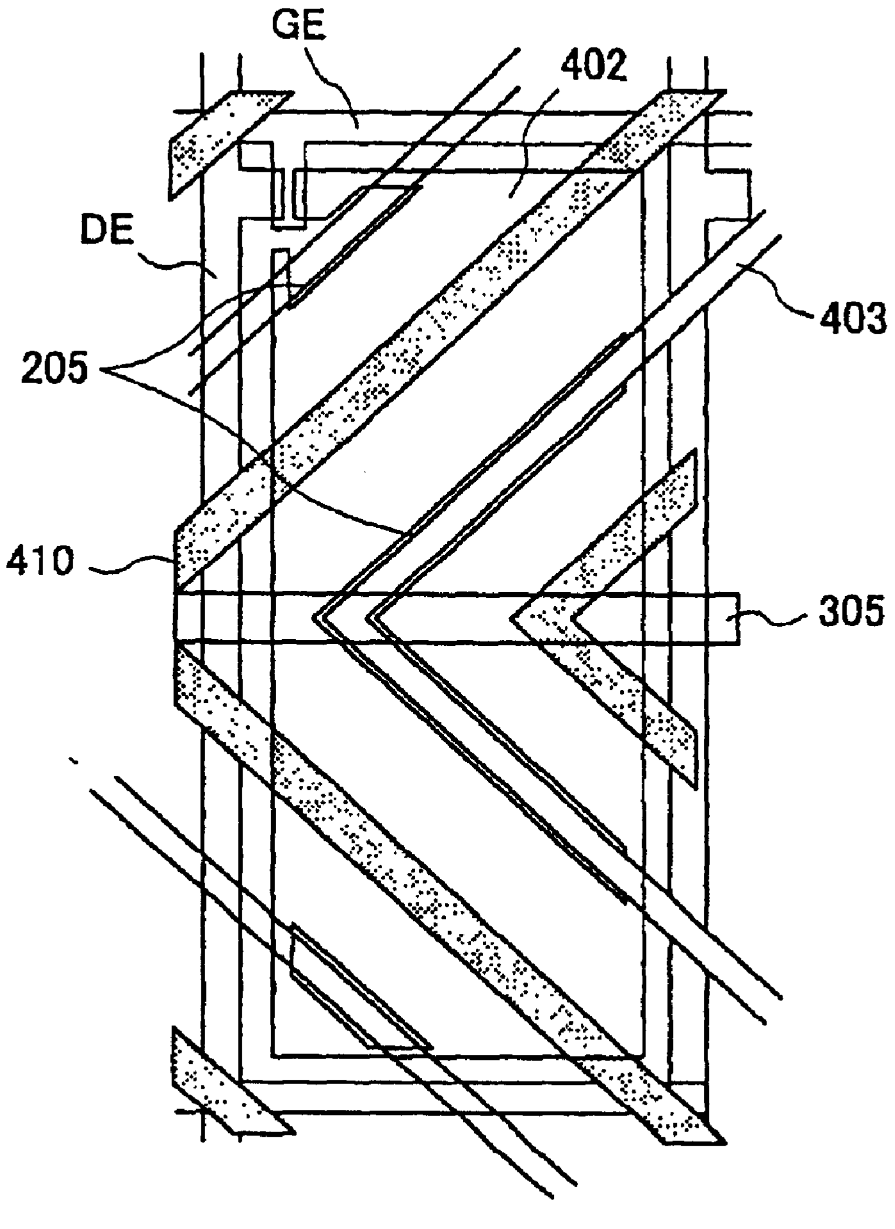
FIG. 55 is a plane view showing the layout of the liquid crystal display apparatus shown in FIG. 54.

FIG. 54 is a drawing for describing the second example of the liquid crystal display apparatus structure of the sixth embodiment in the present invention. Although the second example is similar to the first example above, it is different in that a bank-like dielectric structure 403 is formed on a glass substrate, or on a color filter formed on the glass substrate 307, and that an ITO pixel electrode 402 is formed by covering the dielectric structure 403 as shown in FIG. 54. Here, the dielectric structure 403 is provided facing the slit 205, and a bank-like dielectric structure 410 is formed on the ITO pixel electrode 402 and at the middle point of the adjacent dielectric structure 403. In addition, a plane view showing the layout of the liquid crystal panel presented in FIG. 54-(*b*) is given in FIG. 55.

According to this structure, a big slanting electric field can be applied between the ITO pixel electrode 402 which covers the dielectric structure 403, and the ITO pixel electrode 204 in the vicinity of the slit 205, only the liquid crystal molecules 15 in this area will respond preferentially by impression of a low voltage, and transmissivity can be raised as shown in the portion 414 of FIG. 54-(*a*). In addition, for centralizing the above slanting electric field, it is effective to apply the same voltage to the electrode 211 as applied to the ITO pixel electrode 402.

Further, the glass substrate 306 may be a TFT substrate like the example of the first structure described above. In addition, the height of the dielectric structure 403 shall be between 1.5 μm and 4 μm, desirably at about 3 μm, and the width is to be between 3 μm and 15 μm, desirably about 10 μm.

On the other hand, the height of the dielectric structure 410 is set to 0.3 μm to 2 μm, and the width is set to 3 μm to about 15 μm. Further, the distance between the dielectric structure 403 and the dielectric structure 410 is set to 10 μm to about 40 μm.

Figure 56:
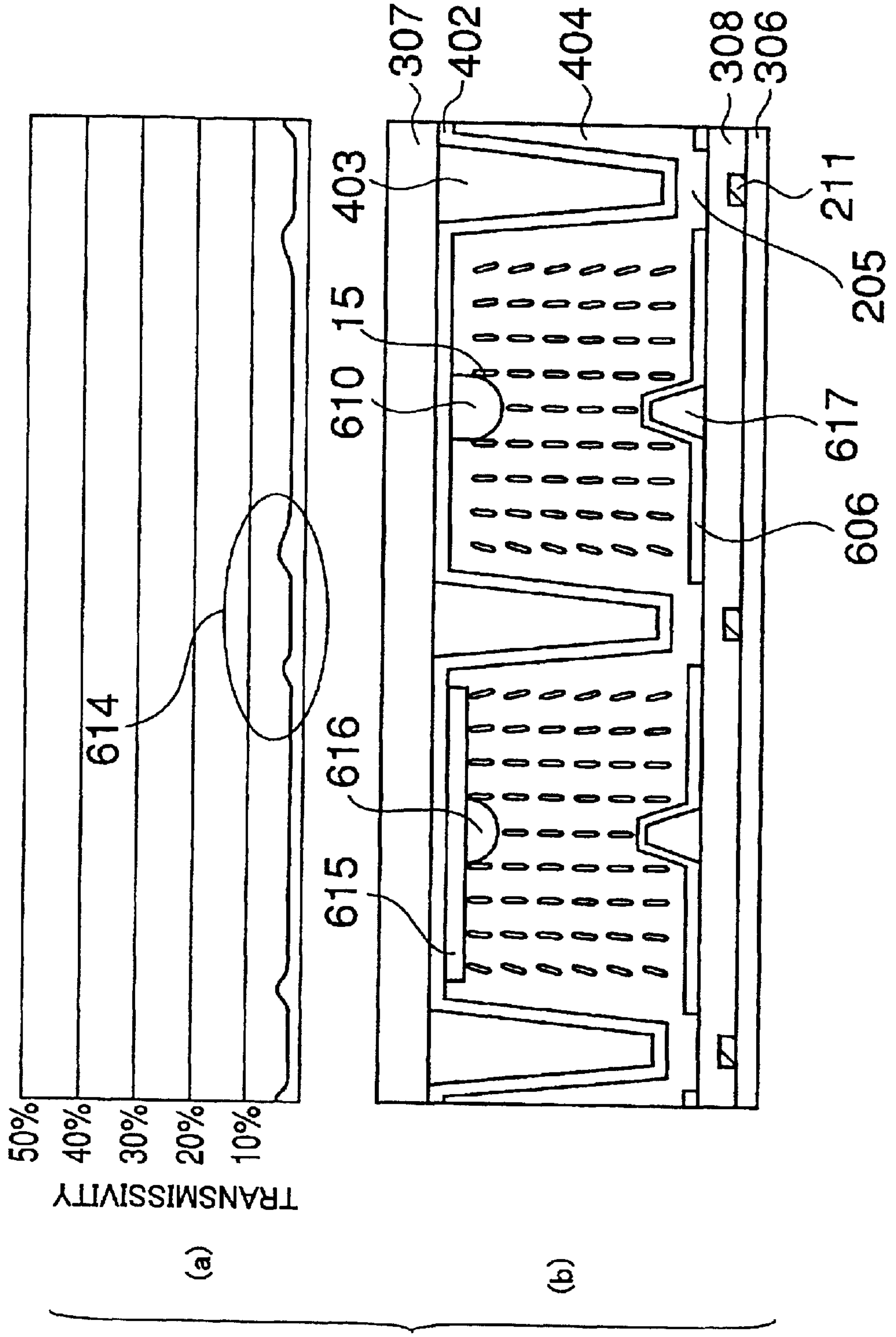
FIG. 56 describes the third example of structure of the liquid crystal display apparatus of the sixth embodiment of the present invention.

FIG. 56 is a drawing describing the third example of the liquid crystal display apparatus structure of the sixth embodiment in the present invention. As shown in the right half of FIG. 56, the liquid crystal display apparatus of the sixth embodiment may provide a liquid crystal panel wherein a dielectric structure 617 is formed on the SiN layer 308 further to the second structure example in FIG. 54, and an ITO pixel electrode 606 is formed thereupon. In addition, such structure can be interpreted that the slit 205 was replaced by a dielectric structure 610, which makes it equivalent to a vertically contrary arrangement of the slit 205 and the dielectric structure 403 formed on the glass substrates 306 and 307, respectively.

In addition, according to the above structure, a satisfactory orientation of the liquid crystal molecules 15 for a high response speed can be realized by the action of the electric field generated by the three dielectric structures 403, 610, and 617 and the slit 205.

Further, the liquid crystal display apparatus of the sixth embodiment may use a liquid crystal panel as shown in the left half of FIG. 56. It has an additional structure of a dielectric structure 616 formed on a thin resin layer 615 further provided on the ITO pixel electrode 402 that is shown in the right half of FIG. 56. In addition, according to such structure, since the resin layer 615 provides the same effect as the resin layer 302 shown in FIG. 52, it can enlarge threshold voltage differences among the liquid crystal molecules 15 in the display area, and can raise the response speed of the liquid crystal molecules nearby the dielectric structure 403. In addition, as shown in FIG. 56-(*a*), the liquid crystal molecules 15 nearby the dielectric structure 403 respond preferentially upon applying a low voltage in the structure shown in FIG. 56-(*b*), also.

Figure 57:
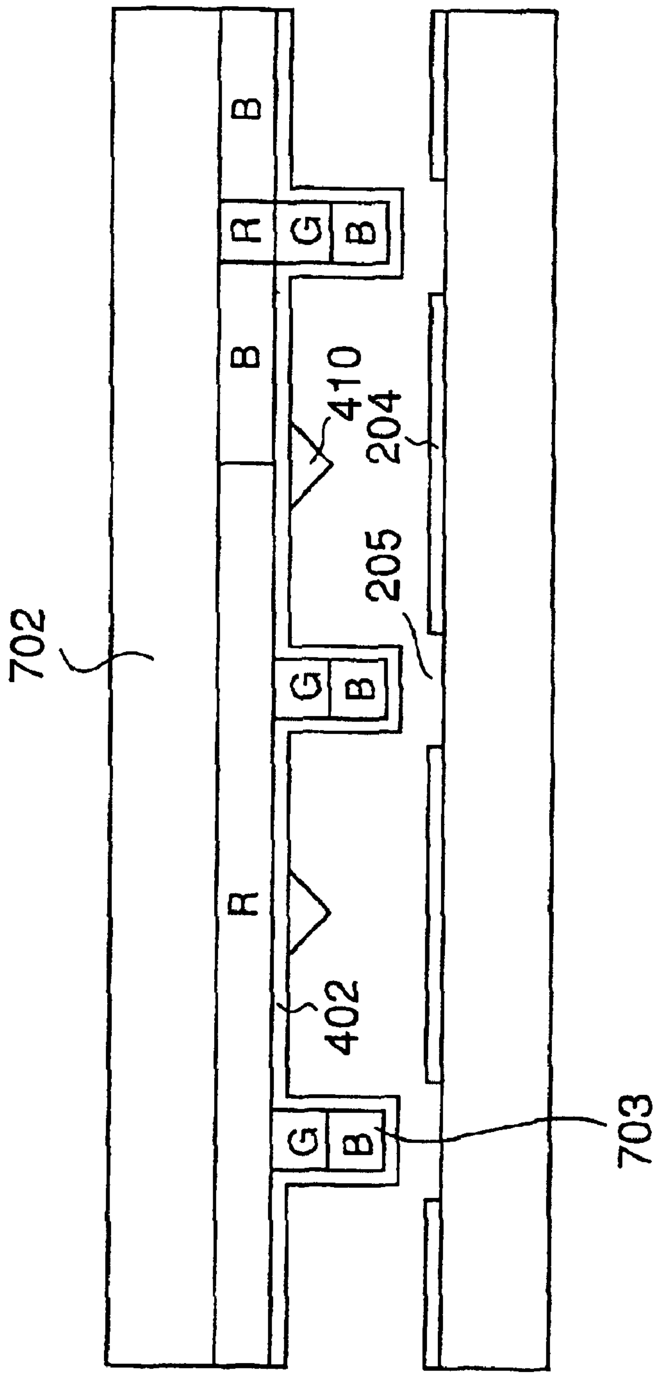
FIG. 57 is a sectional view showing the fourth example of structure of the liquid crystal display apparatus of the sixth embodiment of the present invention.

Further, the liquid crystal display apparatus of the sixth embodiment can be formed, without increasing a manufacturing process, by making a dielectric structure 703 on which color filters (G, B) are provided as shown in FIG. 57, instead of the dielectric structure 403 in the structure shown in FIG. 54-(*b*).

In coping with the whitish image phenomenon as mentioned above, it is effective for improving the viewing-angle characteristics to change the threshold characteristics of the liquid crystal molecules at a part of the screen, and combine different characteristics. Specific descriptions will follow.

Figure 59:
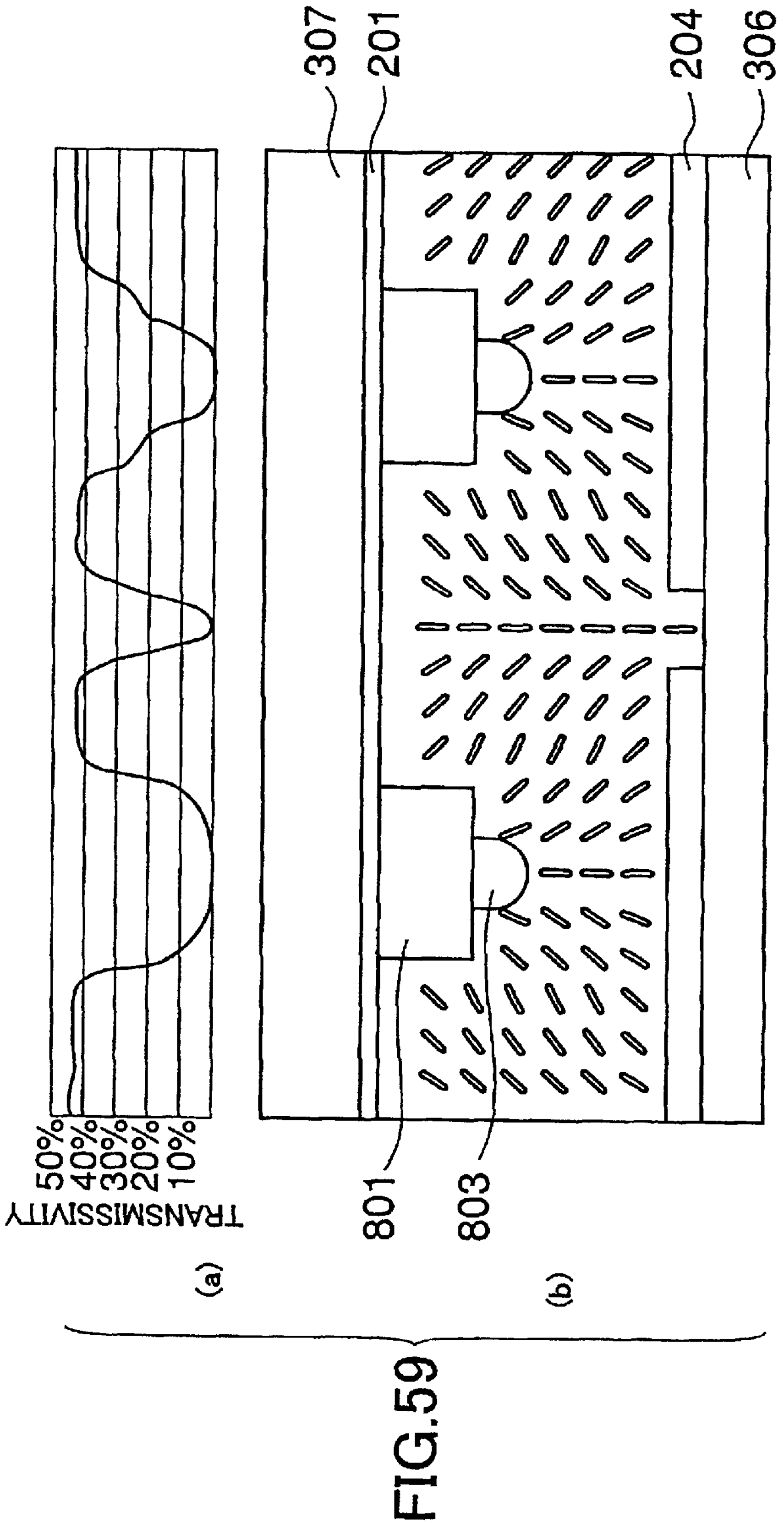
FIG. 59 describes the fifth example of structure of the liquid crystal display apparatus of the sixth embodiment of the present invention.

FIG. 59 is a drawing describing the fifth example of the liquid crystal display apparatus structure of the sixth embodiment in the present invention. As shown in FIG. 59, in the fifth structure example, a dielectric layer 801 made of resin is formed on the ITO pixel electrode 201 formed on the color filter substrate or the opposite substrate on which a dielectric structure 803 is formed. Here, the dielectric layer 801 of a resist material or the like is formed with the thickness set to between 0.1 μm and about 3 μm.

In the process for forming such structure, an ultraviolet ray is not radiated at all at the portion where the dielectric structure 803 is formed, but an ultraviolet ray is radiated somewhat at the portion where the dielectric layer 801 is formed, and an ultraviolet ray is fully radiated at the portion where the dielectric layer 801 is not formed. In addition, the above-mentioned ultraviolet ray can be radiated in several steps using two or more masks.

Here, if a fine pattern mask is prepared and the ultraviolet ray in effectively middle-quantity is radiated, the tall dielectric structure 803 and the dielectric layer 801 around it can be simultaneously formed by one radiation of the ultraviolet ray. Furthermore, although the occupancy rate of the dielectric layer 801 to the pixel portion is made between 10 and 90%, the best picture display is obtained when a rate of the area wherein the threshold voltage is more than 1.2 times, especially 1.5 times, is set to less than a half, 30±20%, especially best at 30 percent, of the whole pixel area.

Figure 63:
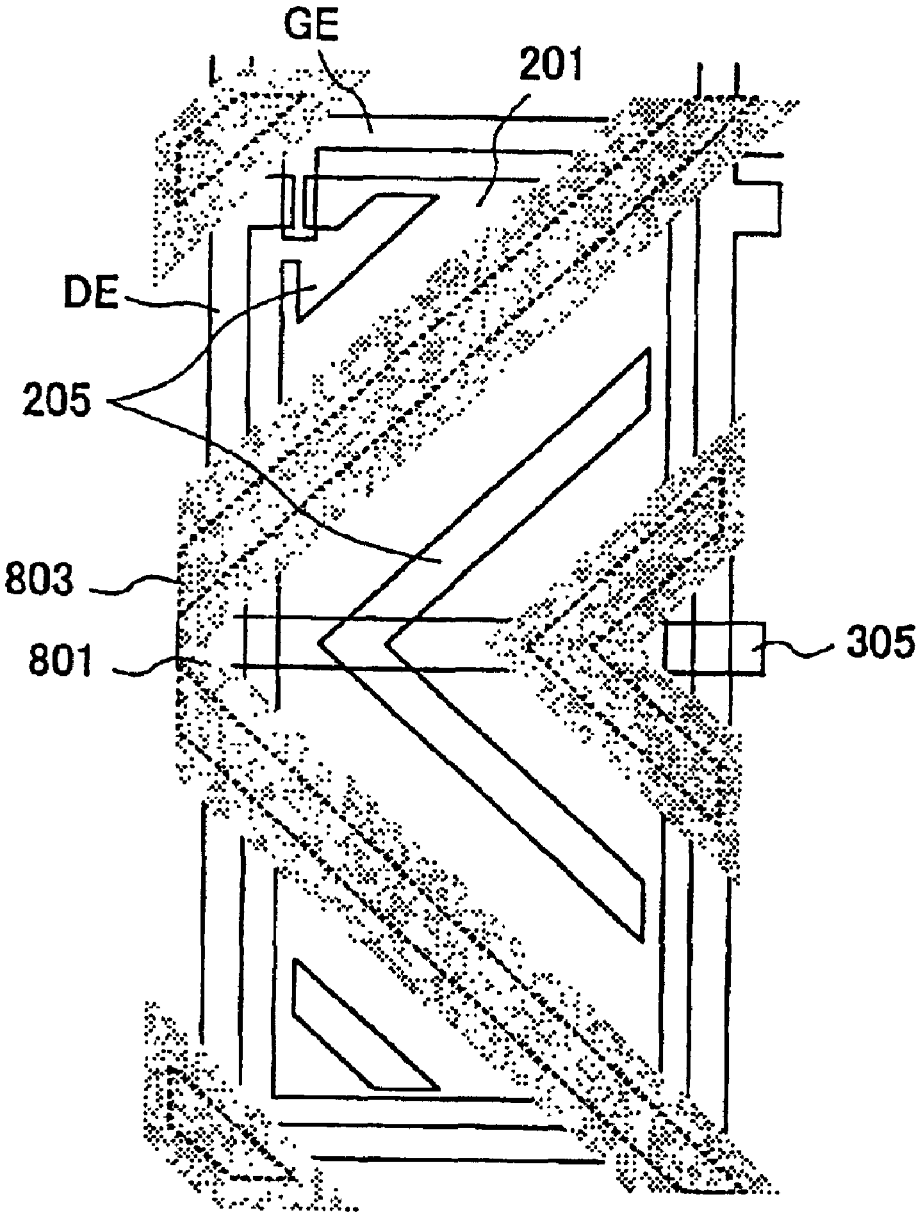
FIG. 63 is a plane view showing the fifth example of structure shown in FIG. 59.

FIG. 63 is a plane view showing the fifth example of the structure shown in FIG. 59. Although the dielectric structure 803 is arranged in vertical symmetry centering on the center of the pixel in order to maintain the symmetry of the view angle as shown in FIG. 63, the thickness and width of the dielectric layer 801 are made the same for both the upper and the lower portions. Further, the height of the dielectric structure 803 is set to between 0.5 μm and 6 μm, and the height of the dielectric layer 801 is set to between 0.1 μm and 3 μm.

In the above configuration, since voltage application is harder due to the larger threshold voltage of the liquid crystal directly under the dielectric layer 801, the transmissivity of this portion becomes smaller as shown in FIG. 59-(*a*).

Figure 60:
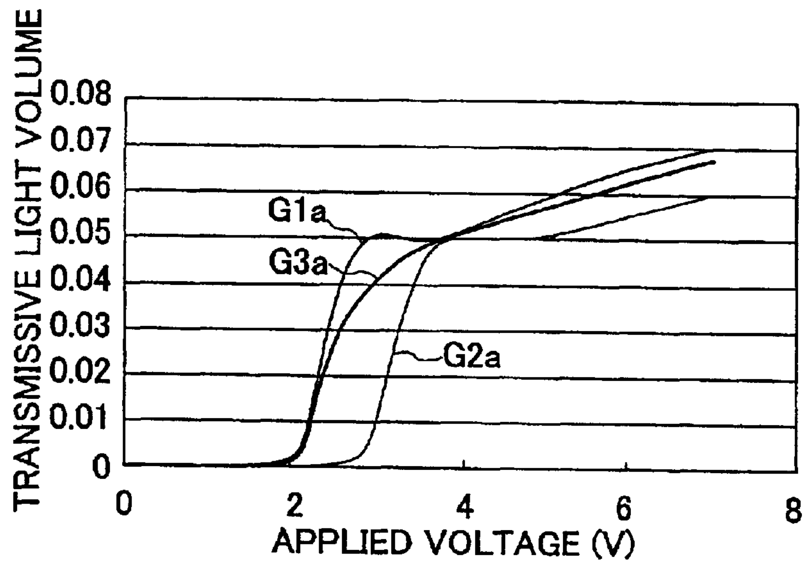
FIG. 60 is a graph showing the T-V characteristics in the upper viewing angle of the liquid crystal display apparatus shown in FIG. 59.

Here, the T-V characteristics of a portion with the higher threshold voltage, and the T-V characteristics of other portions are shown in FIG. 60. In addition, graphs G1*a*–G3*a* in FIG. 60 show the view angle characteristics of the MVA type liquid crystal display apparatus in the upper view angle of 80 degrees. The graph G2*a* shows the T-V characteristics of the area where the threshold voltage is high, the graph G3*a* shows the T-V characteristics of the pixel area where the high threshold voltage applies to 30 percent of the area thereof, and the graph G1*a* shows the T-V characteristics of other portions, respectively. As shown in the graph G2*a* and the graph G1*a* of FIG. 60, the T-V characteristics of the area in which the threshold voltage is high also surges like other portions, when it is viewed with angles. Here, if the 30 percent of the area is applied with a higher threshold voltage, then, as shown in the graph G3*a*, this sinuosity becomes smaller and the T-V characteristics with a more monotonous increase can be acquired. In addition, the graph G3*a* in FIG. 60 represents a case wherein the T-V characteristic in the higher threshold voltage area is enhanced at about 2V where the transmissivity tends to be lower in the T-V characteristics of the other portion described above.

Figure 61:
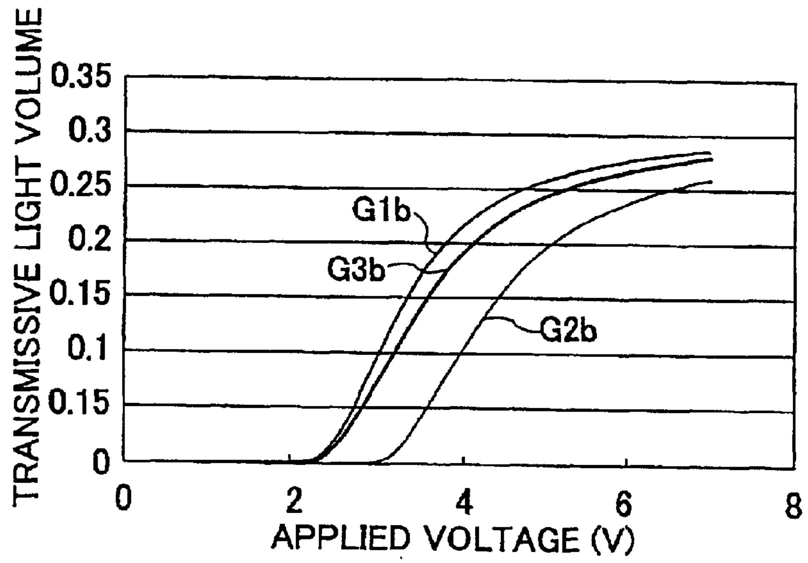
FIG. 61 is a graph showing the T-V characteristics in the front viewing angle of the liquid crystal display apparatus shown in FIG. 59.

Further, like FIG. 60, FIG. 61 shows an improvement in the front viewing angle characteristics of the MVA type liquid crystal display apparatus. The graph G2*b* shows the T-V characteristics of the area where the threshold voltage is made higher, the graph G3*b* shows the T-V characteristics when 30% of the pixel area has the higher threshold voltage, and the graph G1*b* show the T-V characteristics of the other area, respectively. FIG. 61 shows the view angle improvement front characteristics when the 30% of the pixel area has the higher threshold, which becomes similar to the T-V characteristics of the other portions.

Figure 62:
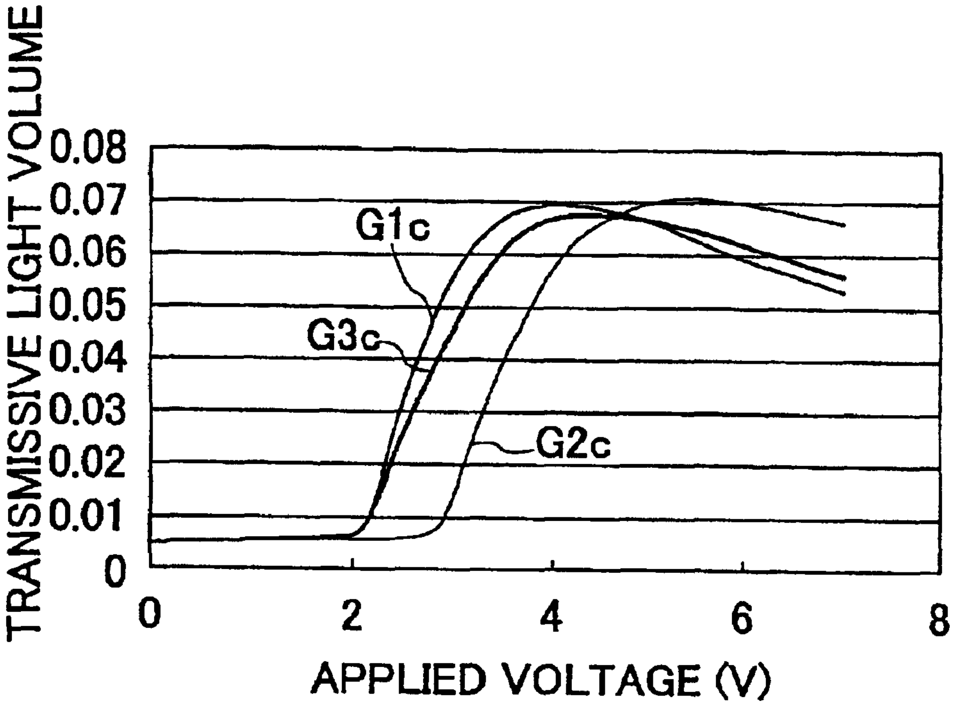
FIG. 62 is a graph showing the T-V characteristics in the upper right viewing angle of the liquid crystal display apparatus shown in FIG. 59.

Further, FIG. 62 shows the view angle characteristics of the MVA type liquid crystal display apparatus in the 80-degree upper right viewing angle. The graph G2*c* shows the T-V characteristics of the area where the threshold voltage is set higher, the graph G3*c* shows the T-V characteristics when the 30% of the pixel area has the higher threshold voltage, and the graph G1*c* shows the T-V characteristics of the other area described above, respectively. FIG. 62 shows that the view angle characteristics when the 30% of the pixel area has the higher threshold voltage are similar to the T-V characteristics of the other portion.

Figure 64:
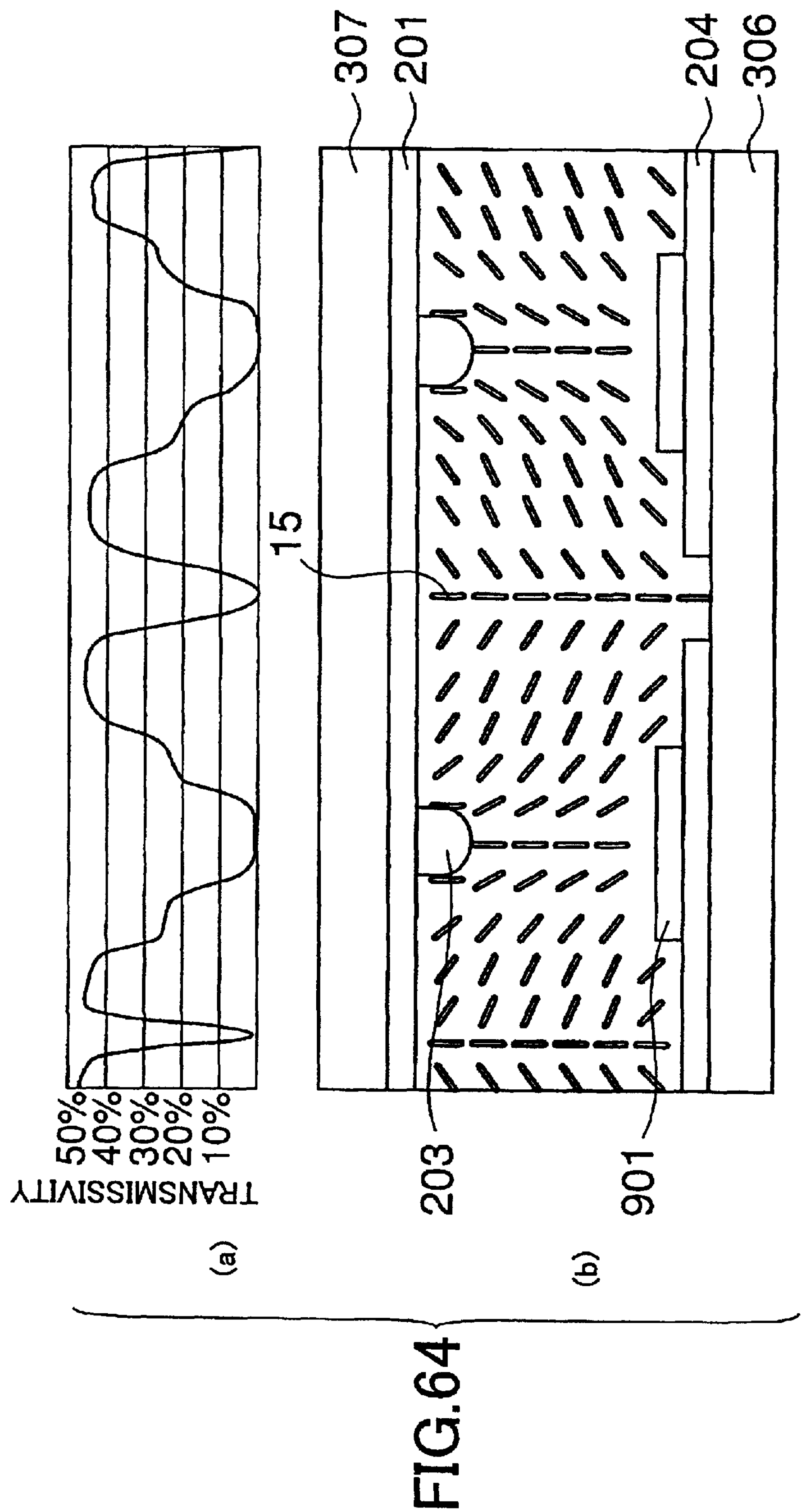
FIG. 64 describes the sixth example of structure of the liquid crystal display apparatus of the sixth embodiment of the present invention.

Further, as shown in FIG. 64, in the liquid crystal display apparatus of the sixth embodiment, a dielectric layer 901 may be formed on the ITO pixel electrode 204 formed on the TFT substrate (glass substrate 306) instead of on the opposite substrate. Here, the dielectric layer 901 is formed of a resist or SiN. In addition, since the dielectric constant of SiN is about 7, comparing with the dielectric constant of the resist being about 3, the thickness of the dielectric layer 901 of SiN shall be between 0.1 μm and 5 μm.

Further, in reference to the description above, the same effect can be obtained by a structure that has a slit on the ITO pixel electrode in place of the bank-like dielectric structure on the ITO pixel electrode.

As mentioned above, according to the liquid crystal display apparatus of the sixth embodiment of the present invention, the response speed of the liquid crystal molecules 15, especially the response speed in a middle tone can be raised sharply, and the view angle characteristics can be improved.

Since according to the liquid crystal display apparatus according to the present invention, the clock signal for transmitting image data can be stopped temporarily or the frequency of this clock signal can be reduced, thereby reducing an EMI level and power consumption as described above.

Further, an EMI level can be reduced by distributing the peak frequency of the EMI noise generated from a clock signal or the harmonics generated by the liquid crystal display apparatus when displaying a picture.

Further, the view angle characteristic is improvable by driving the liquid crystal molecules selectively according to the liquid crystal display apparatus of the present invention, facilitating realization of desired view angle characteristics.

Further, according to the manufacturing method of the liquid crystal display apparatus of the present invention, a display and the view angle characteristics of a liquid crystal panel can be easily improved.

In the following, a second aspect of the present invention will be described.

The second aspect of the present invention generally relates to a clock signal generating circuit and a system which employs the circuit, and particularly relates to the circuit and the system which have a function to reduce an EMI (electro magnetic interference) level.

As a processing speed of a system gets higher and higher, a system driving clock speed of information processing equipment has been increased.

In the information processing equipment, it is necessary to suppress the EMI level. Conventionally, beads and filters have been employed to smooth waveform shape of a clock signal and a structural shielding to suppress an electro magnetic radiation.

As the system driving clock speed gets higher, such a conventional method of waveform smoothing does not provide a sufficient result. As a means to reduce the EMI level, there is a method to make a clock frequency fluctuate so as to spread harmonic peaks; however, the method is inadequate because the clock signal becomes asynchronous with an original clock, causing an inability to maintain synchronization with a data signal.

Accordingly, there is a need for a scheme that can effectively reduce the EMI level.

To achieve these and other advantages and in accordance with the purpose of the invention, as embodied and broadly described herein, the invention provides an apparatus for generating a clock signal which comprises a duty-ratio control circuit.

In the present invention described above, the duty ratio is constantly changed, thereby making the position of a peak harmonic component constantly shift through the frequency spectrum of the synchronizing clock signal. This makes it possible to temporally spread the peak position throughout the frequency spectrum in contrast to use of a fixed duty ratio that keeps the peak at the same harmonic position. Accordingly, the present invention can suppress the EMI level of a system that is driven by the synchronizing clock signal.

The duty ratio is temporally changed by shifting one of rising edge and falling edge of the synchronizing clock signal, while keeping a timing of the other constant. Thus, synchronization between the synchronizing clock signal and a data signal can be maintained by designing a system to synchronize its data signal with the other edge that has the constant timing.

In the following, embodiments of the second aspect of the present invention will be described with reference to the accompanying drawings.

In the present invention, the duty ratio of a clock signal is changed constantly so as to shift the position of a peak harmonic from one position to another whereas such a peak harmonic stays at the same harmonic position in the conventional art. Reduction of the EMI level is thus achieved. In general, the n-th harmonic component of a pulse signal having the duty ratio "a" is represented as follows by use of the Fourier transform.

$$aA+A/n\pi\times[2(1-\cos(2\pi an))]^{1/2}\times[\sin(n\omega t+\phi)]$$

Here "A" represents the amplitude of the signal. As seen from the above formula, the amplitude of an n-th harmonic component is determined by the duty ratio "a". If the duty ratio is constant, then a peak stays at a fixed harmonic position, thereby creating a singular point. On the other hand, if the duty ratio changes with time, then the harmonic component that forms a peak changes with time, so that the peak can be temporally spread over the frequency spectrum.

Figure 65A:
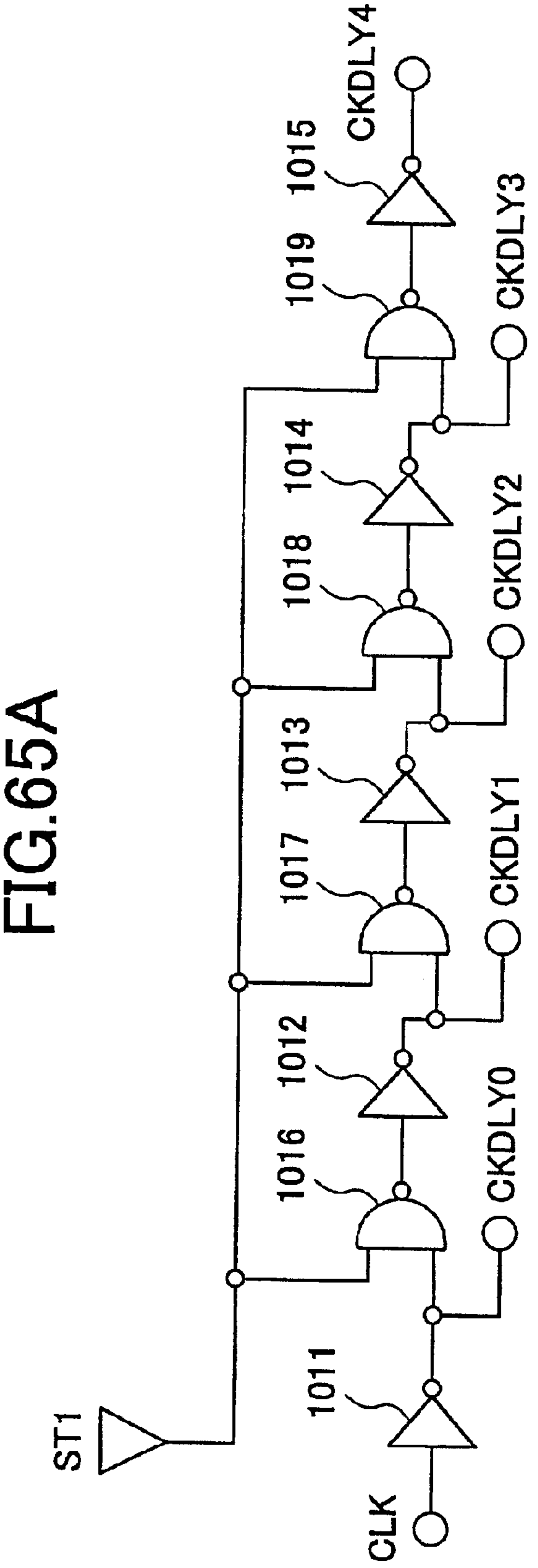
FIG. 65A is a circuit diagram of a clock signal delay circuit.
Figure 65B:
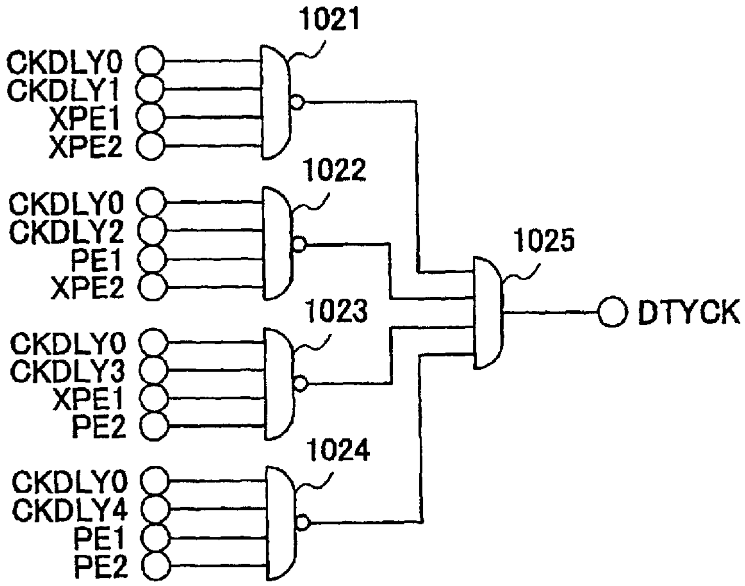
FIG. 65B is a circuit diagram of a duty-ratio control circuit.

FIGS. 65A and 65B show circuits which change the duty ratio of the clock signal from time to time.

FIG. 65A represents a clock signal delay circuit, which creates delayed clock signals CKDLY0 through CKDLY4 based on a clock signal CLK. The circuit includes inverters 1011 through 1015 and NAND circuits 1016 through 1019. When a signal ST1 is in a HIGH status, the clock signal delay circuit produces the delayed clock signals.

The clock signal CLK is input to the inverter 1011, and then is given a delay by the NAND circuit 1016 and the inverter 1012, to generate the delayed clock signal CLKDLY1. The delayed clock signal CLKDLY1 is subjected to a further delay by the NAND circuit 1017 and the inverter 1013, to become the delayed clock signal CKDLY2. Similarly, the delayed clock signals CKDLY3 and CKDLY4 are generated. The clock signal CLK as delayed by the inverter 1011 is output as the delayed clock signal CKDLY0.

FIG. 65B shows a duty ratio control circuit which generates a signal with different duty ratios by combining the delayed clock signals. The duty ratio control circuit includes NAND circuits 1021 through 1024 and an AND circuit 1025. This circuit generates a train of pulses with different duty ratios.

Each of the NAND circuits receives 4 input signals, two of which are the delayed clock signals generated by the clock signal delaying circuit of FIG. 1. The other two are duty ratio selection signals PE1 and PE2. Here, XPE1 and XPE2 are inverted signals of PE1 and PE2, respectively.

The NAND circuit 1021 receives the delayed clock signals CKDLY0 and CKDLY1 and the duty ratio selection signals XPE1 and XPE2. The NAND circuit 1022 receives the delayed clock signals CKDLY0 and CKDLY2 and the duty ratio selection signals PE1 and XPE2. The NAND circuit 1023 receives the delayed clock signals CKDLY0 and CKDLY3 and the duty ratio selection signals XPE1 and PE2. The NAND circuit 1024 receives the delayed clock signals CKDLY0 and CKDLY4 and the duty ratio selection signals PE1 and PE2.

If both duty ratio selection signals PE1 and PE2 are HIGH, then the NAND circuit 1024 is selected. That is, outputs of the other three NAND circuits 1021 through 1023 remain HIGH and an output of the NAND circuit 1024 is a NAND of the delayed clock signals CKDLY0 and CKDLY4. Therefore, an output of the AND circuit 1025 is the NAND of the delayed clock signals CKDLY0 and CKDLY4.

Similarly, if the status of the duty ratio selection signal PE1 is LOW and the status of the duty ratio selection signal PE2 is HIGH, then the NAND circuit 1023 is selected. The other NAND circuits' outputs are HIGH. The AND circuit 1025 outputs a NAND of the delayed clock signals CKDLY0 and CKDLY3.

Similarly, if the status of the duty ratio selection signal PE1 is HIGH and the status of the duty ratio selection signal PE2 is LOW, then the NAND circuit 1022 is selected. The AND circuit 1025 outputs a NAND of the delayed clock signals CKDLY0 and CKDLY2.

If both of the duty selection signals PE1 and PE2 are LOW, then the NAND circuit 1021 is selected. Then AND circuit 1025 outputs a NAND of the delayed clock signals CKDLY0 and CKDLY1.

Figure 66:
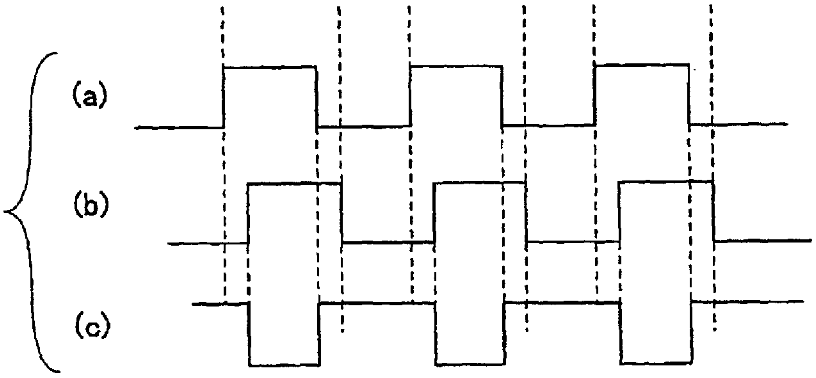
FIG. 66 demonstrates how to generate output pulses with different duty-ratios.

FIG. 66 shows how the duty ratio is adjusted by the delayed clock pulses created by the circuit shown in FIGS. 65A and 65B.

In FIG. 66, (a) represents the delayed clock signal CKDLY0. (b) represents a selected one of the delayed clock signals CKDLY1 thorough CKDLY4. (c) represents a NAND of the signals of (a) and (b).

If the NAND circuit 1024 is taken as an example, FIG. 66-(*a*) represents the delayed clock signal CKDLY0 and FIG. 66-(*b*) represents the delayed clock signal CKDLY4. In FIG. 66, (c) represents the output of the NAND circuit 1024 and is a NAND of the delayed clock signals CKDLY0 and CKDLY4. As shown in FIG. 66, the duty ratio of the output signal is determined by the timing difference between the delayed clock signals CKDLY0 and CKDLY4.

Accordingly, by changing a combination of HIGH and LOW status of the duty ratio selection signals PE1 and PE2, the duty ratio of the output of the duty ratio control circuit changes from time to time. Accordingly, a peak harmonic component changes from time to time, spreading over a whole frequency spectrum. Thus the EMI level of a system that is driven by the clock signal is suppressed.

As seen above, a timing of the delayed clock signal CKDLY0 is fixed, whereas a timing of the delayed clock signal represented in FIG. 66-(*b*) changes with time. In the output signal of the duty ratio control circuit as shown in FIG. 66-(*c*), a timing of its rising edge is the same as the falling edge timing of the signal of FIG. 66-(*a*). Thus, the timing of the rising edge of the output signal is constant, while the duty ratio is changing.

Because the duty ratio is changed while keeping constant the rising edge timing of the output clock signal, synchronization between the synchronizing clock signal and a data signal can be maintained in a system that is designed to synchronize the data signal with the rising edge of the synchronizing clock signal.

The above description has referred to the output rising edges as being constant while the falling edges fluctuate. The present invention is not limited to this particular embodiment. The duty ratio may be changed with falling edge timings being constant and rising edge timings being flexible. In this case, the system is to be designed to synchronize data signals with the falling edge timings of the clock signal.

Figure 67:
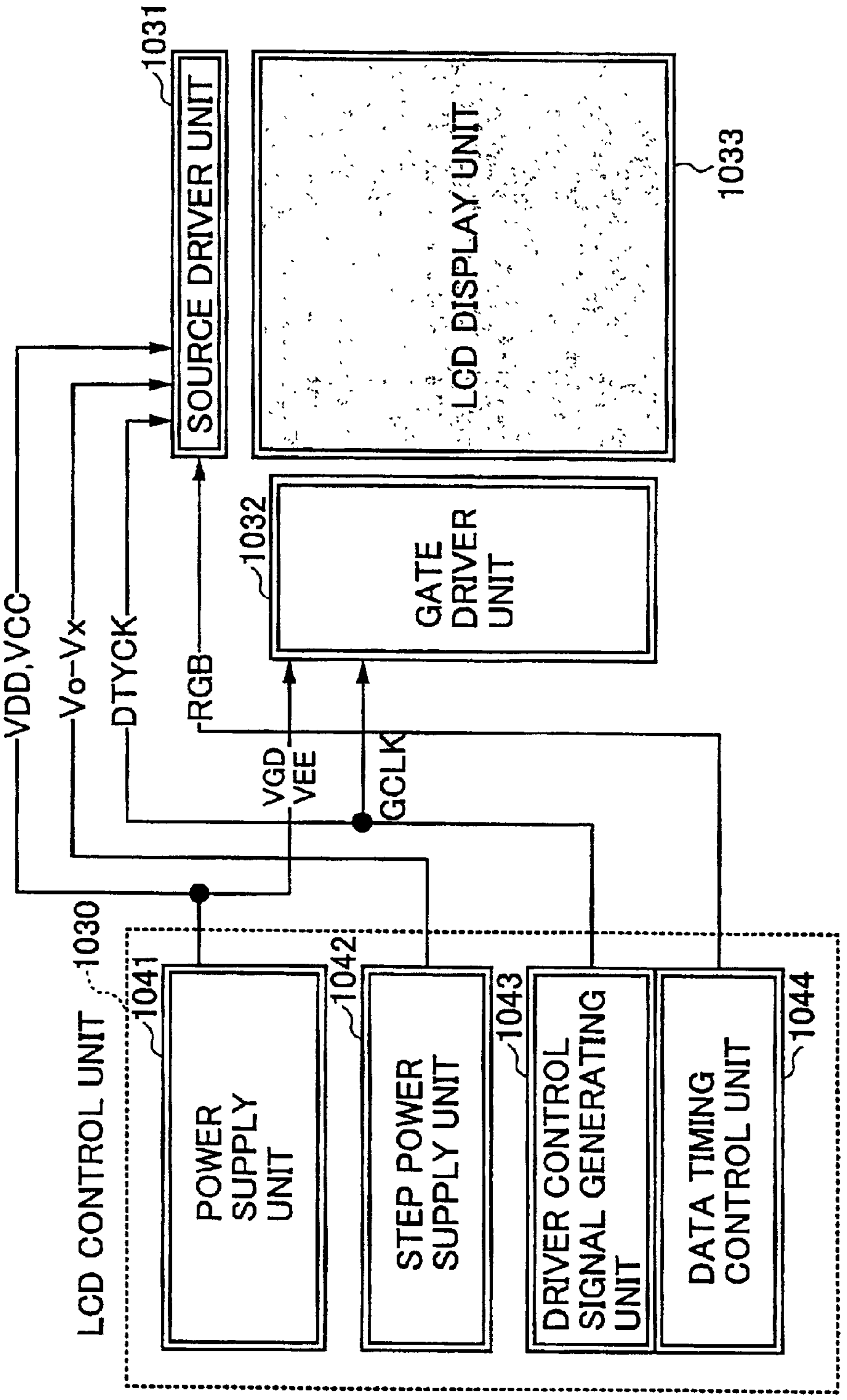
FIG. 67 is an illustrative drawing for an example application to an LCD display.

FIG. 67 shows an example of a system which employs the present invention.

FIG. 67 is a block diagram of an LCD (liquid crystal display). The LCD includes an LCD control unit 1030, a source driver unit 1031, a gate driver unit 1032 and an LCD display unit 1033.

The gate driver unit 1032 supplies a scanning signal in synchronization with a gate clock signal GCLK to the LCD display unit 1033. The scanning signal activates pixels, row by row, of the LCD display unit 1033.

The source driver unit 1031 writes a display signal (video signal) to activated pixels of the LCD display unit 1033 in synchronization with a synchronization clock signal DTYCK.

The timing of this activation is controlled by the LCD control unit 1030, whereby desired video information is displayed at the LCD display unit 1033.

The LCD controller unit 1030 includes a power supply unit 1041, a step power supply unit 1042, a driver control signal generating unit 1043 and a data timing control unit 1044.

The power supply unit 1041 provides power source voltages VDD and VCC to the source driver unit 1031 and power source voltages VGD and VEE to the gate driver unit 1032. The step power supply unit 1042 generates voltages V0 through Vx, which correspond to display intensity levels, and supplies these voltages to the source driver unit 1031. The driver control signal generating unit 1043 generates the synchronous clock signal DTYCK and supplies this signal to the source driver unit 1031. The driver control signal generating unit 1043 also generates the gate clock signal GCLK and supplies this signal to the gate driver unit 1032. The data timing control unit 1044 supplies video signals RGB to the source driver unit 1031.

The delayed clock generation circuit as shown in FIG. 65A and the duty ratio control circuit as shown in FIG. 65B of the present invention are provided in the driver control signal generating unit 1043 shown in FIG. 67. By this provision, as described with reference to FIGS. 65A and 65B, the duty ratio of the synchronizing clock signal DTYCK shifts temporally to make peaks of the EMI energy distributed over the frequency spectrum. Also, as previously explained with reference to FIG. 65B, either the rising edges or falling edges are allowed to fluctuate while maintaining the timing of the other, which provides duty ratio changes and synchronization of the clock signal with the RGB video signal.

An example of an embodiment of the present invention has been described above. The present invention is not limited to the example, but there are possible variations within the scope of the claimed invention. For example, the numbers of the inverters and the NAND circuits in the clock signal delay circuit, shown in FIG. 65A, may be any numbers and a matter of design choice.

The present invention, as above described, achieves an electronic implementation with a significant decrease in the EMI level which is achieved by spreading the peak harmonics over the frequency spectrum.

Further, the present invention is not limited to these embodiments, but various variations and modifications may be made without departing from the scope of the present invention.

The present application is based on Japanese priority applications No. 2001-022479 filed on Jan. 30, 2001 and No. 2000-259578 filed on Aug. 29, 2000, with the Japanese Patent Office, the entire contents of which are hereby incorporated by reference.

What is claimed is:

1. A method of making a liquid crystal display apparatus that displays an image on a liquid crystal panel including liquid crystal cells, comprising a step of determining a $\gamma$ value serving as an index for a graduation-luminosity characteristic according to a thickness of the liquid crystal cell or a birefringence index of a liquid crystal layer included in the liquid crystal cells.

2. A liquid crystal display apparatus that displays an image on a liquid crystal panel including liquid crystal cells, wherein a $\gamma$ value which serves as an index of gradation-luminosity characteristic in said liquid crystal panel is set to above 1.9 and within a ±30% range of 0.008 times $\Delta nd$ where $\Delta n$ represents an anisotropy of a refractive index and d represents a thickness of said liquid crystal cells.

3. The liquid crystal display apparatus as claimed in claim 2, wherein said $\gamma$ value is set between 2.15 and 3 while the product $\Delta nd$ is within limits of 350 nm±50 nm.

4. The liquid crystal display apparatus as claimed in claim 2, wherein said $\gamma$ value is set between 2.0 and 2.3 while the product $\Delta nd$ is within limits of 280 nm±50 nm.

* * * * *

UNITED STATES PATENT AND TRADEMARK OFFICE

CERTIFICATE OF CORRECTION

PATENT NO. : 6,856,373 B2
APPLICATION NO. : 09/939845
DATED : February 15, 2005
INVENTOR(S) : Satoshi Sekido It is certified that error appears in the above-identified patent and that said Letters Patent is hereby corrected as shown below:

In the Claims:

Col. 26, line 39, delete "cell" and insert --cells--.

Add the following claims:

5. A liquid crystal display apparatus as claimed in claim 2, wherein a contrast of middle tones on a white side can be maintained by using only a middle tone on a black side before T-V characteristics begin to surge as the middle tones.

6. A liquid crystal display apparatus as claimed in claim 2, wherein liquid crystal molecules are vertically aligned when no voltage is applied.

Signed and Sealed this

Fifteenth Day of January, 2008

JON W. DUDAS
*Director of the United States Patent and Trademark Office*